United States Patent
Tarquini et al.

(10) Patent No.: US 9,870,636 B2
(45) Date of Patent: Jan. 16, 2018

(54) METHOD FOR SHARING EMOTIONS THROUGH THE CREATION OF THREE DIMENSIONAL AVATARS AND THEIR INTERACTION

(71) Applicant: MoodMe Belgium SPRL, Nivelles (BE)

(72) Inventors: Massimiliano Tarquini, Rome (IT); Olivier Chandra De Keyser, Luxembourg (BE); Allessandro Ligi, Sacrofano (IT)

(73) Assignee: MoodMe Belgium SPRL (BE)

( * ) Notice: Subject to any disclaimer, the term of this patent is extended or adjusted under 35 U.S.C. 154(b) by 0 days.

(21) Appl. No.: 14/456,759

(22) Filed: Aug. 11, 2014

(65) Prior Publication Data
US 2015/0091896 A1    Apr. 2, 2015

Related U.S. Application Data

(63) Continuation-in-part of application No. PCT/EP2013/052788, filed on Feb. 12, 2013.
(Continued)

(30) Foreign Application Priority Data

Feb. 12, 2012    (EP) ..................... 12155243

(51) Int. Cl.
  *G06T 17/20*    (2006.01)
  *G06T 13/40*    (2011.01)
  (Continued)

(52) U.S. Cl.
  CPC .............. *G06T 13/40* (2013.01); *G06T 17/00* (2013.01); *G06T 17/20* (2013.01); *G06T 19/20* (2013.01);
  (Continued)

(58) Field of Classification Search
  None
  See application file for complete search history.

(56) References Cited

U.S. PATENT DOCUMENTS 6,323,846 B1    11/2001    Westerman et al.
6,570,557 B1    5/2003     Westerman et al.
(Continued)

OTHER PUBLICATIONS

Lee et al., "Bureaucrat Too", https://www.youtube.com/watch?v=dQef4pM_vXU, 2009.*
(Continued)

*Primary Examiner* — Nicholas R Wilson
(74) *Attorney, Agent, or Firm* — Richards Patent Law P.C.

(57) ABSTRACT

A two-dimensional image is transformed into at least one portion of a human or animal body into a three-dimensional model. An image is acquired that includes the at least one portion of the human or animal body. An identification is made of the at least one portion within the image. Searches are made for features indicative of the at least one portion of the human or animal body within the at least one portion. One or more identifications are made of a set of landmarks corresponding to the features. An alignment is a deformable mask including the set of landmarks. The deformable mask includes a number of meshes corresponding to the at least one portion of the human or animal body. The 3D model is animated by dividing it into concentric rings, quasi rings and applying different degrees of rotation to each ring.

8 Claims, 24 Drawing Sheets

Related U.S. Application Data

(60) Provisional application No. 62/018,766, filed on Jun. 30, 2014.

(51) Int. Cl.
  *G06T 17/00* (2006.01)
  *H04M 1/725* (2006.01)
  *G06T 19/20* (2011.01)

(52) U.S. Cl.
  CPC ..... *H04M 1/72544* (2013.01); *G06T 2213/04* (2013.01)

(56) References Cited

U.S. PATENT DOCUMENTS

| | | | |
|---|---|---|---|
| 6,677,932 B1 | 1/2004 | Westerman | |
| 6,888,536 B2 | 5/2005 | Westerman et al. | |
| 7,614,008 B2 | 11/2009 | Ording | |
| 7,653,883 B2 | 1/2010 | Hotelling et al. | |
| 7,657,849 B2 | 2/2010 | Chaudhri et al. | |
| 7,663,607 B2 | 2/2010 | Hotelling et al. | |
| 7,844,914 B2 | 11/2010 | Andre et al. | |
| 8,006,002 B2 | 8/2011 | Kalayjian et al. | |
| 8,239,784 B2 | 8/2012 | Hotelling et al. | |
| 8,254,691 B2 | 8/2012 | Kaneda et al. | |
| 8,279,180 B2 | 10/2012 | Hotelling et al. | |
| 8,381,135 B2 | 2/2013 | Hotelling et al. | |
| 8,479,122 B2 | 7/2013 | Hotelling et al. | |
| 8,600,430 B2 | 12/2013 | Herz et al. | |
| 2006/0026536 A1 | 2/2006 | Hotelling et al. | |
| 2006/0033724 A1 | 2/2006 | Chaudhri et al. | |
| 2006/0197753 A1 | 9/2006 | Hotelling | |
| 2010/0214290 A1* | 8/2010 | Shiell | G06K 9/621 345/420 |
| 2012/0183238 A1* | 7/2012 | Savvides | G06K 9/00201 382/285 |

OTHER PUBLICATIONS

Lee et al., "Realistic Modeling for Facial Animation," ACM, 1995.*
Zhu et al., "Multimedia Cloud Computing," IEEE, 2011.*

* cited by examiner

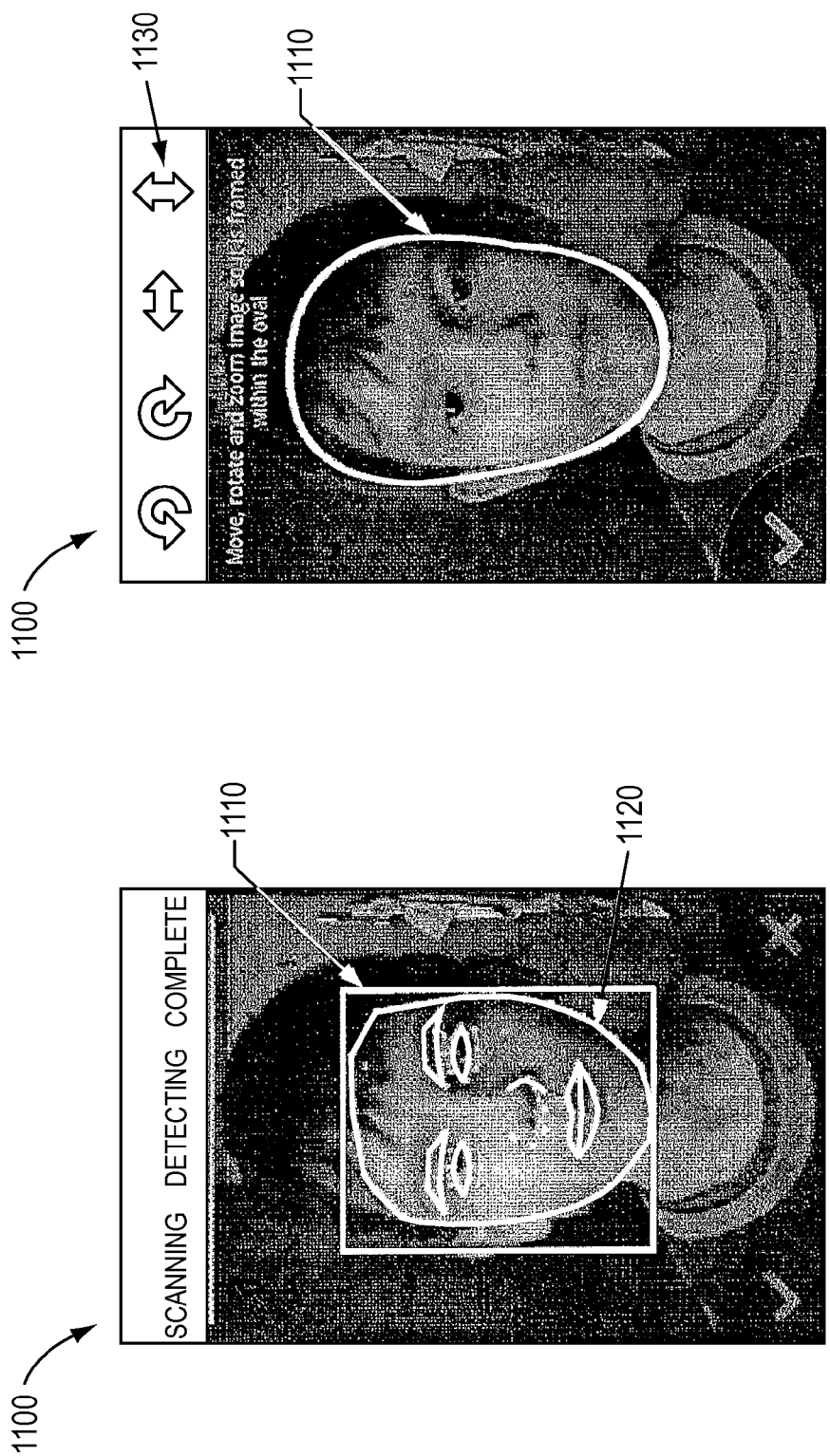

ial filing date of Feb. 12, 2013, and claims priority
METHOD FOR SHARING EMOTIONS THROUGH THE CREATION OF THREE DIMENSIONAL AVATARS AND THEIR INTERACTION

CROSS-REFERENCE TO RELATED APPLICATIONS

This application is a continuation-in-part of International Patent Application No. PCT/EP2013/052788, which has an international filing date of Feb. 12, 2013, and claims priority to European Patent Application No. 12155243.4, filed Feb. 12, 2012 and U.S. Provisional Patent Application No. 62/018,766, filed Jun. 30, 2014. The present application incorporates herein by reference the disclosures of each of the above-referenced applications in their entireties.

BACKGROUND OF THE INVENTION

Field of the Invention

The present invention relates to a method for the sharing of emotions through the creation of three-dimensional avatars and their interactions, and more particularly with the creation of such avatars for use with mobile devices, cloud based systems and the like.

Description of the Related Art

In the last few years, the development of powerful mobile devices and their diffusion worldwide has produced a global change in which people are moving away from using desktop computers to using a mobile equivalent, for example, mobile devices, laptops, notebooks and other small portable electronic devices which can connect to the web.

The use of such mobile devices has allowed the phenomenon called "social networking" to become an important part in the day-to-day activities of many people's lives. Today, hundreds of millions of people use their virtual identities to communicate and interact with other people over the web, internet and the like via social networking sites. In addition, these virtual identities are used to play games over the web, internet and the like.

While this widespread phenomenon provides the ability for contact between people any time of day or night, it is difficult to determine exactly how people are feeling by looking at their virtual identity. It would be a development of the "social networking" phenomenon to be able to interact with people on social networking sites as if it were real life, so that a person's moods, feelings, sentiments etc. can be made available via the web, internet and the like.

This widespread phenomenon provides the ability for continuous contact between people any time of day or night; it is difficult to determine exactly how people are feeling by looking at their virtual identity. It would be a development of the "social networking" phenomenon to be able to interact with people on social networking sites as if it were real life, so that a person's moods, feelings, sentiments etc. can be made available via the web, internet and the like.

In the last few years, the development of powerful mobile handsets and their diffusion is producing a new global change as most people are moving from desktop to mobile devices. However, a person's virtual identity is always with him/her as it becomes part of day-to-day life.

SUMMARY OF THE INVENTION

An object of the present invention to provide a method of creating a three-dimensional avatar.

Another object of the present invention is to provide a method of creating a three-dimensional avatar which maintains the morphology of the face.

Another object of the present invention is to provide a method of creating a three-dimensional avatar which provides a digital representation of feelings, sentiments, mood and the like, A further object of the present invention is to provide a method of creating a three-dimensional avatar which provides a digital representation of feelings, sentiments, mood and the like when interacting with other people or animals using mobile devices, cloud systems and other communication devices.

It is another object of the present invention to provide methods for providing representations of a digital identity of a person or animal.

A further object of the present invention to provide a representation of a digital identity of a person which can be carried around and through which it is always possible to understand feelings of people friends and/or animals by simply looking at them as if it were real life, with each digital identity being provided by a 3D avatar representing feeling, sentiments, mood, and the like, of a user.

These and other objects of the present invention are achieved for transforming a two-dimensional image of at least one portion of a human or animal body into a three-dimensional model. An image is acquired that includes the at least one portion of the human or animal body. An identification is made of the at least one portion within the image. Searches are made for features indicative of the at least one portion of the human or animal body within the at least one portion. One or more identifications are made of a set of landmarks corresponding to the features. An alignment is a deformable mask including the set of landmarks. The deformable mask includes a number of meshes corresponding to the at least one portion of the human or animal body. The 3D model is animated by dividing it into concentric rings, quasi rings and applying different degrees of rotation to each ring.

BRIEF DESCRIPTION OF THE DRAWINGS

FIGS. 11 and 12 illustrate one embodiment of the recognition of an area including a human or animal face.

DETAILED DESCRIPTION OF THE PREFERRED EMBODIMENTS

Figure 1A:
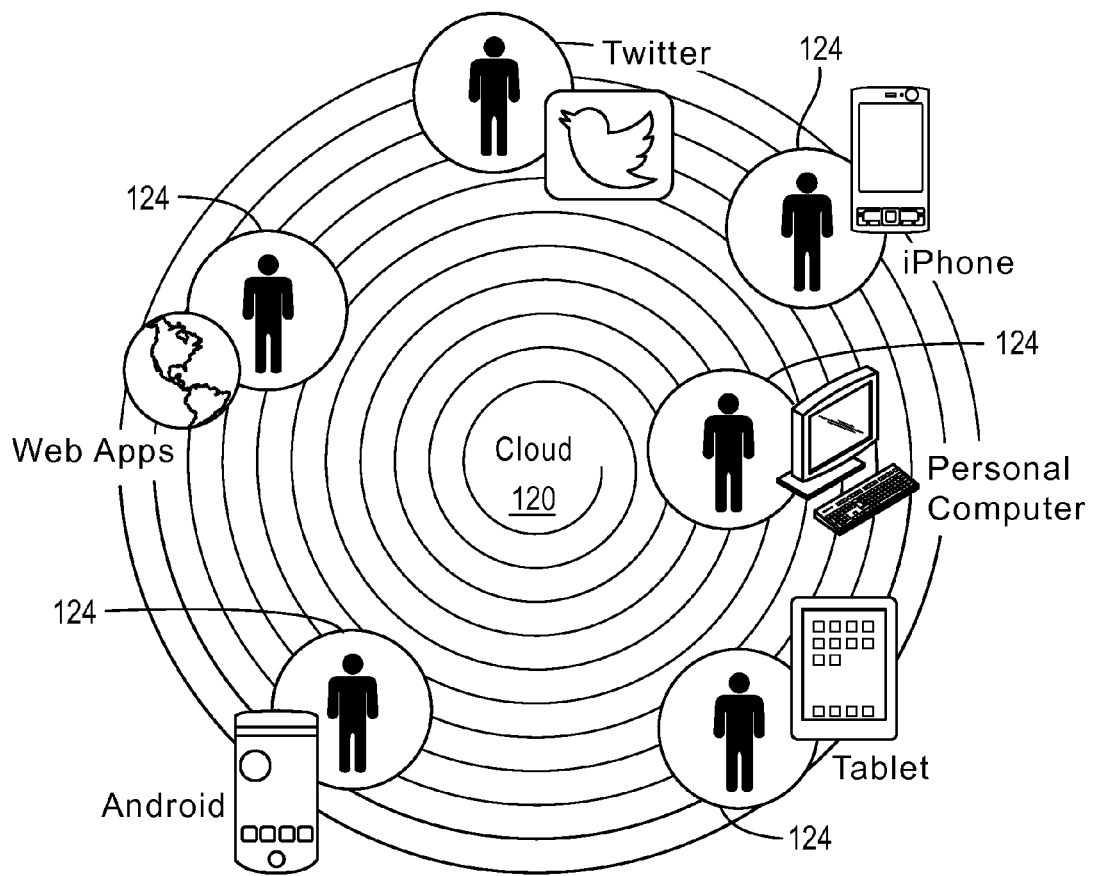
FIGS. 1(a)-(e) illustrates various embodiments of cloud infrastructures that can be utilized with the present invention.

As used herein, the term engine refers to software, firmware, hardware, or other component that can be used to effectuate a purpose. The engine will typically include software instructions that are stored in non-volatile memory (also referred to as secondary memory) and a processor with instructions to execute the software. When the software instructions are executed, at least a subset of the software instructions can be loaded into memory (also referred to as primary memory) by a processor. The processor then executes the software instructions in memory. The processor may be a shared processor, a dedicated processor, or a combination of shared or dedicated processors. A typical program will include calls to hardware components (such as I/O devices), which typically requires the execution of drivers. The drivers may or may not be considered part of the engine, but the distinction is not critical.

As used herein, the term database is used broadly to include any known or convenient means for storing data, whether centralized or distributed, relational or otherwise.

As used herein a mobile device includes, but is not limited to, a cell phone, such as Apple's iPhone®, other portable electronic devices, such as Apple's iPod Touches®, Apple's iPads®, and mobile devices based on Google's Android® operating system, and any other portable electronic device that includes software, firmware, hardware, or a combination thereof that is capable of at least receiving a wireless signal, decoding if needed, and exchanging information with a server. Typical components of mobile device may include but are not limited to persistent memories like flash ROM, random access memory like SRAM, a camera, a battery, LCD driver, a display, a cellular antenna, a speaker, a BLUETOOTH® circuit, and WIFI circuitry, where the persistent memory may contain programs, applications, and/or an operating system for the mobile device.

As used herein, the term "computer" is a general purpose device that can be programmed to carry out a finite set of arithmetic or logical operations. Since a sequence of operations can be readily changed, the computer can solve more than one kind of problem. A computer can include of at least one processing element, typically a central processing unit (CPU) and some form of memory. The processing element carries out arithmetic and logic operations, and a sequencing and control unit that can change the order of operations based on stored information. Peripheral devices allow information to be retrieved from an external source, and the result of operations saved and retrieved. Computer also includes a graphic display medium.

As used herein, the term "internet" is a global system of interconnected computer networks that use the standard web protocol suite (TCP/IP) to serve billions of users worldwide. It is a network of networks that consists of millions of private, public, academic, business, and government networks, of local to global scope, that are linked by a broad array of electronic, wireless and optical networking technologies. The internet carries an extensive range of information resources and services, such as the inter-linked hypertext documents of the World Wide Web (WWW) and the infrastructure to support email. The communications infrastructure of the internet consists of its hardware components and a system of software layers that control various aspects of the architecture.

As used herein, the term "extranet" is a computer network that allows controlled access from the outside. An extranet can be an extension of an organization's intranet that is extended to users outside the organization in isolation from all other internet users. An extranet can be an intranet mapped onto the public internet or some other transmission system not accessible to the general public, but managed by more than one company's administrator(s). Examples of extranet-style networks include but are not limited to:

- LANs or WANs belonging to multiple organizations and interconnected and accessed using remote dial-up
- LANs or WANs belonging to multiple organizations and interconnected and accessed using dedicated lines
- Virtual private network (VPN) that is comprised of LANs or WANs belonging to multiple organizations, and that extends usage to remote users using special "tunneling" software that creates a secure, usually encrypted network connection over public lines, sometimes via an ISP.

As used herein, the term "Intranet" is a network that is owned by a single organization that controls its security policies and network management. Examples of intranets include but are not limited to:

- A LAN
- A Wide-area network (WAN) that is comprised of a LAN that extends usage to remote employees with dial-up access
- A WAN that is comprised of interconnected LANs using dedicated communication lines
- A Virtual private network (VPN) that is comprised of a LAN or WAN that extends usage to remote employees or networks using special "tunneling" software that creates a secure, usually encrypted connection over public lines, sometimes via an Internet Service Provider (ISP).

For purposes of the present invention, the Internet, extranets and intranets collectively are referred to as ("Network Systems").

For purposes of the present invention, the term "Infrastructure" means, information technology, the physical hardware used to interconnect computers and users, transmission media, including telephone lines, cable television lines, and satellites and antennas, and also the routers, aggregators, repeaters, computers, network devices, applications, and other devices that control transmission paths, software used to send, receive, and manage the signals that are transmitted, and everything, both hardware and software, that supports the flow and processing of information.

As used herein, "event message" or "event" is defined as a change in state. An event is anything that happens, or is contemplated as happening in message form or event form relating to infrastructure. An event can include a time stamp, and a name for the entity changing state.

As used herein "Living Portrait®" refers to a 3D deformable face model based on a photo of a human or animal face. "Living Portrait®" is a trademark of Mach 3D granted by US PTO (Registered May 21, 2013, Reg. No. 4,338,828 under Int. Cl. 9).

Java® is a known programming language developed by Sun Microsystems, a subsidiary of Oracle Corporation. Much of its syntax is derived from C and C++ but has a simpler object model and fewer low-level facilities.

As used herein "C" is a general purpose computer programming language that is widely used for developing portable application software.

As used herein "C++" is a popular programming language used for systems software, application software, device drivers, embedded software, high performance server and client application as well as entertainment software.

As used herein "OpenCV" refers to Open Source Computer Vision, a library of programming functions for real time computer vision.

As used herein "Cloud or Mobile Device Computing" refers to the delivery of computing as a service rather than a product. Shared resources and information are provided to computers and other devices as a utility over a network, typically the Network Systems.

As used herein "C or Mobile Device client" refers to computer hardware and/or software that rely on "cloud computing" for application delivery. This includes mobile devices, tablets, other mobile devices, desktops and Network System applications that are connectable to the Cloud or Mobile device for Cloud or Mobile Device Computing. It includes any program that can interact with the platform, and in particular, the 3DoM Platform described below, which is hosted in the Cloud.

As used herein "Cloud or Mobile Device Application" refers to cloud or mobile device application services or "software as a service" (SaaS) which deliver software over the Network Systems eliminating the need to install and run the application on a device.

As used herein "Cloud or Mobile Device Platform" refers to a cloud or mobile device platform services or "platform as a service" (PaaS) which deliver a computing platform and/or solution stack as a service, and facilitates the deployment of applications without the cost and complexity of obtaining and managing the underlying hardware and software layers.

As used herein "Cloud Infrastructure" refers to cloud infrastructure services or "infrastructure as a service" (IaaS) which deliver computer infrastructure as a service with raw block storage and networking.

As used herein "Server" refers to server layers that consist of computer hardware and/or software products specifically designed for the delivery of cloud or mobile device services.

"Image histogram" refers to a graphical representation of tonal distribution in a digital image. It plots the number of pixels for each tonal value, and is used to judge and change tonal distribution of an entire image at a glance.

As used herein "App" refers to application, for example, Network System, cloud and mobile device applications.

As used herein "3me®" or "MoodEe®" is a virtual object that can be sent to the Living Portrait of a recipient to catch his/her attention. It can be considered to be like saying "hello" or winking. "3me®" and "MoodEe®" are trademarks of Mach-3D. 3me® or MoodEe® will be described in more detail below.

As used herein "3DoM® Platform" refers to a particular Cloud or Mobile Device Platform that is operated by Mach-3D and through which a user can be linked to his/her social networking site. "3DoM®" is a trademark of Mach-3D.

As used herein "MoodMe®" refers to the technologies described in the present Patent filing. "MoodMe®" is a trademark of Mach-3D granted by US PTO (Registered May 14, 2013, Reg. No. 4,334,062 under Int. Cl. 9).

As used herein "Vertex" means: (i) a point, including but not limited to as of an angle, polygon or mesh structure (which can be a primitive), polyhedron, graph, network and the like that terminates a line or curve; (ii) the intersection of two or more lines or curves and (iii) a point where an axis of an ellipse, parabola, or hyperbola intersects the curve itself.

As used herein "Mesh" means a collection of vertexes—points in 3D space—that can be connected in different ways. The shapes that are formed by connecting these vertexes are called primitives. The primitives are building blocks that are [it together to form a mesh. Not all of the vertexes need to be connected and points can be drawn as the primitives. Pairs of vertexes can be connected as the primitives. Three or more vertexes can be drawn as the primitives.

As used herein "Living Portrait" (LP) is a 3D model of a human (or animal) face generated automatically from one single picture. This model can be animated with a simulation of life, hence the term Living, and is a realistic representation of the human face, hence the term Portrait.

In one embodiment the present invention provides methods of creating a three-dimensional avatar.

In one embodiment the present invention is to provide a method of creating a three-dimensional avatar which maintains the morphology of the face.

In one embodiment the present invention is provides methods of creating a three-dimensional avatar which provides a digital representation of feelings, sentiments, mood and the like, In one embodiment the present invention provides methods of creating a three-dimensional avatar. The three-dimensional avatar provides a digital representation of feelings, sentiments, mood and the like when interacting with other people or animals using mobile devices, cloud systems and other communication devices.

In one embodiment the present invention provides methods for creating representations of a digital identity of a person or animal.

In one embodiment the present invention provides a representation of a digital identity of a person which can be carried around and through which it is always possible to understand feelings of people friends and/or animals by simply looking at them as if it were real life. Each digital identity is provided by a 3D avatar representing feeling, sentiments, mood, and the like, of a user.

In one embodiment a method transforms a two-dimensional image of at least one portion of a human or animal body into a three-dimensional model. A search is made of features indicative of at least a portion of the human or animal body within the at least one portion. A set of landmarks is identified that corresponds to the features. A 3D deformable mask is aligned, including the set of landmarks to create a 3D model of the face respecting its morphology, the deformable mask including a number of mesh shapes that correspond to at least one portion of the human or animal. The 3D model is animated by dividing it into concentric rings and applying different degrees of rotation to each ring.

In one embodiment a cloud structure is utilized. As a non-limiting example, one embodiment of a cloud structure is illustrated in FIGS. 1(a)-1(e).

The cloud based system 110 includes a third party service provider 120, that is provided by the methods used with the present invention, that can concurrently service requests from several clients without user perception of degraded computing performance as compared to conventional techniques where computational tasks can be performed upon a client or a server within a proprietary intranet. The third party service provider 120 (e.g., "cloud") supports a collection of hardware and/or software resources 122. The hardware and/or software resources 122 can be maintained by an off-premises party, and the resources 122 can be accessed and utilized by identified users over Network Systems. Resources 122 provided by the third party service provider 120 can be centrally located and/or distributed at various geographic locations. For example, the third party service provider 120 can include any number of data center machines that provide resources 122. The data center machines can be utilized for storing/retrieving data, effectuating computational tasks, rendering graphical outputs, routing data, and so forth.

In one embodiment, the third party service provider 120 can provide any number of resources 122 such as data storage services, computational services, word processing services, electronic mail services, presentation services, spreadsheet services, gaming services, web syndication services (e.g., subscribing to a RSS feed), and any other services or applications that are conventionally associated with personal computers and/or local servers. Further, utilization of any number of third party service providers similar to the third party service provider 120 is contemplated. According to an illustration, disparate third party service providers can be maintained by differing off-premise parties and a user can employ, concurrently, at different times, and the like, all or a subset of the third party service providers.

By leveraging resources 122 supported by the third party service provider 120, limitations commonly encountered with respect to hardware associated with clients and servers within proprietary intranets can be mitigated. Off-premises parties, instead of users of clients or network administrators of servers within proprietary intranets, can maintain, troubleshoot, replace and update the hardware resources 122. Further, for example, lengthy downtimes can be mitigated by the third party service provider 120 utilizing redundant resources 122; thus, if a subset of the resources 122 are being updated or replaced, the remainder of the resources 122 can be utilized to service requests from users. According to this example, the resources 122 can be modular in nature, and thus, resources 122 can be added, removed, tested, modified, etc. while the remainder of the resources 122 can support servicing user requests. Moreover, hardware resources 122 supported by the third party service provider 120 can encounter fewer constraints with respect to storage, processing power, security, bandwidth, redundancy, graphical display rendering capabilities, etc. as compared to conventional hardware associated with clients and servers within proprietary intranets.

The cloud based system 110 can include a client device 124 that employs resources 122 of the third party service provider 120. Although one client device 124 is depicted, it is to be appreciated that the cloud based system 100 can include any number of client devices similar to the client device 124, and the plurality of client devices can concurrently utilize supported resources 122. By way of illustration, the client device 124 can be a desktop device (e.g., personal computer), mobile device, and the like. Further, the client device 124 can be an embedded system that can be physically limited, and hence, it can be beneficial to leverage resources 122 of the third party service provider 120.

Resources 122 can be shared amongst a plurality of client devices subscribing to the third party service provider 120. According to an illustration, one of the resources 122 can be at least one central processing unit (CPU), where CPU cycles can be employed to effectuate computational tasks requested by the client device 124. Pursuant to this illustration, the client device 124 can be allocated a subset of an overall total number of CPU cycles, while the remainder of the CPU cycles can be allocated to disparate client device(s). Additionally or alternatively, the subset of the overall total number of CPU cycles allocated to the client device 124 can vary over time. Further, a number of CPU cycles can be purchased by the user of the client device 124. In accordance with another example, the resources 122 can include data store(s) that can be employed by the client device 124 to retain data. The user employing the client device 124 can have access to a portion of the data store(s) supported by the third party service provider 120, while access can be denied to remaining portions of the data store(s) (e.g., the data store(s) can selectively mask memory based upon user/device identity, permissions, and the like). It is contemplated that any additional types of resources 122 can likewise be shared.

The third party service provider 120 can further include an interface component 128 that can receive input(s) from the client device 124 and/or enable transferring a response to such input(s) to the client device 124 (as well as perform similar communications with any disparate client devices). According to an example, the input(s) can be request(s), data, executable program(s), etc. For instance, request(s) from the client device 124 can relate to effectuating a computational task, storing/retrieving data, rendering a user interface, and the like via employing one or more resources 122. Further, the interface component 128 can obtain and/or transmit data over a network connection. According to an illustration, executable code can be received and/or sent by the interface component 128 over the network connection. Pursuant to another example, a user (e.g. employing the client device 124) can issue commands via the interface component 128.

Moreover, the third party service provider 120 includes a dynamic allocation component 110 that apportions resources 122 (e.g., hardware resource(s)) supported by the third party service provider 120 to process and respond to the input(s) (e.g., request(s), data, executable program(s), . . . ) obtained from the client device 124.

Although the interface component 128 is depicted as being separate from the dynamic allocation component 110, it is contemplated that the dynamic allocation component 110 can include the interface component 128 or a portion thereof. The interface component 128 can provide various adaptors, connectors, channels, communication paths, etc. to enable interaction with the dynamic allocation component 110.

In one embodiment of the present invention, a structure is placed around a geometric outline of the face. As a non-limiting example, the geometric figure can be an oval, a quasi-oval or a geometry that closely follows the outline of the face. As a non-limiting example, in one embodiment the geometric outline of the face is based on Phi and Golden Ratio proportions. In one embodiment the structure is two shapes that can be concentric, around the geometric outline of the face. In one embodiment, two rings are used because the realism of the human (or animal) face is deemed satisfactory by a group of observers whereas using 1 ring only was not considered realistic enough. Meanwhile, trials of human (or animal) faces with 3 rings made the model, in particular the model rotation, computationally more complex and the 3D animations became heavy without adding significant human—like realism. As a non-limiting example, 2 rings are considered to be the best trade-off between realism and resources requirement. In one embodiment, the rings surround the geometric outline of the face and rotate with lower speed and smaller angles than the inner geometric outline of the face to create a realistic movement of the face. In one embodiment, additional face information is obtained by extending the geometric outline of the face. Each ring moves with a different angular speed relative to the geometric outline of the face. The angles have been calculated, empirically, and are described as follows.

Not all the vertices in an LP are moved according to the defined rules. To make the LP animation more realistic, the LP general model (LPGM) has been structured to cover not only the geometric outline of the face but also an area containing the image background. From the animation point of view, the LPGM is divided in many areas which are concentric rings;

Contour 3, the outer edge, far from the head geometric outline of the face, including large portions of the background;

Contour 2, the area between Contour 3 and the face geometric outline of the face, including hair and small portions of the background;

Upper Contour, an upper portion of Contour 2, including all points on the upper side of the eyebrow; and Lower Contour, a lower portion of Contour 2, including all points on the lower side of the chin.

To evaluate X-, Y- and Z-axis rotation to be applied to each vertex of the LP, the following rules are applied:

(1) If a vertex belongs to Contour 3, no rotation is applied thereby anchoring all points in CHV to the image background;

(2) If a vertex belongs to Lower Contour, X- and Y-rotations are reduced by 50% of their value with the Z-axis rotation being reduced to 10% of the original value;

(3) If a vertex belongs to Upper Contour, X-, Y- and Z-axis rotations are reduced to 60% of their original value;

(4) if a vertex belongs to Contour 2, X-, Y- and Z-axis rotations are reduced to 30% of their original value; and (5) All other vertices are moved according to the defined rules.

Note: These values are given as example only and can be modified in different implementations. The principle is to have different level of rotation for areas around the face in order to generate a more realistic animation of the head rotation.

This kind of movement, especially between Contour 2 and Contour 3, introduces very noticeable deformations. Because Contour 3 is fixed, all the textures are stretched with a disturbing effect. To reduce this effect, a gradient is applied, which gradually makes textures completely opaque in the area next to the center of the LP, and almost totally transparent in the area next to the top of Contour 3.

The approach used in this embodiment is empirical. The background does not rotate when the face rotates while the face inside the geometric outline rotates at the full angle. The concentric rings rotate at lower speed (smaller angles) than the face inside the geometric outline to simulate a more realistic rotation.

In this embodiment, it is taken into consideration that the lateral parts of the face (the sides of the head) are unknown because work is done on the basis of only one front—facing picture. Therefore, these lateral parts can be created to show them when the face rotates.

A rotation of the geometric outline of the face and the rings occurs around a pivot point. In one embodiment, the pivot point has been calculated, empirically, as follows, by an iterative process.

The origin of the three axes of rotation, the so-called pivot point, is obtained using the X- and Y-coordinates of the sixty-sixth landmark of the model LPGM. The Z value is modified to different values, fractions of the depth of the model, such as 5/10, 6/10, . . . 15/10 . . . while, for each such value, a group of people gave their personal assessment of what rotations gave the model the most realistic aspect when rotating. At the end of this iterative process, it was agreed that the Z value of the required point would be set equal to the 11/10 of the depth of the model. In other embodiment, one could have a pivot point where the Z value is, for example, 12/10 of the depth of the model, or 10/10 (i.e. 1 time) the depth.

It is to be noted that the geometric outline of the face need not be a perfect geometric outline of the face. Instead it is a geometric configuration that is defined by the actual face and can be elliptical, quasi elliptical, a non-perfect geometric outline of the face, a substantially geometric outline of the face geometry with some linear sections and with different arch's.

In one embodiment the rings are obtained through a non-mathematical process. It can be an iterative empirical process where many people watch "Living Portraits" (LP) moving, and then try to understand if the LP was not human like (i.e., realistic) enough and what could be done to make it more human. Suggestions are retained after trial and error to introduce rings. These are then implemented. People are grouped again to watch, comment, and so on for several months until a solution is found which is the most human and then utilized. The approach used in this embodiment is to put human's center stage rather than technology by asking real people how they felt, how they liked the different Living Portraits generated and which one was satisfactory, causing positive emotional reactions and emotional engagement.

In one embodiment the geometric outline of the face is not a perfect, symmetrical geometric outline of the face but is determined by the application of ASM on the two-dimensional picture. The output is a series of points where an ASM was applied to identify, as a non-limiting example, about 60 landmarks). In one embodiment 96 landmarks are identified and utilized.

In other embodiments, 2 additional points can be included to define the Mouth. In one embodiment 3, 4, even 10 or 20 points and the like can be added to the mouth, the nose, the eye, the eyebrows and the geometric outline of the face.

It has been defined that the quality of the model with such 96 landmarks was considered sufficient by a group of people and that a higher number of landmarks would not automatically mean a better model as landmarks depend on face characteristics and such face characteristics can be represented realistically enough with such a number of landmarks.

As a non-limiting example, a training set of the ASM is used with thousands of pictures of people faces where all the landmarks/points are placed also did not have perfect geometric outlines of the face. It had points corresponding to the landmarks of each of these thousands of people. The points are where they should be to respect the morphology of the people, not to attempt to be a perfect geometrical shape, including but not limited to an oval, quasi oval, ellipse, quasi ellipse and the like.

The rings are not perfect shapes either. The "rings" are called Contour. Contour 2 (inner ring) and Contour 3 (outer ring) are the rings around the "geometric outline of the face". They are the areas delimited by a sequence of straight lines that are themselves determined by triangles and other geometries.

In another embodiment a method transforms a two-dimensional image of at least one portion of a human or animal body into a three-dimensional model. An image is acquired that includes the at least one portion of the human or animal body. An identification is made of the at least one portion within the image. Searches are made for features indicative of the at least one portion of the human or animal body within the at least one portion. One or more identifications are made of a set of landmarks corresponding to the features. An alignment is a deformable mask including the set of landmarks. The deformable mask includes a number of meshes corresponding to the at least one portion of the human or animal body. The 3D model is animated by dividing it into concentric rings and applying different degrees of rotation to each ring.

In another embodiment a method is provided for transforming a two-dimensional image, of at least one portion of a human or animal body, into a three-dimensional model. An image is acquired that includes at least one portion of the human or animal body. The at least one portion within the image is identified. A search is performed for features indicative of the at least one portion of the human or animal body within the at least one portion. Identification is made for a set of landmarks corresponding to the features. An alignment is made of a deformable mask including the set of landmarks, the deformable mask comprising a number of polygons that correspond to the at least one portion of the human or animal body. An animation is made of the 3D model by dividing it into concentric rings and applying different degrees of rotation to each ring. In another embodiment, a method is provided for transforming a two-dimensional image of at least one portion of a human or animal body into a three-dimensional model. An acquisition is made of an image including the at least one portion of the human or animal body. An identification is made of the at least one portion within the image. A search is performed for features indicative of the at least one portion of the human or animal body within the at least one portion, a set of landmarks is identified that correspond to the features. An alignment is performed of a deformable mask including the set of landmarks, the deformable mask including a number of meshes that correspond to the at least one portion of the human or animal body. A texture is applied to each parameter forming the mask to provide the three-dimensional.

In one embodiment the present invention allows people to communicate their feelings and mood through the Network Systems using their 3-dimensional (3D) model created using a portrait of a human or animal face. As a non-limiting example, in one embodiment, the present invention does not provide an alternative to social networks or networking sites, but works with them, and, with other communication tools, including but not limited to, Skype®, MSN®, Yahoo!®, and the like, using Network Systems via a 3DoM® Platform connectable to social networks or networking sites. Skype® and MSN® are trademarks of Microsoft Corporation, and Yahoo!® is a trademark of Yahoo! Inc.

In one embodiment, the methods use the cloud or mobile devices and can be divided in three components: cloud or mobile device server, cloud or mobile device client, and cloud or mobile device applications as defined above. For example, the cloud or mobile device server includes the 3DoM® platform, the cloud or mobile device client includes any mobile device, desktop and Network System application connected to the 3DoM® platform; and cloud or mobile device Applications include the applications provided by the 3DoM® Platform.

As described herein, the creation of a LP is an element to the 3DoM® Platform, and requires the ability to transform a two-dimensional (2D) human or animal portrait into a 3D deformable model.

In one embodiment, there is a functionally of sharing LPs, moods and emotions through the structure as illustrated in FIGS. 1(*a*)-1(*e*). A client device, mobile device disclosed in FIGS. 22-24, or Network System shares a LP or moods with a third party service provider 120, FIG. 1(*b*), that allocates a resource 122, including but not limited to a CPU and memory, to process the request and to store the LP and associated information into a Data Store 146, FIG. 1(*e*). The mobile device can be used in every instance where the cloud is used, with corresponding components as disclosed in FIGS. 22-24.

In one embodiment network usage needs to be minimized as well as the amount of data stored on the 3DoM® cloud or mobile device server. The 3DoM® Platform has typical cloud or mobile device architecture: all the components communicate exchanging messages that represent the way to implements computing and application as a service. Data is shared through the cloud or mobile device using the Network Systems as the communication channel utilizing the client device 124, the cloud or mobile device CPU and memory to process the associated information in the data store.

A client device 124, FIG. 1(*b*), exchanges messages with the Interface Component 126, FIG. 1(*b*), according to communication protocols with a third party service provider 120, FIG. 1(*b*), that allocates a resource 122, FIG. 1(*b*), including but not limited to a CPU and memory, to process the message, to acknowledge it, respond to it and to store a log of this message into a Data Store 146, FIG. 1(*e*).

Changes of facial expressions, emotions, moods and accessories of the LP may generate events that the LP publishes through an API (Application Programming Interface). Such events can be detected by other applications. This capability allows for the creation of animated scenarios composed of one or more objects, either in 2D or 3D, in motion combined with changing moods and accessories of a LP. In one example, the eyes of the LP are capable of following a moving object close to its face. In another, an LP will wear a hat from a given brand and display a specific emotion when a branded product appears.

In one embodiment, an ASM (Active Shape Model) algorithm is used. The ASM algorithm is based on statistical models of shapes of objects, to identify the landmarks on the image.

FIG. 12 illustrates one embodiment of the execution of the ASM algorithm.

In one embodiment the ASM algorithm adds a process of searching the most similar image to the target object from the training sample set, and uses the shape model of the similar image instead of the average shape model to approximately express target object model. Now, searching the most similar image process will be introduced in detail.

One embodiment of a suitable ASM is as follows:

Assuming that there is a sample $\Omega$ of training images (the training set) composed of N training image samples, marking m feature points manually, the training sample set and the face image can be expressed by a shape vector [2]:

$$\Omega=\{S_1,\ldots,S_i,\ldots,S_N\} \quad (1)$$

$$S_i=(X_{i1},Y_{i1},\ldots,x_{ij},y_{ij},\ldots x_{im},y_{im})^T \quad (2)$$

where $S_i$ means the i-th training sample, $(x_{ij}, y_{ij})$ is the coordinate of the j-th feature point of the i-th training sample.

Aligning the training set: After obtaining the training sample set $\Omega$, it is found that the distribution of the feature points is very confused, and it absolutely has no face shape, but the fuzzy face outline can be seen. Therefore the training sets need to be aligned. In one embodiment, a Procrustes algorithm is used to minimize the sum of the distances from the all shapes to the average shape.

As a non-limiting example, assume that $M(Sc, \theta)[s]$ is a transformation to s with the rotation angle $\theta$ for the rotational change and the Sc for the scale. Therefore:

$$M(Sc,\theta)\begin{bmatrix}x_{ij}\\y_{ij}\end{bmatrix}=\begin{pmatrix}Sc^*\cos\theta^*x_{ij}-Sc^*\sin\theta^*y_{ij}\\Sc^*\sin\theta^*x_{ij}+Sc^*\cos\theta^*y_{ij}\end{pmatrix} \quad (3)$$

The aligning process from $s_2$ to $s_1$ is a process to solve the rotation angle $\theta$, scale Sc and the displacement $(t_x, t_y)$. The solution to these parameters is given as the following equations.

$$\begin{bmatrix}X_2 & -Y_2 & W & 0\\Y_2 & X_2 & W & 0\\Z & 0 & X_2 & Y_2\\0 & Z & -Y_2 & X_2\end{bmatrix}\begin{pmatrix}Sc^*\cos\theta^*\\Sc^*\sin\theta^*\\t_x\\t_y\end{pmatrix}=\begin{pmatrix}X_1\\Y_1\\C_1\\C_2\end{pmatrix} \quad (4)$$

where:

$$X_i=\Sigma_{k=1}^n W^*X_{ik} \quad (5)$$

$$Y_i=\Sigma_{k=1}^n W_k Y_{ik} \quad (6)$$

$$Z=\Sigma_{k=1}^n w_k(x_{2k}^2+y_{2k}^2) \quad (7)$$

$$W=\Sigma_{k=1}^n w_k \quad (8)$$

$$C_1=\Sigma_{k=1}^n w_k(x_{1k}x_{2k}+y_{1k}y_{2k}) \quad (9)$$

$$C_2=\Sigma_{k=1}^n w_k(y_{1k}x_{2k}-x_{1k}y_{2k}) \quad (10)$$

After getting the rotation angle $\theta$, scale Sc and the displacement$(t_x, t_y)$, then the training sets can be updated by $$S_i=M(Sc,\theta)[S_i]+(t_x,t_y,t_x,t_y,\ldots,t_x,t_y) \quad (11)$$

where i=1,2, ... N.

The principal component analysis: After alignment to the face images in the training set, the statistical rule for the shape change can be found by using the PCA (Principal Component Analysis) method.

Calculate the Average Shape:

$$\overline{S}=\frac{1}{N}\sum_{i=1}^N \tilde{S}_i \quad (12)$$

Calculate the Covariance Matrix:

$$Cov=\frac{1}{N-1}\sum_{i=1}^N(\tilde{S}_i-\overline{S})(\tilde{S}_i-\overline{S})^T \quad (13)$$

Find out the eigenvalue $\lambda$ and the eigenvector p of the Cov, choose the largest r eigenvalues $[\lambda_1, \lambda_2, \ldots \lambda_r]$ such that.

$$\frac{\sum_{i=1}^r \lambda_i}{\sum \lambda_i} \geq \eta \quad (14)$$

Choose the eigenvectors $P=[p_1, p_2, \ldots, p_r]$ corresponding to the largest r eigenvalues, the statistical model of the training set can be obtained by:

$$S=\overline{S}+Pb \quad (15)$$

Gray Matching and Color Matching: The average shape model approximately expresses the target object, the optimal matching points are obtained by calculating Markovian, and then the various parameters can be updated by $$db=P^T dx \quad (16)$$

where dx is the displacement, db is the change of shape parameter.

In one embodiment, the former z points, whose gray value is the most similar to the i-th feature point of the j-th image in the area with this feature point as the center and the distance being d. Take d=2, z=9 for example.

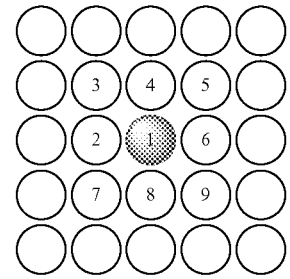

where the red point is the i-th feature point of the j-th image. The positions of the nine points marked above are just assumed points.

Calculate the mean gray value of these z points, marked as dgij. We know there are m feature points in each image, the gray information set dgj of the j-th image could be regained.

$$dg_j=[dg_{1j},\ldots dg_{ij},\ldots dg_{mj}]^T \quad (17)$$

where j$\in\{1,2,\ldots,N\}\}$, is the number of the training images.

Get the gray value for the feature points of each image projecting in the target image, so the gray matrix could be gained.

$$G=[g_1,\ldots,g_j,\ldots g_N] \quad (18)$$

where $g_j$ is the gray vector of the characteristic points of the j-th training image projecting in the target image.

If the target image shape model is very close to some image shape model in the training set, the Euclidean distance will be small. In order to find the most similar image to the target image, it is only needed to solve the following problem.

$$i_0 = \arg_j \min((dg_j - g_j)^T (dg_j - g_j)) \quad (19)$$

The $i_0$-th image gotten in the formula (19) is the most similar image. In one embodiment the $i_0$-th image is taken as the approximate expression to the target image.

As a non-limiting example the ASM model used is determined from a number of training sets, and the number of landmarks chosen is in accordance with the processing that is required to create the 3D model or avatar form a 2D photo. As a non-limiting example, starting from a 2D photo, 93 landmarks identifying face characteristics are utilized in an image interpretation phase. It will be appreciated the 93 landmarks are only one number of suitable landmarks and that other landmark numbers can be used. These landmarks are special points placed by ASM in correspondence to a typical characteristic and will be described in more detail below. For purposes of the present invention a set of these landmarks is called an ASHAPE. At the end of this step, the model is bi-dimensional and cannot be animated, deformed, shaped. ASHAPE is the starting point for the next step.

It will be appreciated that the present invention is not limited to the use of 93 landmarks for the ASHAPE, but any suitable number can be used in accordance with the desired resolution and processing power required to provide the transformation from the 2D photo to the 3D model or avatar whilst providing a fast response time and hence good user experience.

The next step is to create the 3D model, step 940. During this step, the client creates the LP using a "low-mesh" 3D prototype. A "low-mesh" 3D model is a model created using a small number of shapes to minimize hardware requirements, for example, triangles. This prototype is called the LP general model (LPGM). Using the LPGM, face-tracked characteristics are fitted within the wireframe (step 950), that is, the 3D model without applied texture which appears to be made of wired frames, of the LPGM. This is done by matching some key points of the LPGM with points representing the facial characteristics, which as a non-limiting example can be 93 points, the ASHAPE. All the other points are interpolated. This is described in more detail below with reference to, FIG. 14.

As mentioned above, as a non-limiting example the shape used to create an LP can be made using the 93 landmarks which are grouped together to represent human or animal facial characteristics. In particular, landmarks 0 to 4 represent the front, landmarks 5 to 19 the face geometric outline, landmarks 20 to 25 the right eyebrow, landmarks 26 to 31 the left eyebrow, landmarks 32 to 39 the left eye, landmarks 40 to 42 the bottom left eyelid, landmarks 43 to 45 the left eyelid, landmarks 46 to 53 the right eye, landmarks 54 to 56 the bottom right eyelid, landmarks 57 to 59 the right eyelid, landmarks 60 to 70 the nose, and landmarks 71 to 92 the mouth.

During this step, ASM is applied to the input image and the client finds all the 93 landmarks to identify the face characteristics of the user. As shown in, FIGS. 13(*a*)-(*c*), this step is represented in the image by the points connected by the lines. At (*a*), the ASM is applied to the image and then manipulated as shown as (*b*) until the ASM substantially matches the face as shown at (*c*). The line 1120 (FIG. 11) shows another example of the ASM.

The ASHAPE does not represent a 3D model, but a 2D model made of points, Pi, for each point in the shape, with coordinates (X,Y) on the plane as defined by:

$$Pi = (X_i, Y_i)$$

where X is the abscissa, and y the ordinate.

As mentioned above, ASHAPE is defined as the set of points or landmarks, as a non-limiting example 93 point, which result from the ASM algorithm. Each point is represented by coordinates P(x, y) having origin in the top left side of the related image. To complete the process of creating an LP, one more step is needed where all 93 landmarks are used to fit a previously generated 3D model to the face.

In order to switch from a 2D model to the desired 3D model, a generic 3D deformable model is needed. Such a model is then modified to fit the face by moving some points of the 3D model to match with the points of the 2D model.

As the 3D model contains many more points of two-dimensional positions defined in ASHAPE, the positions of the remaining points are determined by linear interpolation in order to maintain the morphology of the face.

Figure 3:
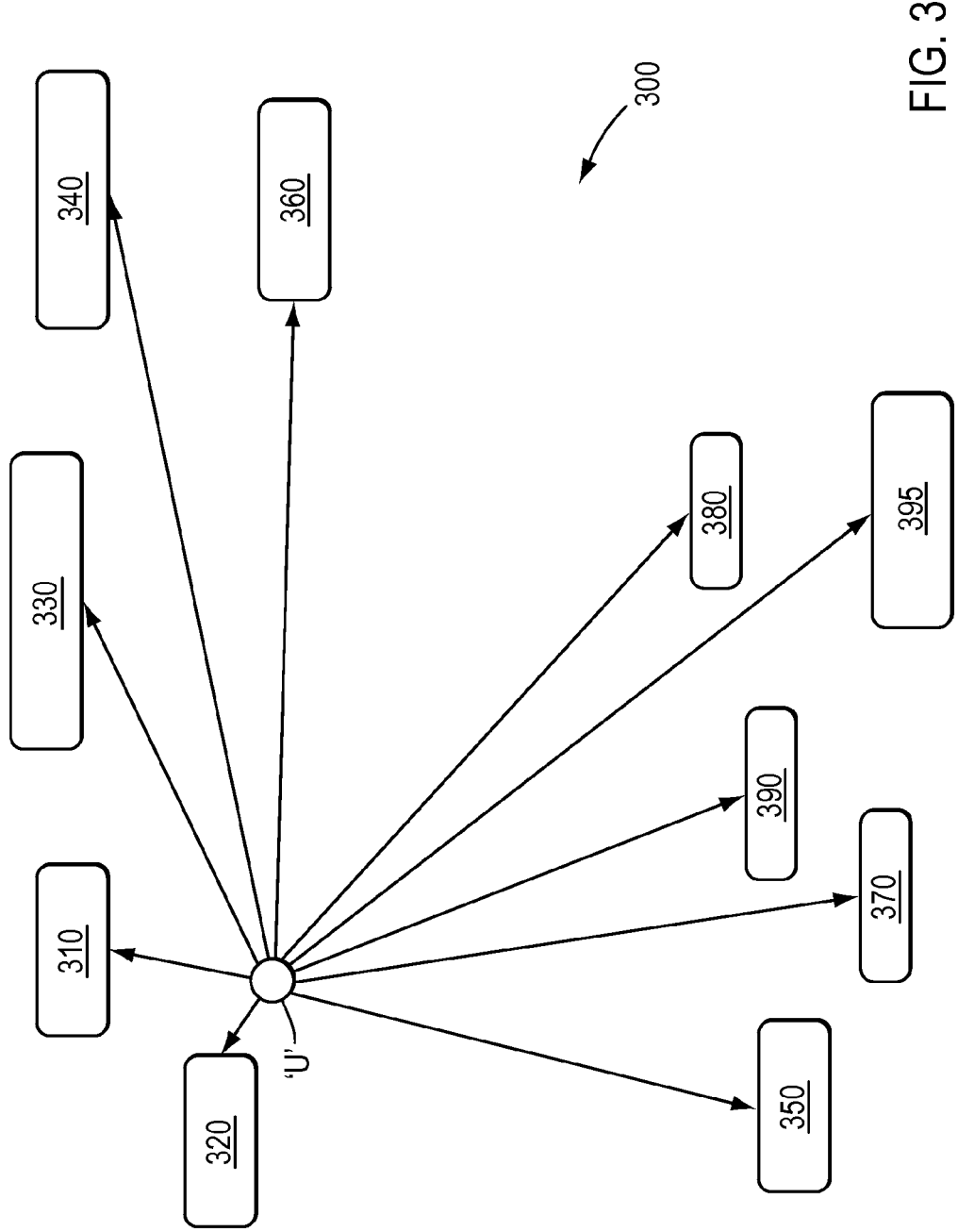
FIG. 3 illustrates high functionality built into a "cloud client" in accordance with one embodiment of the present invention.

FIG. 3 illustrates high level functionality built into a 3DoM® cloud or mobile device client 300. The user V has access to an activity browser module 310, access to a profile manager module 320, the ability to create a LP 330, the ability to play with his LP 340, access to a credit manager module 350, and access to social networking module 360. In addition, the user also has the ability to shop, block 370, and play games, block 380, and can access in app advertising, block 390. Access to an alerter, block 395, is also provided.

The activity browser module 310 allows the user to navigate through activities including but not limited to: received messages, received/sent 3me, and credit status and so on. The activity browser module 310 works like an interactive log under the responsibility of the user and only the user is capable of managing it. The profile manager module 320 provides a facility that allows the user to manage his/her 3DoM profile. Using the profile manager module 320, the user is able to enter the social network accounts that he/she wants to use, manage his/her privacy settings, enter personal data and so on.

When creating an LP 330, the user can use an image containing his/her face. This module can connect to the Network Systems to look for a photo using for instance Google® image or to get photos from the social network user profile. This feature may vary from client to client depending on the target platform. If the target platform is an "in app LP engine", that is, the application is provided with the full set of APIs and is therefore self-sufficient; avatars can be created locally without connecting to the Network Systems. If the target platform is "LP engine as service", a connection to the server is needed to create a LP as the application is not capable of creating avatars on its own. The LP, once created, is sent to the 3DoM® cloud or mobile device server. This is described in more detail below.

In module 340, the user can play with his LP or with the LP of friends.

Figure 2:
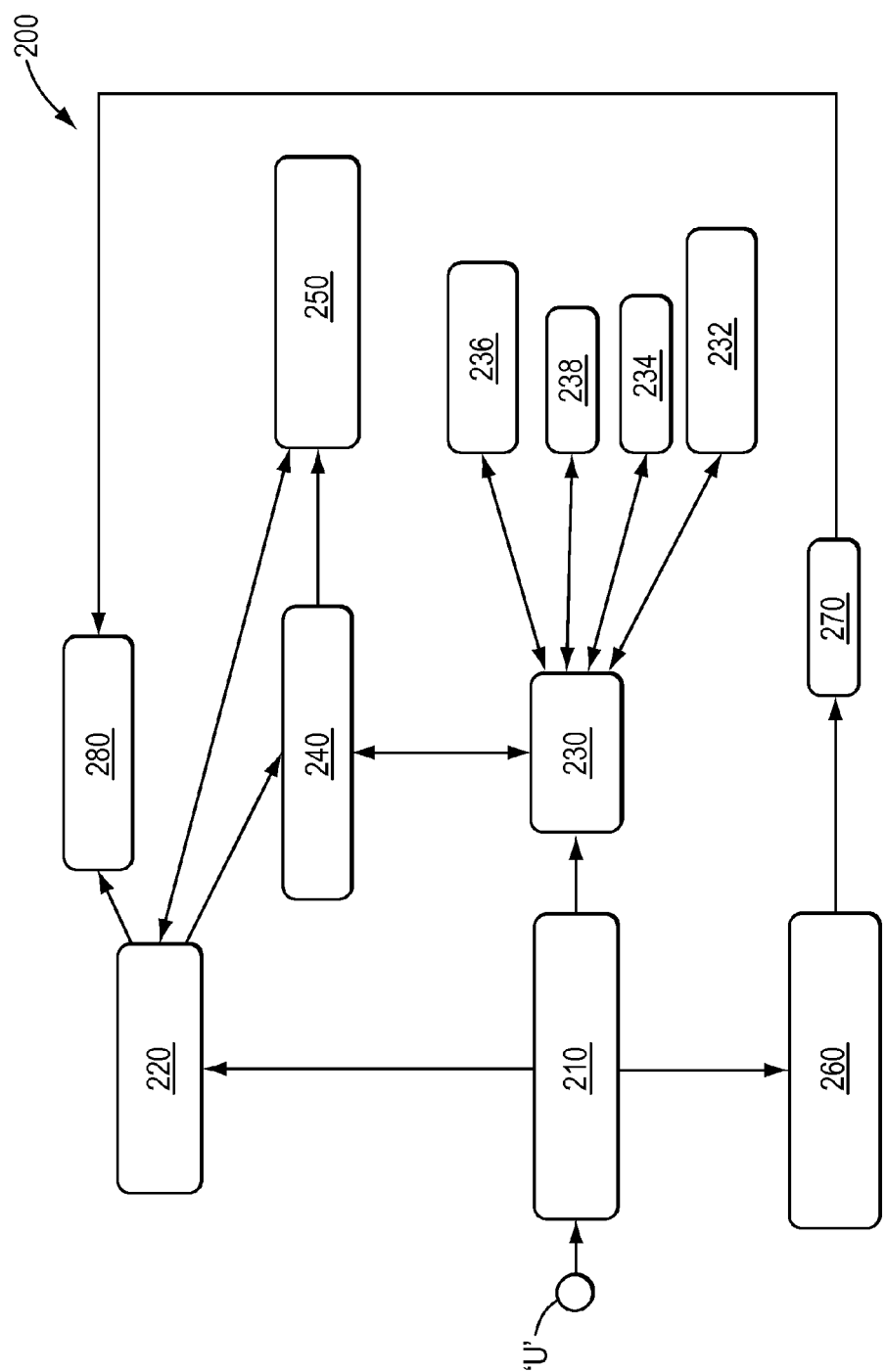
FIG. 2 illustrates a "life cycle" of a "living portrait" in accordance with one embodiment of the present invention.
Figure 4:
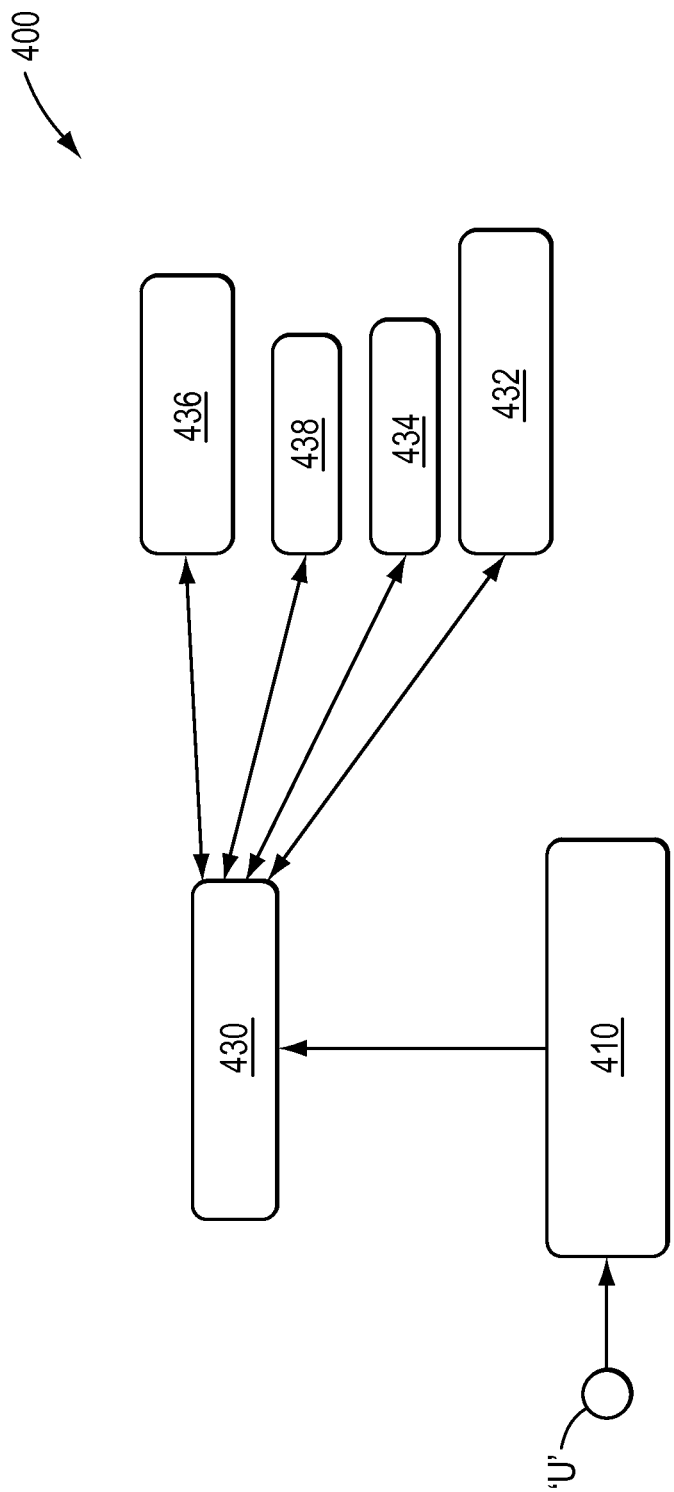
FIG. 4 illustrates options for a user playing with his "living portrait" in accordance with one embodiment of the present invention.

This is shown in more detail in, FIG. 4 which corresponds to part of FIG. 2. Elements that have been described with reference to FIG. 2 are similarly numbered but bear the prefix '4' instead of '2'. In sub-module 436, the user can customize his/her LP by adding apparels like hats, wigs, glasses or other kind of gadgets. Clothing, 3me® (or MoodEe®) and gadgets can be downloaded from the 3DoM® online shop. These may be charged to the user or may be free depending on the profile of the individual user. In sub-module 438, the user can change the make-up of the avatar.

In sub-module 434, the user can use expressions to create different moods. Here, the user can change the facial expression of his/her LP using a pre-compiled set of expressions. More precisely, a facial expression is defined as being a feature that shows an emotion and which lasts only a few seconds. For example, a smile appears almost instantly, but, in the next moment, the face is still smiling but not with the same intensity, and, a few seconds later, the face stops smiling. Changing the expression of the LP does not change its status on the cloud or mobile device server. This is because expressions are not uploaded to or modified through the cloud or mobile device in order to save resources and cost, for example, data bandwidth used and processing power. However, if sufficient data bandwidth and/or processing power can be made available at a reasonable cost to the user, expressions may also be uploaded to the 3DoM® Platform for sharing through the cloud or mobile device.

Expressions can be triggered by an external event, for example, a missed call, low battery, and the like.

In module 432, the mood of the LP can be changed. Moods are persistent and complex. They may be defined as a set of expressions, dress up, make up, and the like. This means that when the user changes his/her mood, his/her LP behaves accordingly. The mood is uploaded by the user's client device 124, FIG. 1(*b*), that connects and sends a message representing the mood update to the 3DoM® Platform hosted on third party provider 120, FIG. 1(*b*), (step 210), which allocates a resource 122, including but not limited to a CPU and memory, to process it, to log it with the Archive Component 144, FIG. 1(*e*). The 3DoM Platform notifies the user's client devices through an Interface Component 126, FIG. 1(*b*). If the users to be notified are not available (for instance the smartphone is switched off or not connected to a Network System), they will be notified the next time they connect to the 3DoM Platform. In one embodiment, some moods are simple, for example, displaying happiness, tiredness, boredom, angriness etc. or more complex, for example, "I'm a pirate" and "I feel like a zombie". All the client devices are preloaded with a default set of moods. The user also can create his/her own moods and upload them to the cloud or mobile device. This is described in more detail below.

Returning to FIG. 3, the credit manager module 350 allow a user to purchase apps etc. using a virtual currency, in this case, 3DoM® dollars (3DoM$). However, this may be amended in cases, such as, iPhone® applications, where the user can only use payment gateways through the Apple® on-Istore or other store associated with the mobile device. (Both iPhone® and Apple® are trademarks of the Apple Corporation.) Credit manager activities are shown in FIG. 5.

Figure 5:
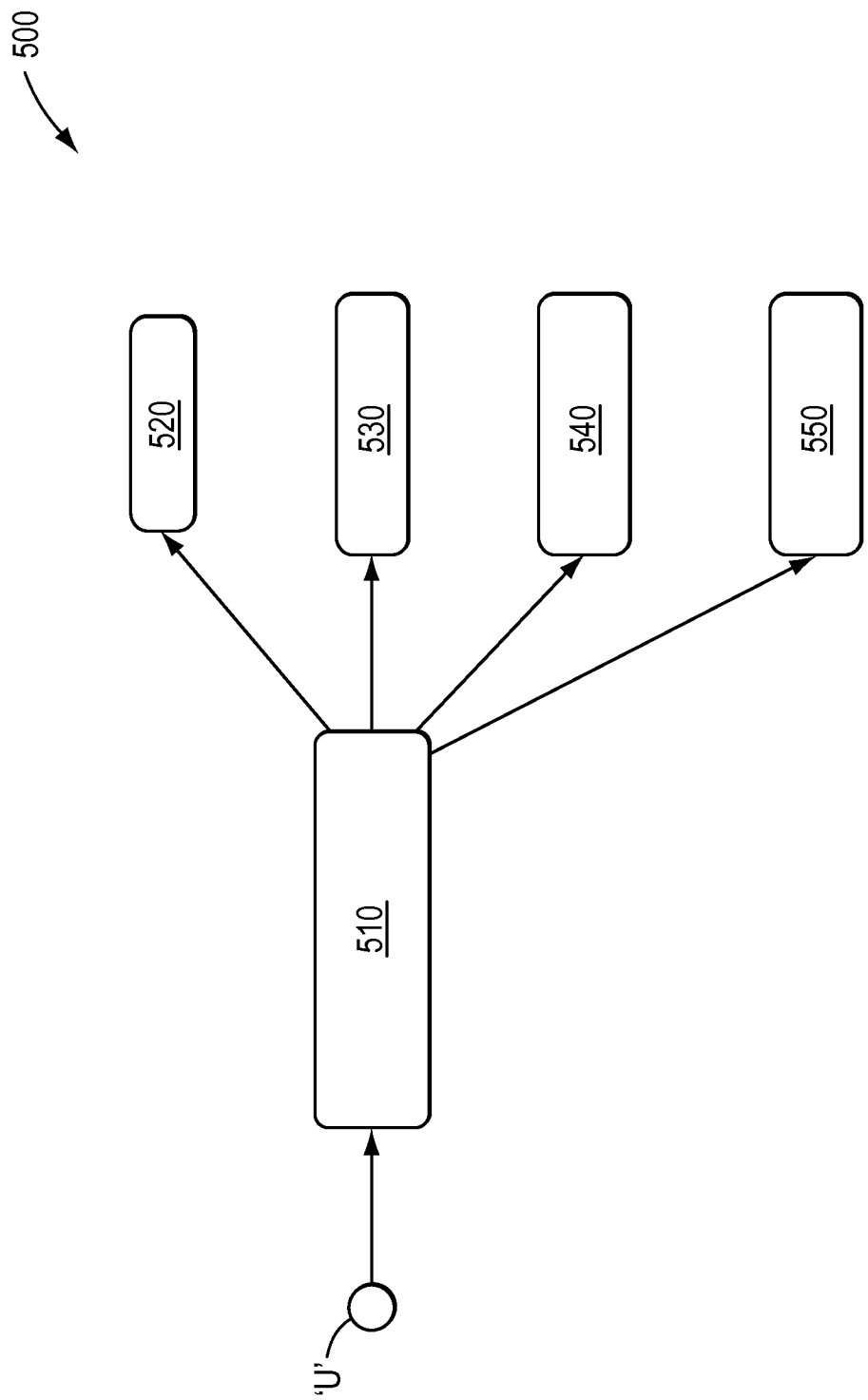
FIG. 5 illustrates a "credit manager" subsystem of one embodiment of the present invention.

In FIG. 5, a credit manager system 500 is shown. As described above, the user connects to 3DoM using his/her social network account, step 510. From there, he/she can get credits (step 520), manage credits (step 530), trade credits {step 540) and spend credits (step 550). Naturally, other options are also possible.

Figure 6:
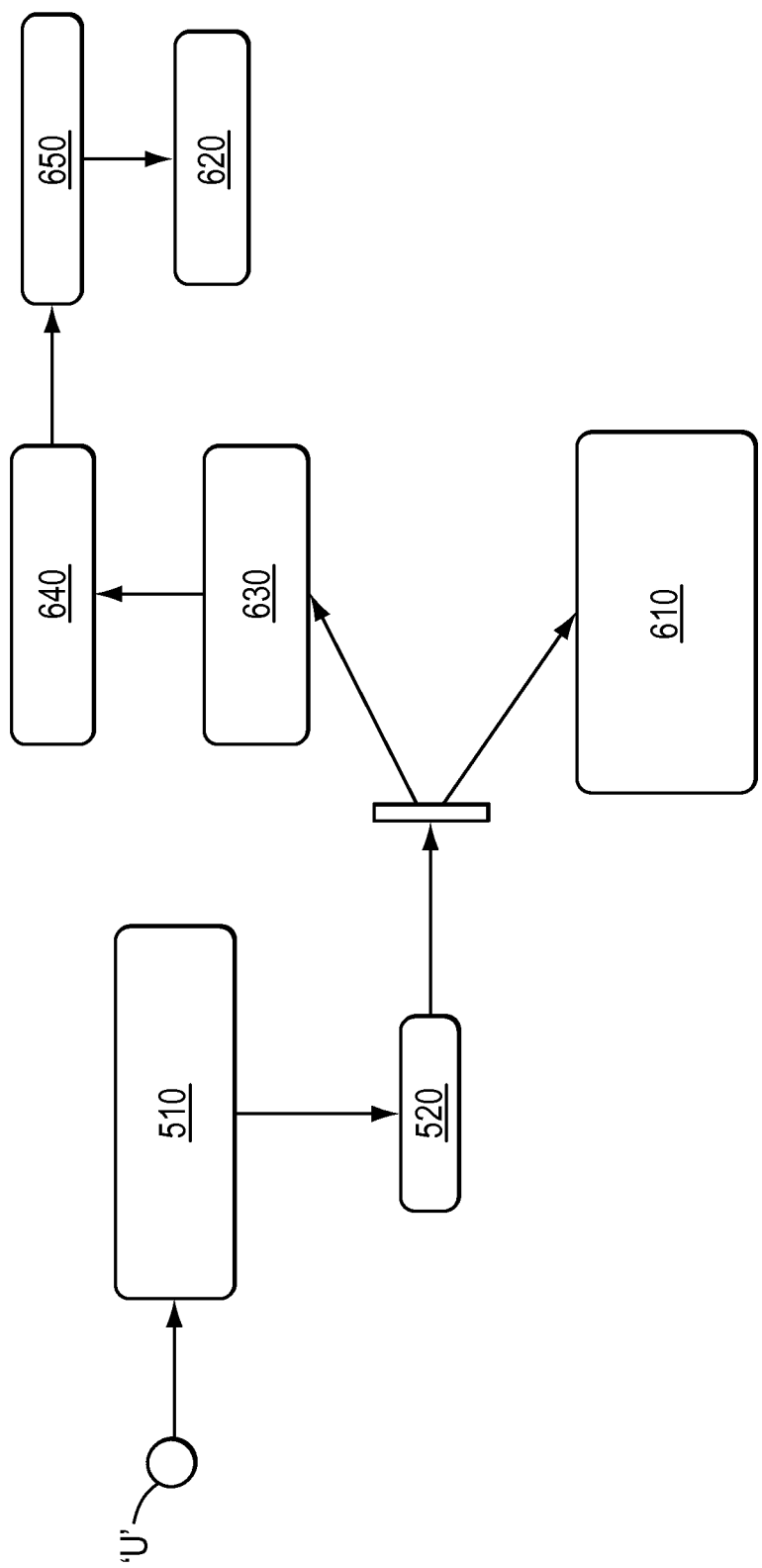
FIG. 6 illustrates a "get credits" subsystem in accordance with one embodiment of the present invention.

FIG. 6 illustrates the way to get credits in more detail. As described above elements that have previously described with reference to FIG. 5 have the same reference numerals. The user may obtain credits in many ways, but only two ways are shown as examples. Credits can be bought using real money (step 610), or can be awarded as rewards for activities conducted in the 3DoM® world (step 620). Such activities include: inviting friends to join 3DoM®, publishing invitation messages onto the social network, conducting advertising activities, etc. However, all activities conducted to get rewards follow predetermined rules and need to be verified. This means that all the rewarded activities are performed by the 3DoM® cloud or mobile device client and the user is guided to choose between the activities proposed by the system. A list of rewarded activities is provided by the system (step 630), the user selects one of the activities (step 640), and performs the activity (step 650) to get the rewards in step 620.

Returning to FIG. 5, a facility, manage credits (step 530), is provided to enable the user to check his/her credits, and to access his/her log of activities (spent credits, rewards, etc. etc.). Through this interface, the user has the ability to report potential fraud and/or unauthorized access to his/her account and/or use of his/her credits.

Another facility, trade credits (step 540), provides a way for a user to earn credits by "selling" self-created gadgets or moods so that they are loaded onto the store hosted on the 3DoM® Platform. Naturally, before such items are loaded onto the 3DoM® Platform, they would need to be tested to determine their usefulness. This potentially has several advantages. For example, the most creative users are retained, the number of gadgets and moods available on the system are increased, and third party companies are rewarded for creating products for the 3DoM® Platform.

Similarly, spend credits (step 550) allow the user to spend his/her credits by buying gadgets, 3me, new moods and so on.

As described above, the 3DoM® Platform of the present invention does not substitute already existing social networks. The present invention integrates seamlessly with such networks through the user's social graph, which is accessible via an application programming interface (API) provided by the referenced platform. This has many advantages including: instant access to connected users, access to user data (in accordance with privacy rules set by the user), letting social networks manage their users' graphs, and the opportunity to be more effective during a marketing campaign. As a non-limiting example, using the social graph provided by the social networks means cost saving when storing user data onto the 3DoM® cloud or mobile device servers.

Figure 7:
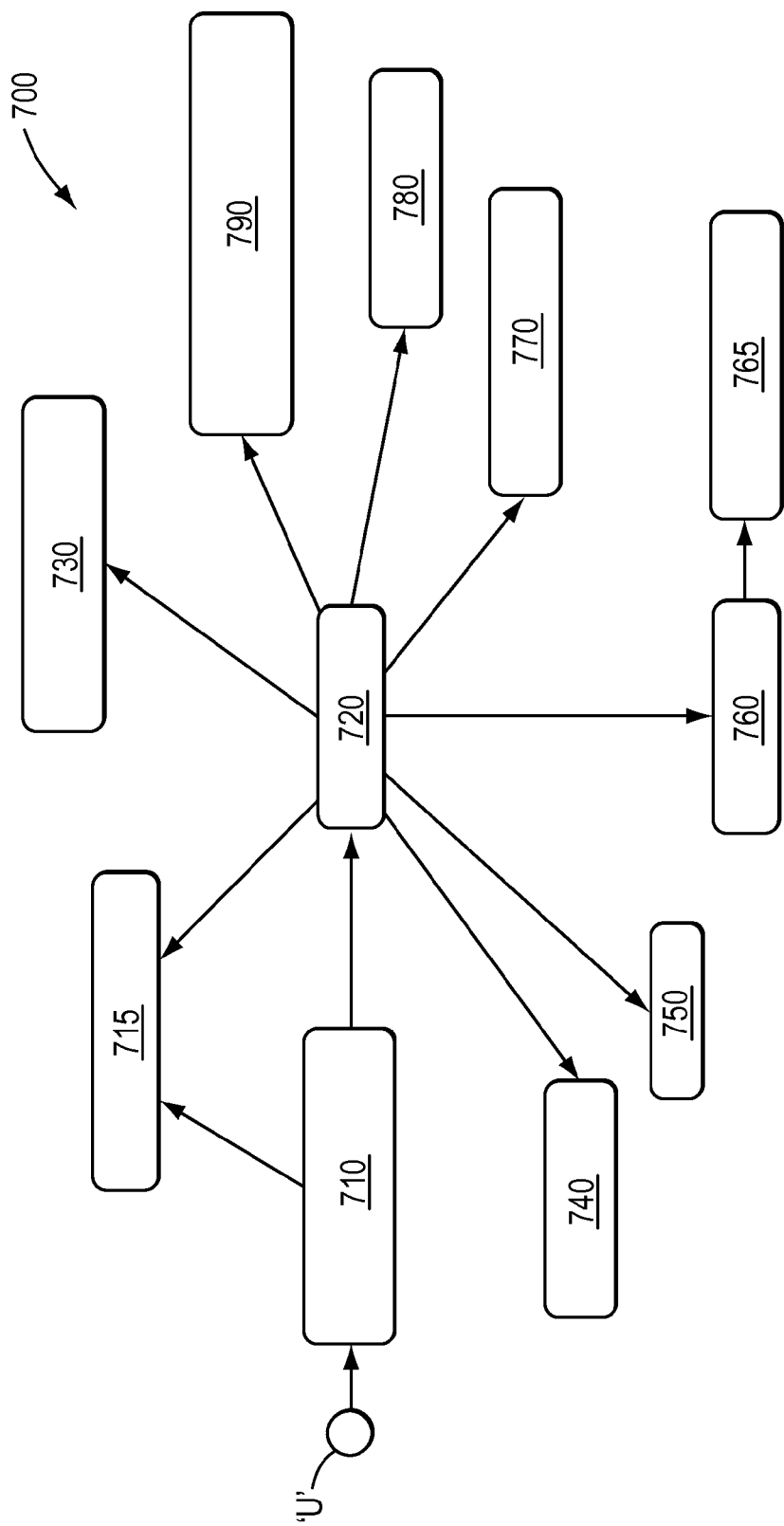
FIG. 7 illustrates a social networking activity diagram in accordance with one embodiment of the present invention.

FIG. 7 illustrates a social networking activity diagram 700 which illustrates the activities for which the social networking module is responsible. As before, the user 'U' connects to the 3DoM® Platform using his/her social network account 720 and, after user authentication, step 715, has access to various activities as shown. User authentication, step 715, is responsible for performing user authentication for the 3DoM Platform through his/her social network accounts. This allows the user to connect to one or more social networks using account data he/she provides. All the user account data is stored on the 3DoM® cloud or mobile device server database to allow the 3DoM® Platform to share all the authentication information between the user clients.

One critical module is cross social network integration as indicated by 730. Cross integration between social networks does not mean that the 3DoM® Platform fuses different social graphs from different social networks, but provides high level interfaces to implement cross social networks functionality and to provide a set of functionalities that can be used by all client modules. A social graph for an individual on a social network or networking site refers to that individual and his/her associated connections. The operation of this module is described in more detail below with reference to FIG. 8.

Sharing of LP facility, block 740, is the core of the 3DoM® Platform sharing of emotions as all the other functionality elements rely upon the possibility of sharing moods and emotions of the LP with connected friends through the 3DoM® cloud or mobile device server. This is described in more detail below.

In a "send 3me®" module 750, a virtual object is sent to catch the attention of the LP of a recipient. To do this, the client device 124, FIG. 1(b), sends a message containing the 3me to the 3DoM platform hosted by third party service provider 120 who allocates a resource 122, including but not limited to a CPU and memory, including but not limited to a CPU and memory, to process it The sending of the 3me is then logged in a log file managed by the archive component 144, FIG. 1(e), and sends the 3me to the recipient through an interface component 126, FIG. 1(b). Depending on the embodiment, some 3me require explicit acceptance by the recipient, in which case the acceptance of the 3me is notified by the recipient client device to the 3DoM Platform and the acceptance is logged as before.

3me® (or MoodEe®) are complex objects which can be purchased from the store, and produce effects that are applied to the LPs. As non-limiting examples, a 3me® (or MoodEe®) can be a kiss, a slap, a wasp bite, a glass of a drink, a flower bouquet, etc. In addition, a 3me® (or MoodEe®) can contain a text which is composed at the moment of sending the 3me® (or MoodEe®) or which is already available. When the user receives a 3me® (or MoodEe®), the client notifies him/her and asks the user if the 3me® (or MoodEe®) is accepted or not. If the 3me® (or MoodEe®) is accepted, a message is sent to the sender and the 3me is stored locally. 3me (or MoodEe®) (always in singular, just like SMS) can be used to provide emotions to friends by animating their LP and delivering text messages to them.

Upon receipt of the 3me® (or MoodEe®), the LP of the recipient can display one or more of, as non-limiting examples: a facial expression for example, a smile, surprise, sadness, and the like; skin textures, for example, stamping red lips on the face for a kiss; greening of the skin for a bite by a wasp; bruising the skin for a slap etc.; a graphical display of the object forming the 3me® (or MoodEe®); and a text message which is displayed on the screen. If the receiver accepts the 3me® (or MoodEe®), the user is offered the possibility of sending back a message with an included expression to notify the sender of his/her feelings on receipt of the accepted 3me(or MoodEe). If the 3me® (or MoodEe®) is refused, a message is sent to the sender and the 3me® (or MoodEe®) is deleted from the receiver client.

Module 760 allows the user to get LPs of his/her friends. As described above, the 3DoM Platform introduces new ways to communicate with friends through the cloud or mobile device using social networks. A 3DoM® user stays connected with his/her friends through their LP. This feature allows the user to be able to check the moods of his/her friends, to be notified about the change in the mood of a friend, to communicate with connected friends, and to play with the LP of friends as shown by module 765. This kind of connection can be done by navigating the "social graph" of the social network used to connect to the service.

In module 770, messages can be sent to friends. This provides the possibility to share moods and expressions with them and to introduce a new way to communicate with connected friends. Using the 3DoM® Platform, the user can send a message to a friend as part of a 3me® (or MoodEe®) which includes his/her feelings when writing the content. In this way, an LP can now become an advanced version of an emoticon making the user able to "virtually" understand the mood of the message sender. The message being sent as part of a 3me® (or MoodEe®) may be displayed in an original way, such as, a bubble spoken by the LP like in comic books, or a text-to-speech conversion using a third party technology, etc. 3me® (or MoodEe®) with messages can be considered to be an evolution of the combination of SMS and emoticons.

3me® (or MoodEe®) objects may fall within one of three categories: those that are free; those that are charged; and those that are sponsored. Sponsored 3me® (or MoodEe®) will be freely available for the users sending them, as they will be sponsored by companies doing advertising campaigns, for example, a glass of vodka, sponsored by Smirnoff® or a chocolate bar sponsored by Cote d'Or®. Smirnoff® is a trademark of the Diageo plc, and Cote d'Or® is a trademark of Kraft Foods. The recipient of the 3me® (or MoodEe®) will see a fun animation of expressions on his/her LP relating to the object and will be able to receive a real version of that object in a participating store or bar.

Through the 3DoM® client, the user can change his profile photo on his social network, module 780. As an example, a user can change the expression of his LP or the dressing of the LP, and then can substitute the social network profile photo with a new one representing a snapshot of the LP. At each moment, the user can share his mood by changing the social network profile photo according to his/her feelings at that moment.

Figure 1B:
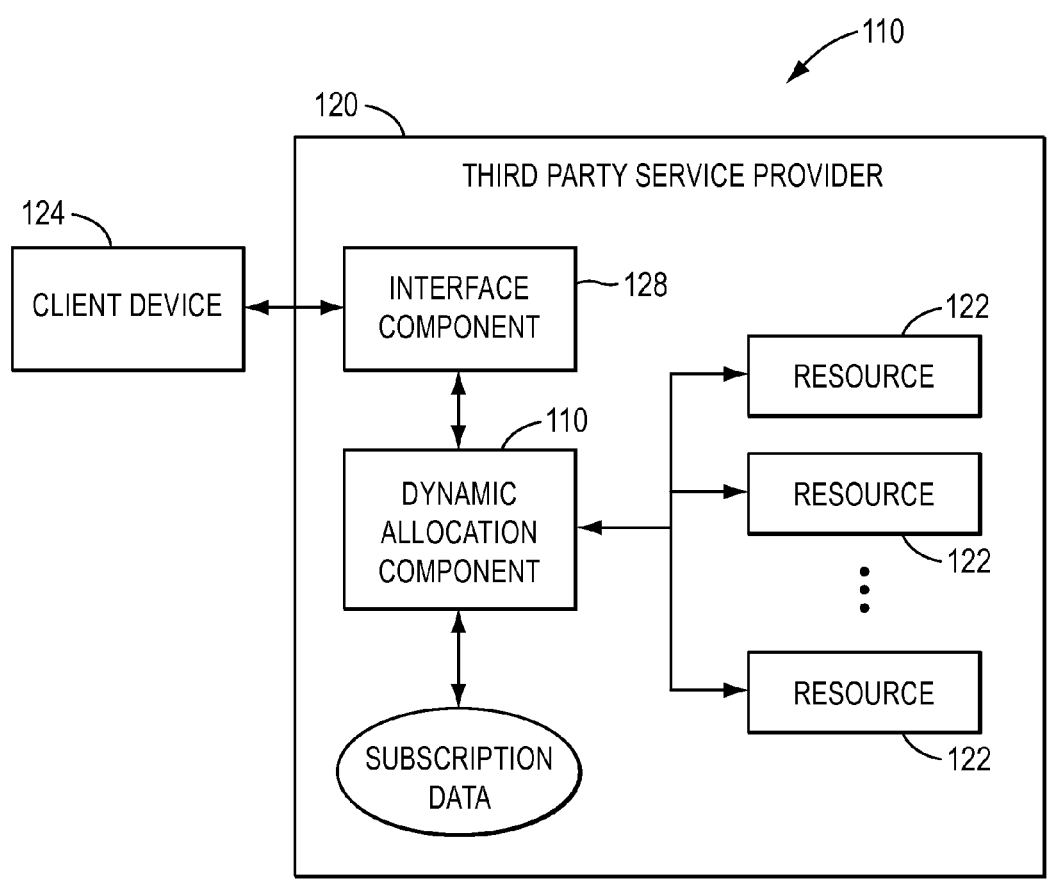
Figure 1C:
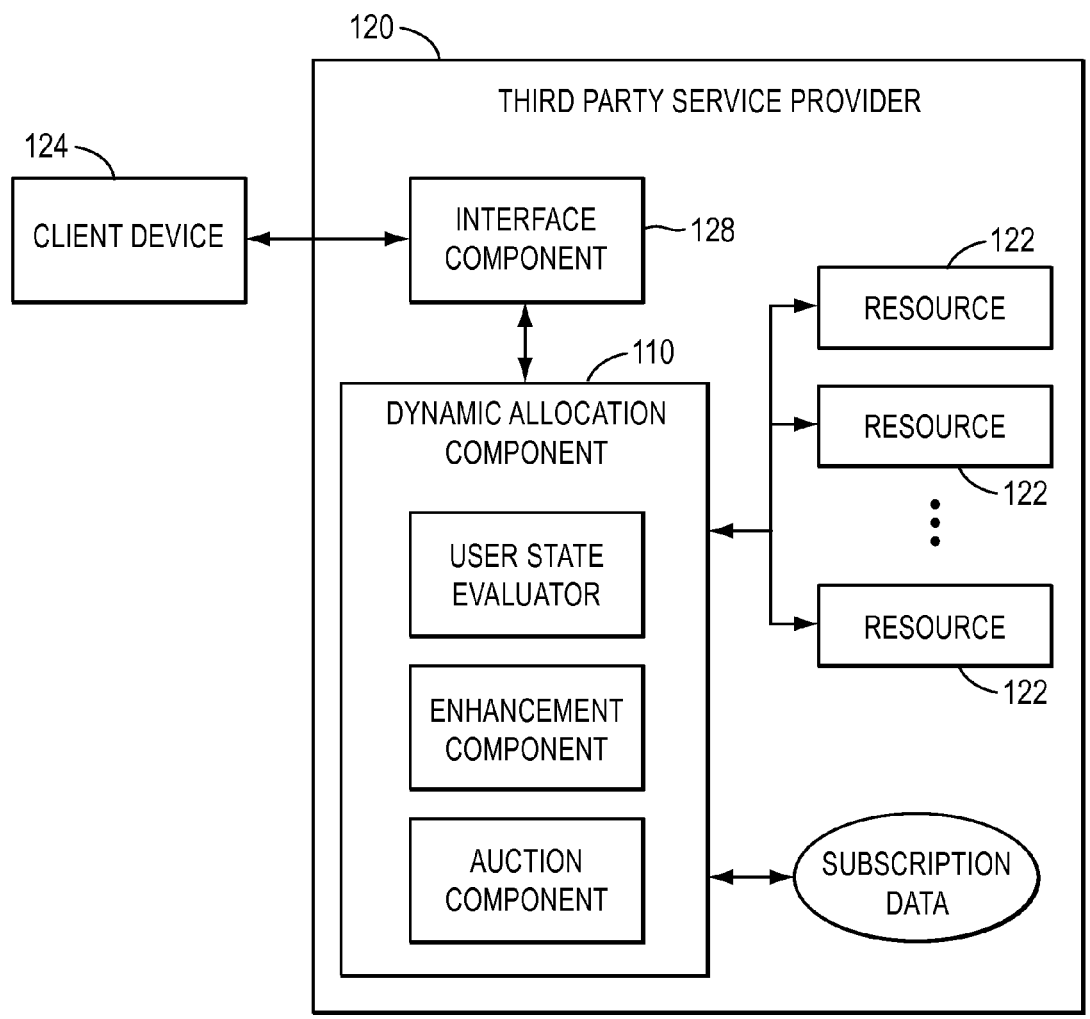
Figure 1D:
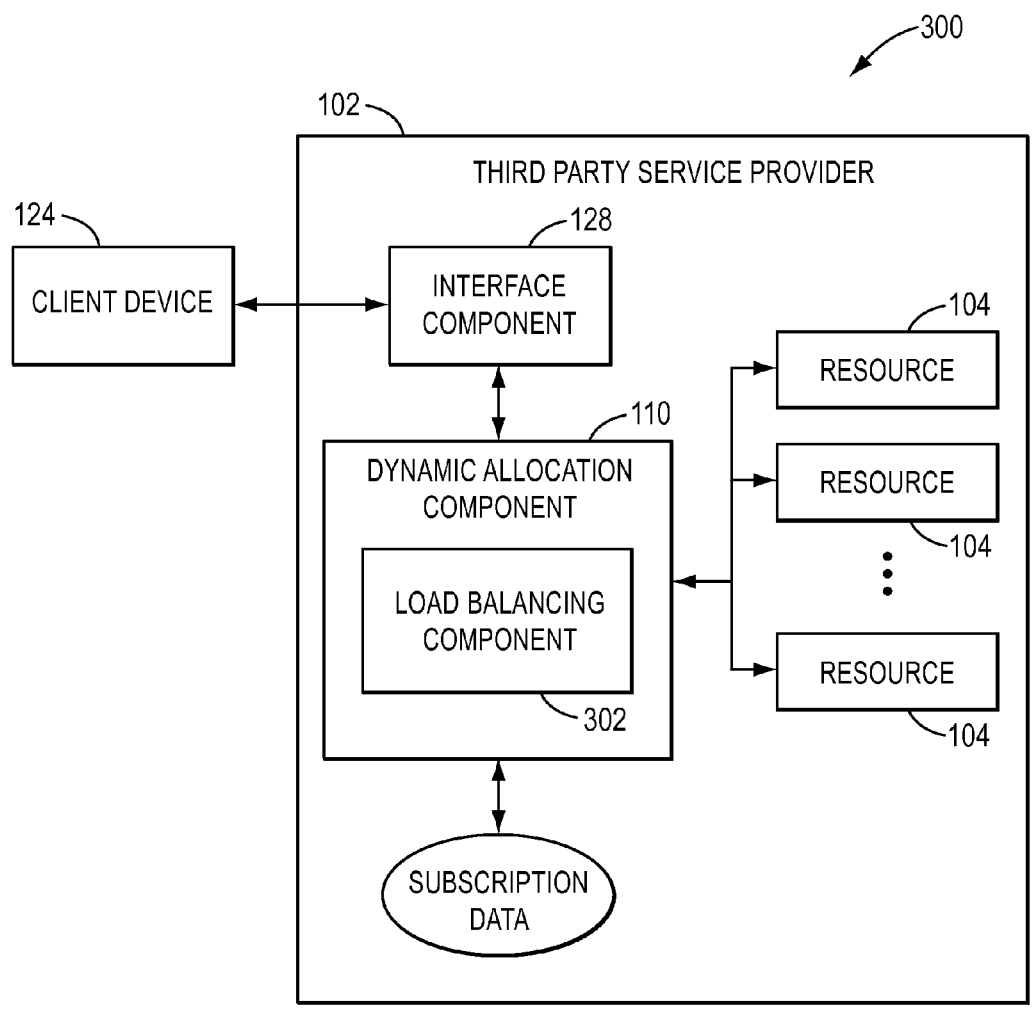

To perform this, the user's client device 124, FIG. 1(b), connects and sends a message representing the request to update his profile picture on a given social network to the 3DoM® Platform hosted on third party provider 120, FIG. 1(b), (step 210), which allocates a resource 122, including but not limited to a CPU and memory, to process it. The 3DoM Platform connects to the Social Network on behalf of the user through that social network API and an Interface Component 126, FIG. 1(b), to perform the request. The 3DoM Platform notifies the user back of the success or otherwise of the request through and an Interface Component 126, FIG. 1(b), and logs it with the Archive Component 144 FIG. 1(e).

Also through the 3DoM® client, the user can publish his/her LP directly on his/her social network page/wall with a comment, module 790. Depending on the construction of the social network page/wall, the 3D LP may be converted to a 2D representation thereof. This publication follows similar steps involving the user client device, the 3DoM Platform and the Interface Component.

Figure 8:
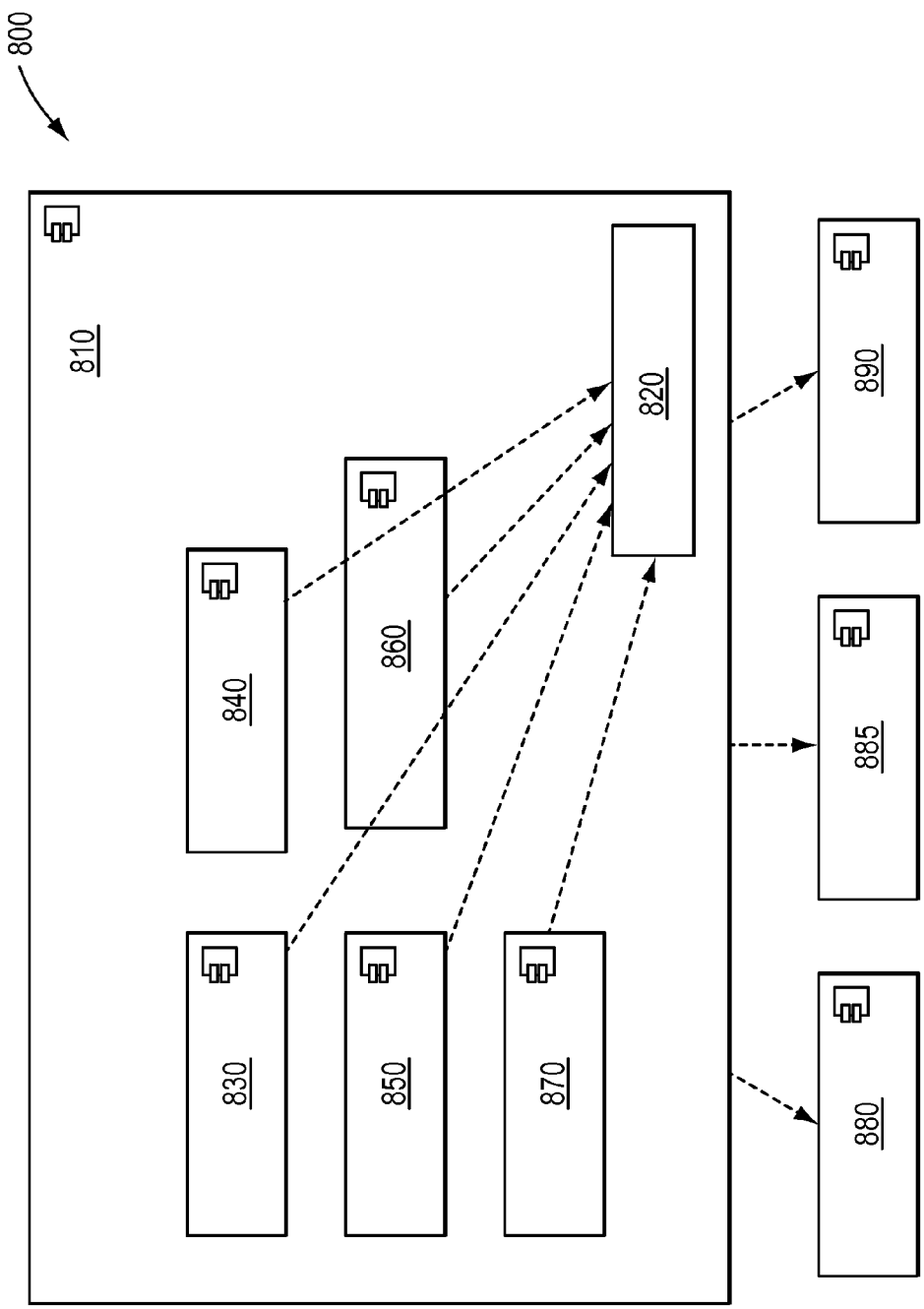
FIG. 8 illustrates cross-social network integration in accordance with one embodiment of the present invention.

FIG. 8 illustrates an interface module 800 for cross social network integration. The interface module 800 comprises a cross network platform 810 with a plurality of programming interfaces 820 that connect to respective ones of functions 830, 840, 850, 860, 870 on the platform 810. Such functions include but are not limited to, authentication, sending messages, publishing photos, changing profile photo and various other functions. The network platform 810 also interfaces with the associated APIs 880, 885, 890 of the social networking sites, such as, Facebook®, Twitter®, Google+® and LinkedIn®. LinkedIn® is a business-related social networking site.

Advertising is one of the sources of revenue for any social networking site and the 3DoM Platform is no exception. A dedicated module manages advertising inside the client. A dedicated library provides the ability to display advertising that takes advantage of all the user information so that the most relevant advertising can be selected for display. The mood of a user may significantly influence his/her receptiveness to an advertisement of a given product or service. Knowing that a user is happy, hungry, thirsty, hot or cold could be an indication that he/she may well be disposed to receiving an appropriate advertising message. The 3DoM® platform is aware of the mood of its users and of their changes in near real-time as the client devices 124, FIG. 1(*b*), send messages with information about LP mood and other updates (such as accessories used by the LP, etc.) to the 3DoM Platform hosted by a Third Party Service Provider 120, FIG. 1(*b*). Such information is processed by allocating resource 122, including but not limited to a CPU and memory. This information is stored in a local Data Store 146, FIG. 1(*e*).

The 3DoM® platform makes information relating to the mood of its users available to third parties such as advertisers and information providers through a dedicated library (API) which will offer a unique targeting system: ads and more generally information such as news will be selected based on people's mood. Users of 3DoM will also be able, through the setting of personal preferences, to opt in & out of different types of advertising and news, or of all information altogether.

Third Party advertisers and other content providers (from now on Content Provider) may, provided that they have a commercial agreement with MoodMe, connect with the 3DoM Platform through an API and an Interface Component 126, FIG. 1(*b*), to request information about Users who had a specific Mood at a very recent moment or other characteristics as specified by the Content Provider. These requests are processed by allocating resources 122, including but not limited to a CPU and memory, they are logged in the Archive Component 144 (FIG. 1(*e*)) and the information requested is sent back to the Content Provider. Content Providers may submit content (advertising or other) to MoodMe users who match the Mood state or other characteristics through the API and the Interface Component 126, FIG. 1(*b*). The 3DoM Platform will retarget the content to the users' client device 124, FIG. 1(*b*), through the Interface Component 126, FIG. 1(*b*). It will also log this in the Archive Component 144 (FIG. 1(*e*)) and will compute billing elements to charge the Content Provider for the service.

In one embodiment, the creation of an LP requires the ability to transform a two-dimensional (2D) human or animal portrait into a 3D deformable model.

Figure 9:
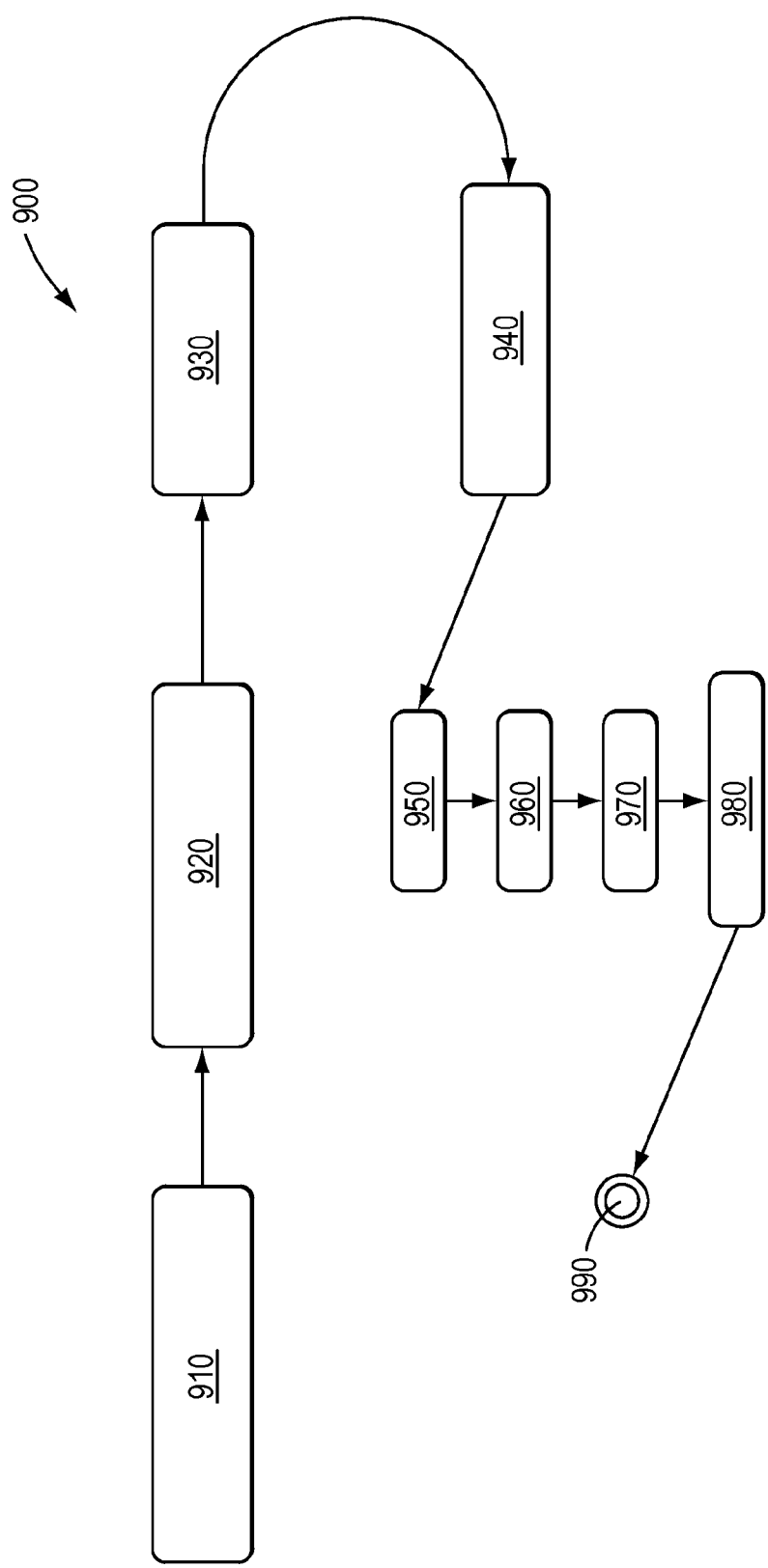
FIG. 9 illustrates the steps in creating a 3D face model in accordance with one embodiment of the present invention.

FIG. 9 illustrates a flow chart 900 of the steps required to create a 3D face model from a 2D image of a human or animal face thereby creating a LP. The first step is image acquisition and digital elaboration, step 910. Here, the client acquires images from different sources. If needed, the algorithm applies image filters to enhance the image quality (not shown). The next step is to search for a human or animal face inside the image, step 920, and the client restricts the operation of the next step of the algorithm by finding an area containing a human or animal face. Once a human or animal face has been identified, a search for facial characteristics is carried out, step 930. The search is restricted to the previously detected area which contains a human or animal face. In particular, the algorithm looks for the following facial characteristics: front, eyes, eyebrows, eyelids, face geometric outline, nose and mouth. Each characteristic is then marked using a set of points, or landmarks, each landmark being uniquely identified by a number as will be described in more detail below. Marking can be used to find the points and can be achieved using the ASM algorithm.

Figure 10:
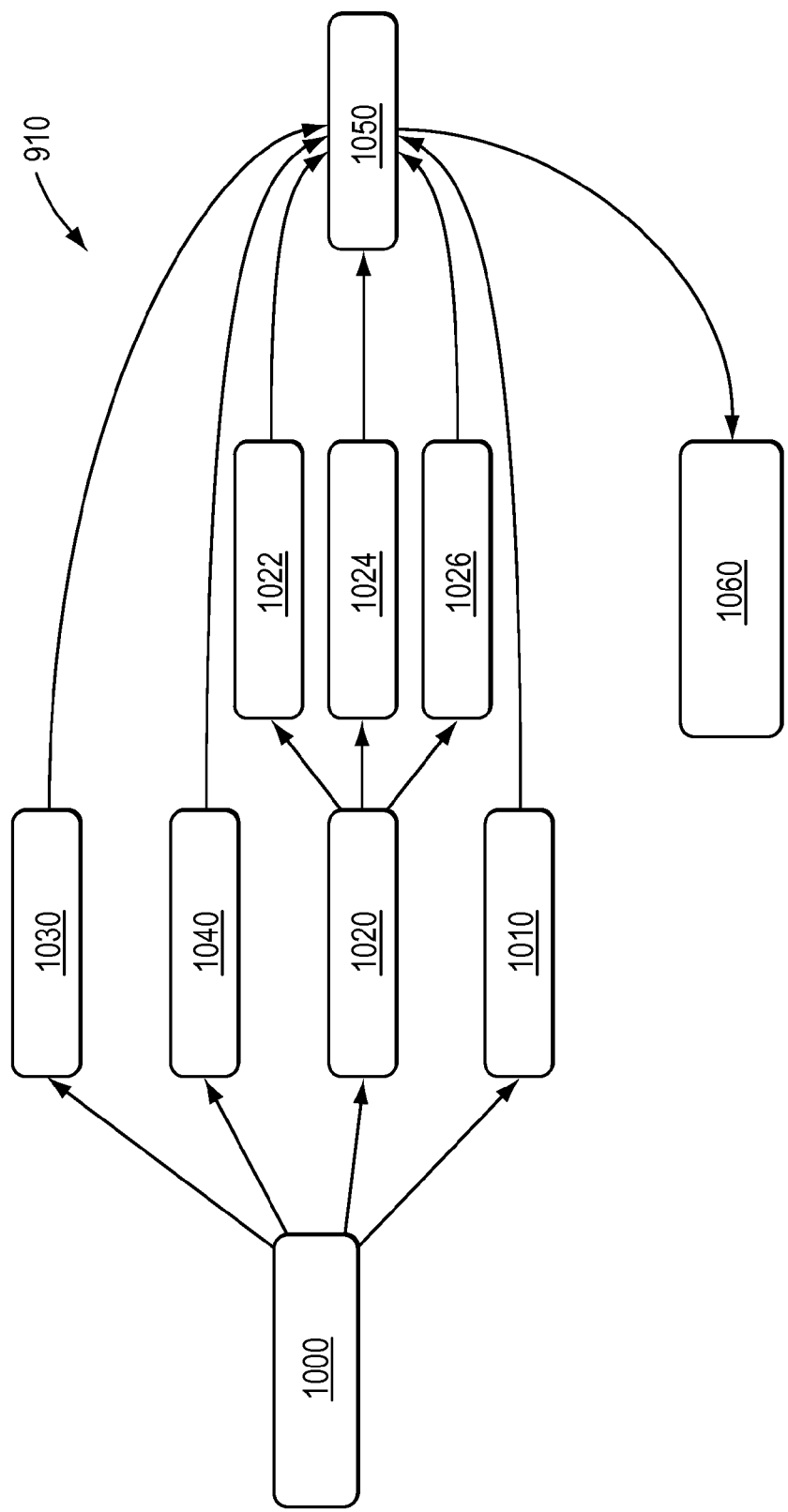
FIG. 10 illustrates one embodiment of the steps in acquiring a source image for creating the 3D face model in FIG. 9.

In FIG. 10, the image acquisition and digital elaboration step 910 is shown in more detail. For the first step (step 1000), the user acquires a photo. As non-limiting examples, this can be done using a webcam (step 1010), searching onto the Network Systems (step 1020) or simply navigating into the mobile handset image gallery (step 1030). Alternatively, the photo can be uploaded from a local file system (step 1040).

When using the Network Systems as the photo source, the photo can be loaded from a social media site, including but not limited to Facebook® (step 1022), from a Google® search (step 1024) or by inserting an image URL (step 1026). To support this phase, the application may select only photos that contain a human or animal face seen substantially from the front, or "face-on". However, it may also be possible to select a photo from a slight angle to either side from the "face-on" position.

During loading of the photo, the application automatically applies some image filters (step 1050) to enhance the quality of the photo. In one embodiment such filters are used to regulate image contrast or expand color gamma that is the range of the visible colors. The application of filters improves the result and enhances image quality, as well as precision, when creating an LP.

Histogram equalization is a method that is used in conventional image processing for adjusting image contrast of the original image. Gamma correction controls the overall brightness of an image. Images that are not properly corrected can look either bleached out or too dark. Trying to reproduce colors accurately also requires some knowledge of gamma. Varying the amount of gamma correction changes not only the brightness but also the ratios of red to green to blue. In one embodiment improving the quality of an image refers to working on the general parameters of brightness and contrast to enhance the image quality, and nothing can be done to create "information" if the image is low quality.

Before proceeding with the recognition of facial characteristics, step, 1060, a determination is made of an approximated area containing human or animal face and estimate the starting pose alignment. This can be achieved with the ASM algorithm disclosed herein. Good pose estimation provides a good starting point and allows the processor and memory that executes a processor and memory that executes software, including but not limited to algorithms, including but not limited to algorithms, to minimize resources used in the creation of the 3D model, for example, battery usage for mobile devices. This image area is generally called a region of interest (ROI). In FIG. 11, an image 1100 is shown in which the estimated area is represented by a rectangle 1110 which surrounds the points determined as facial characteristics 1120.

One embodiment of facial recognition is disclosed in U.S. No. 8,254,691, fully incorporated herein by reference.

The ROI may be automatically executed by the processor and memory that executes software, including but not limited to algorithms, using Haar like classifiers, a tool to determine if a determinate pattern may be found inside an image-squared region, or manually by the user. If done manually, as shown in FIG. 12, the user then moves, scales, and rotates the image using the icons on the toolbar 1130 until the face is aligned to a white shape 1140 used as guideline. A rectangle (not shown) containing the white shape 1140 becomes the ROI for the image.

Returning to FIG. 9, facial characteristics are determined in step 930, as described above. This step represents the core of the whole process of transforming a 2D image into a 3D model. The higher the accuracy achieved at this stage, the better the end result.

Figure 13C:
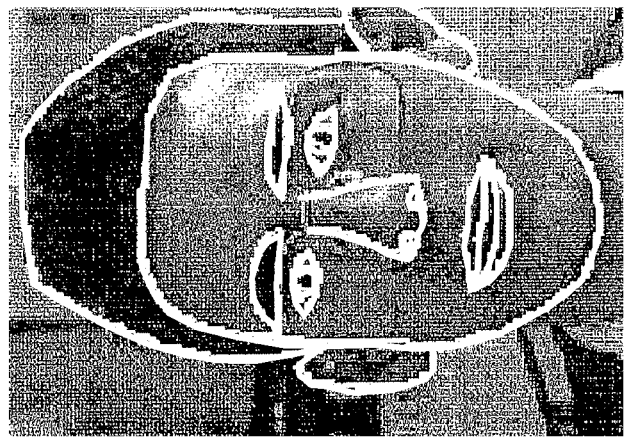
FIGS. 13(*a*)-(*c*) illustrates one embodiment of the process of fitting a model to a face inside an image.
Figure 13B:
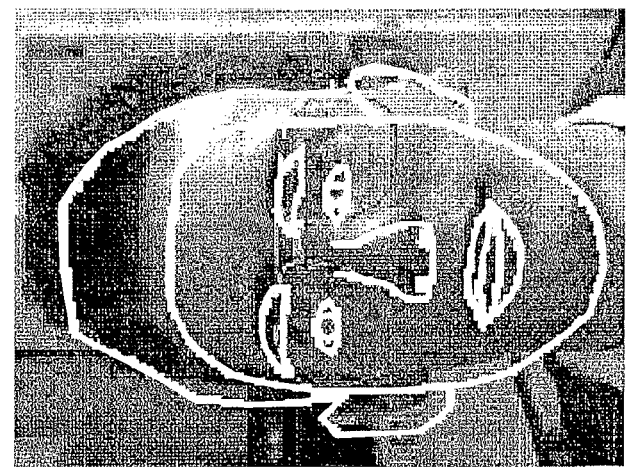
Figure 13A:
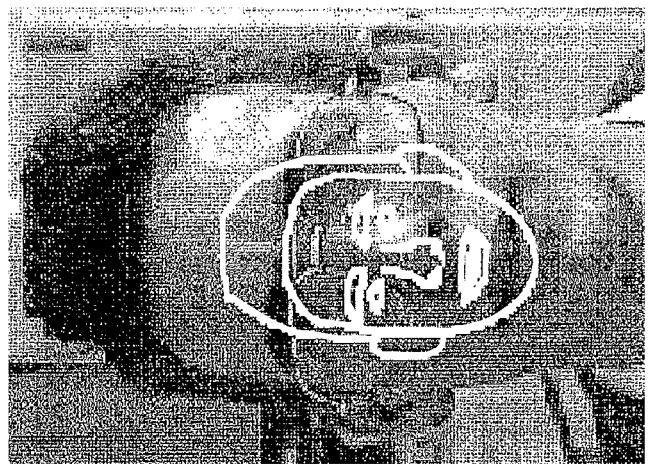

In one embodiment, an ASM (Active Shape Model) algorithm is used, which is based on statistical models of shapes of objects, to identify the landmarks on the image. The process of fitting of a model to a face inside an image is shown in FIGS. 13(a)-(c).

FIG. 11 illustrates one embodiment of the execution of the ASM algorithm. The ASM converts color images into gray scale images for the purpose of finding the landmarks.

In one embodiment, the ASM s is used with a level of detail so that the ASHAPE is composed of 93 landmarks, which provides a compromise between good quality of the 3D model or avatar produced and fast response time of the application providing a better user experience In one embodiment, in order to create a 3D deformable model of the human or animal face, a wireframe generic 3D model of human or animal face is created using a 3D graphics technique specific to the present invention.

As a non-limiting example, the 3D model is created in one embodiment such that it has:

Portability and can be used on all platforms with 3D graphics capability by using a 3D model format based upon the XML open standard;

Good definition and high quality of the rendering of facial characteristics so that the face is realistic and respectful of the person's morphology;

Fast animation that provides, as a non-limiting example, 20 or more frames which can be generated per second, in order to generate cinematographic quality of the movements of the face;

Low battery consumption by optimizing the execution of the code on the client device;

A data size of the 3D model below 500 KB so that it can easily be transmitted via email or via a Network Systems connection without adversely affecting the minimum acceptable quality level.

Figure 14:
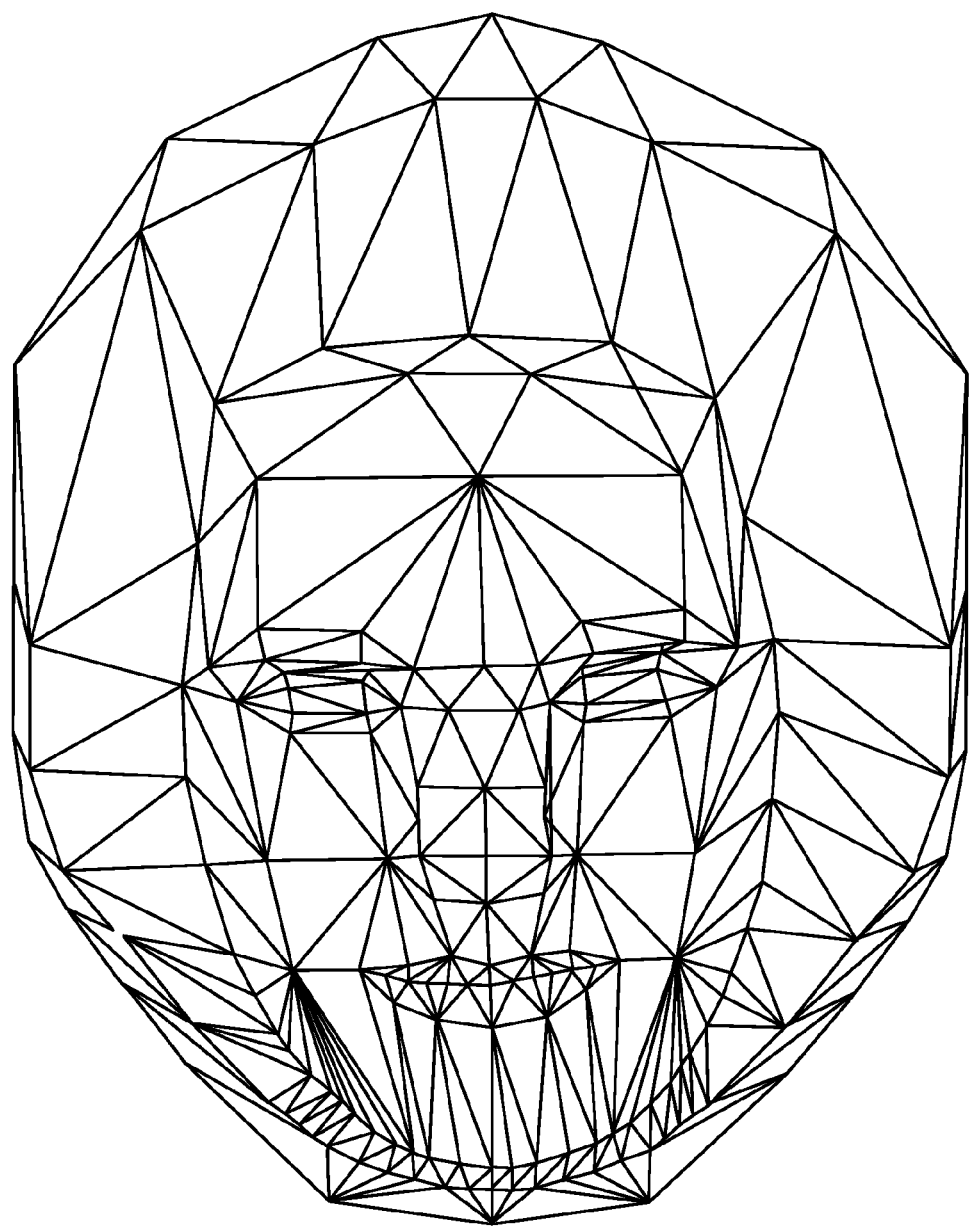
FIG. 14 illustrates one embodiment of a grid comprising a plurality of triangles that is applied to a face.

FIG. 14 illustrates a low mesh face mask specifically developed for model-based coding of human or animal faces adaptable to the 2D face model made of 93 landmarks which describe human or animal facial characteristics. For simplicity not all the points and vertex are shown in the figure.

As shown in FIG. 14, the model comprises a number of points or vertices. These points or vertices are either anchor points (AP) or simple points (SP). Anchor points are a set of special points in a 1-to-1 relation with points within the 2D model. All anchor points define a set called APS. Simple points are necessary to animate the model and enhance the quality of the 3D model. All simple points define a set called SPS. As a consequence, an LPGM is the set of all the AP and SP and can be represented by:

LPGM=APS∪SPS

Where APS=ASHAPE

The points in the LPGM can be represented as coordinates in space as $P_i = (X1_i, Y1_i, Z1_i)$, and these coordinates may be represented by their homogeneous form where:

$$P1_i = (X_i, Y_i, Z_i, w) = (X_i/w, Y_i/w, Z_i/w, 1) = (X1_i, Y1_i, Z1_i, 1)$$

The LPGM is made of three sections which describe respectively, the list of vertices, the list of faces and a list of forming units (FU).

The list of vertices is used to define the corners of surfaces, typically triangles, in 3D models where each such point is given as a vector. In one embodiment, the vertices are represented using a vector R3, which can be expressed as (Vx, Vy, Vz). In the following example, the X, Y and Z coordinates are shown of a single vertex represented in XML format:

```
<LPVERTEXLIST>
    <LPVERTEX ID = "FOREHEAD_1 ">
<X>0.174</X>
        <Y>0.98</Y>
<Z>-0.024</Z>
</LPVERTEX>
    .........
</LPVERTEXLIST>
```

As a non-limiting example, in one embodiment triangles are used to define polygonal meshes, connected vertexes and primitives. A polygonal mesh, connected vertexes and primitive is a collection of vertices, edges and faces that defines the shape of an object in 3D computer graphics and solid modeling. In one embodiment, the faces are triangles, quadrilaterals, simple convex polygons but they can also be made from more general concave polygons, or polygons with holes. It will be appreciated that other mesh structures with vertex's can also be utilized.

All the vertices represent a generic face model centered in the origin of axes in the model shown in FIG. 14. As a non-limiting example there can be 150 vertices where 93 vertices correspond to the landmarks determined previously. It will be appreciated that different number of vertices can be utilized.

In another embodiment, the mouth can be represented by 26 vertices instead of 22.

It will be appreciated that different number of vertices can be utilized: adding vertices will allow to create higher definitions models which will be more realistic and will also require more computing resources to be rendered and animated.

It will be further appreciated that other geometries are possible, as well as combinations of combinations, and that some of the vertices can be formed from non-linear lines.

After ASHAPE has been found using the ASM algorithm, the next step is fitting the LPGM to conform to the ASHAPE. At the end of this operation, some points in LPGM, namely, points in APS, are aligned to the points of ASHAPE. All the other points in LPGM, namely, points in SPS, are manually evaluated or interpolated to find their correct position, for example, by matching some key points of the LPGM with points representing the facial characteristics (93 points as described above), the ASHAPE.

Because the ASHAPE is a 2-dimensional model and the LPGM is a 3D model, points in LPGM are translated, that is, moved from one position to another one, only along the X- and Y-axes. Because the original image does not contain information about depth of the face, the Z-axis is evaluated empirically on the basis of information from the ASHAPE.

The master model is now aligned to the ASHAPE. In the next step, a skin needs be created that will be applied to the model. Here, the model skin is created using the information from the original image. To do this, simple texturing is used—a basic method for mapping a texture onto an object. In one embodiment, this can be done using open graphic libraries (OpenGL) API which is a reference graphic subsystem for all the mobile devices and desktop computers. The method of creating textures is described below with reference to FIG. 15.

In one embodiment the list of meshes are used for texturing and shading in the 3D model. In one embodiment these meshes are triangles, and other geometric shape, including linear and non-linear components, that achieves a similar result as the triangles. Each mesh is represented by three or more vertices and is listed by its ID as it appears in the list of vertices. Each mesh or triangle is used to create textures from the shades to render the 3D model. Vertices are listed using their ID as it appears in the vertex list. For a single face:

In the following example, a mesh composed is listed of three vertices, all three points of the MOUTH, represented in XML format:

```
<LPFACELIST>
    <LPFACE ID = "T_MOUTH_LIP_INFERIOR_1">
        <V1>MOUTH_1</V1>
        <V2>MOUTH_2</V2>
        <V3>MOUTH_3</V3>
    </LPFACE>
    ..........
</LPFACELIST>
```

The list of forming units represents the central element for the animation of the model and the representation of expressions. The name of each item represents the action when applied to the model; an index (INDX) represents the index of the vertex or vertices affected by this FU; and convolution values (COV) are values that need to be applied to the coordinates (x, y, and z) of the vertex during the affine transform. Whilst the LP has z coordinates, these are not used when skinning or texturing as these only need features defined by a 2D surface.

An affine transform or map is a transformation which preserves straight lines and ratios of distances. In particular, all points initially lying on a line still lie on the line after transformation and the midpoint of a line segment remains the midpoint after transformation. It is to be noted that an affine transform does not necessarily preserve angles or lengths.

Figure 15:
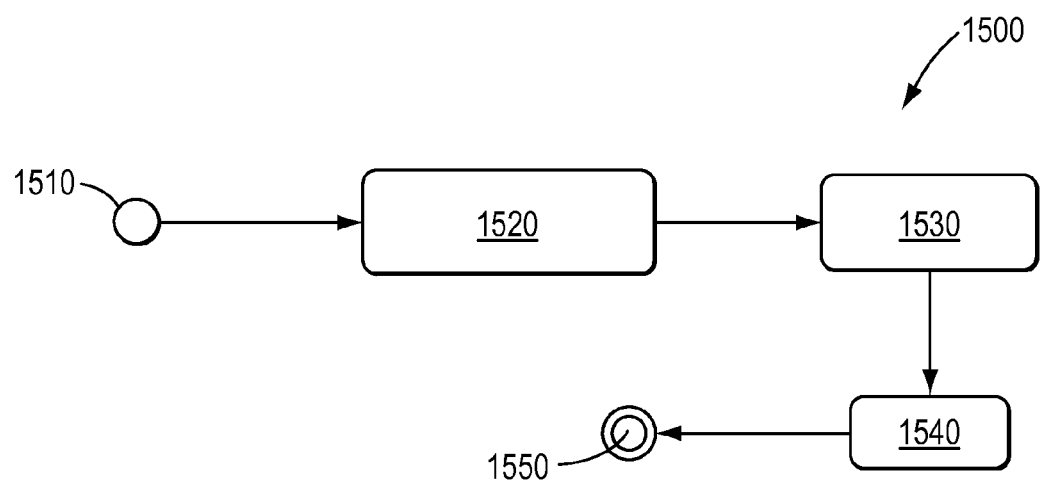
FIG. 15 illustrates one embodiment of the steps in creating a model texture.

Referring now to FIG. 15, a flow chart 1500 of steps needed for creating a model texture is shown. In order to create the skin of the LP, the base image points are used, step 1510. For each point in the LP, the corresponding point projected on the x, y plane is determined as follows (step 1520):

$$VP=(x,y,z) \in LP => Pxy=(x,y,0)$$

For each face in the list of faces, an image area corresponding to the related triangle strip is created (step 1530), and the set of the triangular image strips represent the skin of the LP. These triangular strips are then cut in step 1540 before reconstruction in step 1550. The third step is the application of the textures to the model of the face. Each triangle generated is then applied to the corresponding face portion and is controlled by the graphic engine of the device on which the LP is being rendered. In the last step of LP creation, it is necessary to reconstruct the non-visible parts of the face, namely, the interior of the mouth, the tongue, the throat, the teeth etc. as described above.

The final LP can be shown as facing a source of light. However, the light source can be moved sideways, up or down, so that shadows appear on the face of the LP providing a more realistic 3D appearance. Movement of the head of the LP causes the shadows to be adapted with the movement in accordance with the direction of the source of light.

The final LP can be defined as a triple combination of the base image (the image used to generate the ASHAPE), the ASHAPE (the 2D model of the face) and metadata (a list of metadata describing the LP).

Now the model is ready to be animated. There are two different types of animation, namely, automatic animation and user-induced animation. Automatic animation gives "life" to the model and is independent of user interaction, whilst user-induced interaction provides animation due to the interaction of a user with the model to give feelings and facial expressions. These two types of animation can be coupled to obtain a third kind of animation which gives a better representation of the mood of the LP.

As stated previously, the model is a 3D model comprising vertices and faces with a texture mapped onto them. After the model has been fitted to the human or animal face, it can be represented by a 3N-dimensional vector where N is the number of vertices as represented following:

$$\varphi(1)=(x1,y1,z1,x2,y2,z2, \ldots xn,yn,zn)$$

where (xi, yi, zi) represents the coordinates of the i-the vertex.

Animating the 3D model consists of re-shaping the model by translating, rotating, scaling vertices. For example, a user input of touching the screen makes the head of the LP look towards the point of contact on the touch screen. In the absence of a manual input, the head can be swung around its point of rotation using a simulation of natural movements. This simulation is based on rotation about the X-, the Y- and the Z-axes.

Rotation about the X-axis relates to movement around the axis passing through a pivot point (as defined below) and which is parallel to the X-axis. The angle of rotation may be predetermined and when reached, a new value is set, or, alternatively, the angle of rotation is not predetermined. The new angle of rotation, Axi, can be randomly chosen in a range of values defined by intersections of sets. Ax1 can be defined as the set of angles between ±5°; Ax2 can be defined as the set of angles having a distance from the current angle of rotation in the range between 7.5° and 30° with 0° set as a default for the first time; and Ax 3 can be defined as the set of angles having a sign that is opposite to that of the current rotation angle with 0° set as a default for the first time. A new angle of rotation, Axr, can be defined as the function, R(Ax):

$$Axr=R(Ax1 \cap Ax2 \cap Ax3)$$

Similarly, rotation duration, Txr, can be associated with the new angle of rotation, Axr, along the X-axis. The rotation duration can be expressed in ms: where Axr 1 is the next chosen rotation and AxrO is the current completed rotation, a minimum rotation duration, Min(Txr), and a maximum rotation duration, Max(Txr), can be expressed respectively as follows:

$$Min(Txr)=100 \text{ ms} \times \text{distance between } AxrO \text{ and } Axr1 \text{ (in°)}$$

$$Max(Txr)=200 \text{ ms} \times \text{distance between } AxrO \text{ and } Axr1 \text{ (in°)}$$

In addition, Txr can be defined as the value, randomly chosen from the set of values in the range defined by the previously defined functions:

$$R(Min(Txr) \leq Txr \leq Max(Txr))$$

Together with the angle and the time of rotation, a function is used to ease the movement. Five different easing functions have been defined, namely: LINEAR, QUAD, CUBIC, QUART, QUINT. The algorithm selects randomly from the set of all easing functions as follows:

$$EFxr=\text{Random}(\{LINEAR,QUAD,CUBIC,QUART,QUINT\})$$

Having defined Axr, Txr, and the easing function, until the new limit is reached, that is, before choosing another angle and time of rotation, part of the movement is done applying EFxr, and rotation, ROTx, about the X-axis can be defined as:

$$ROTx=(Axr,Txr,EFxr)$$

Similarly for rotation around the Y-axis, Ay1 can be defined as the set of angles between ±12°; Ay2 can be defined as the set of angles having a distance from the current angle of rotation in the range between 4.8° and 24° with 0° set as a default for the first time; and Ay3 can be defined as the set of angles having a sign that is opposite to that of the current rotation angle with 0° set as a default for the first time. A new angle of rotation, Ayr, can be defined as the function, R(Ay):

$$Ayr=R(Ay1 \cap Ay2 \cap Ay3)$$

As before, rotation duration, Txy, can be associated with the new angle of rotation, Ayr, along the Y-axis. The rotation duration can be expressed in ms: Where Ayr1 is the next chosen rotation and AyrO is the current completed rotation, a minimum rotation duration, Min(Tyr), and a maximum rotation duration, ax(Tyr), can be expressed respectively as follows:

$$Min(Tyr)=100 \text{ ms} \times \text{distance between } AyrO \text{ and } Ayr1 (\text{in}°)$$

$$Max(Tyr)=300 \text{ ms} \times \text{distance between } AyrO \text{ and } Ayr1 (\text{in})°$$

In addition, Tyr can be defined as the value, randomly chosen from the set of values in the range defined by the previously defined functions:

$$R(Min(Tyr) \le Tyr \le Max(Tyr))$$

Together with the angle and the time of rotation, a function is used to ease the movement. Five different easing functions have been defined, namely: LINEAR, QUAD, CUBIC, QUART, QUINT. The algorithm selects randomly from the set of all easing functions as follows:

$$EFyr=\text{Random}(\{LINEAR,QUAD,CUBIC,QUART,QUINT\})$$

Having defined Ayr, Tyr, and the easing function, until the new limit is reached, that is, before choosing another angle and time of rotation, part of the movement is done applying EFyr, and rotation, ROTy, about the Y-axis can be defined as:

$$ROTy=(Ayr,Tyr,EFyr)$$

Similarly for rotation around the Z-axis, Az1 can be defined as the set of angles between ±2.2°; Az2 can be defined as the set of angles having a distance from the current angle of rotation in the range between 4.8° and 24° with 0° set as a default for the first time; and Az3 can be defined as the set of angles having a sign that is opposite to that of the current rotation angle with 0° set as a default for the first time. A new angle of rotation, Azr, can be defined as the function, R(Az):

$$Azr=R(Az1 \cap Az2 \cap Az3)$$

As before, rotation duration, Tzr, can be associated with the new angle of rotation, Azr, along the Z-axis. The rotation duration can be expressed in ms: Where Azr1 is the next chosen rotation and AzrO is the current completed rotation, a minimum rotation duration, in(Tzr), and a maximum rotation duration, Max(Tzr), can be expressed respectively as follows:

$$Min(Tzr)=100 \text{ ms} \times \text{distance between } AzrO \text{ and } Azr1 (\text{in}°)$$

$$Max(Tzr)=500 \text{ ms} \times \text{distance between } AzrO \text{ and } Azr1 (\text{in}°)$$

In addition, Tzr can be defined as the value, randomly chosen from the set of values in the range defined by the previously defined functions:

$$R(Min(Tzr) \le Tzr \le Max(Tzr))$$

Together with the angle and the time of rotation, a function is used to ease the movement. Five different easing functions have been defined, namely: LINEAR, QUAD, CUBIC, QUART, QUINT. The algorithm selects randomly from the set of all easing functions as follows:

$$EFzr=\text{Random}(\{LINEAR,QUAD,CUBIC,QUART,QUINT\})$$

Having defined Azr, Tzr, and the easing function, until the new limit is reached, that is, before choosing another angle and time of rotation, part of the movement is done applying EFzr, and rotation, ROTz, about the Z-axis can be defined as:

$$ROTz=(Azr,Tzr,Fzr)$$

Pivot Point

The origin of the three axes of rotation, the so-called pivot point, is automatically determined after the fitting of LPGM on ASHAPE. This point is obtained using the X- and Y-coordinates of the sixty-sixth landmark of the model LPGM. The Z value of the required point is equal to the 11/10 of the depth of the model.

The easing function is used to vary the speed of the rotation during the execution of the movement. All easing functions (LINEAR, QUAD, CUBIC, QUART, QUINT) are based on 3 arguments, namely: D, the duration of the animation in seconds; C, the final absolute size of the movement; and T, the time in seconds spent to go from 0 to D on which the value C is evaluated. Therefore, the LINEAR easing function can be defined as LINEAR(D, C, T)=(C*T)/D; the QUAD easing function as:

$$QUAD(D,C,T)=C/2*T^2(\text{if}(T=D/2)<1)$$

$$QUAD(D,C,T)=-C/2*(T_i*(T_i-2)-1)(\text{where } T_i=T-1)$$

Similarly, the CUBIC, QUART AND QUINT easing functions can be defined as:

$$CUBIC(D,C,T)=C/2*T^3(\text{if}(T=D/2)<1)$$

$$CUBIC(D,C,T)=-C/2*(T^3+2)(\text{where } T_i=T-2)$$

$$QUART(D,C,T)=C/2*T^4(\text{if}(T=D/2)<1)$$

$$QUART(D,C,T)=-C/2*(T^4-2)(\text{where } T_i=T-2)$$

$$QUINT(D,C,T)=C/2*T^5(\text{if}(T=D/2)<1)$$

$$QUINT(D,C,T)=-C/2*(T^5+2)(\text{where } T_i=T-2)$$

Not all the vertices in an LP are moved according to the defined rules. To make the LP animation more realistic, the LPGM has been structured to cover not only the face geometric outline but also an area containing the image background. From the animation point of view, the LPGM is divided in many areas which are concentric rings;

Contour 3, the outer edge, far from the head geometric outline, including large portions of the background;
Contour 2, the area between Contour 3 and the face geometric outline, including hair and small portions of the background;
Upper Contour, an upper portion of Contour 2, including all points on the upper side of the eyebrow; and Lower Contour, a lower portion of Contour 2, including all points on the lower side of the chin.

To evaluate X-, Y- and Z-axis rotation to be applied to each vertex of the LP, the following rules are applied:

(1) if a vertex belongs to Contour 3, no rotation is applied thereby anchoring all points in Contour 3 to the image background;

(2) if a vertex belongs to Lower Contour, X- and Y-rotations are reduced by 50% of their value with the Z-axis rotation being reduced to 10% of the original value;

(3) if a vertex belongs to Upper Contour, X-, Y- and Z-axis rotations are reduced to 60% of their original value;

(4) if a vertex belongs to Contour 2, X-, Y- and Z-axis rotations are reduced to 30% of their original value; and (5) all other vertices are moved according to the defined rules.

Note: These values are given as example only and can be modified in different implementations. The principle is to have different level of rotation for areas around the face in order to generate a more realistic animation of the head rotation.

This kind of movement, especially between Contour 2 and Contour 3, introduces very noticeable deformations. Because Contour 3 is fixed, all the textures are stretched with a disturbing effect. To reduce this effect, a gradient is applied, which gradually makes textures completely opaque in the area next to the center of the LP, and almost totally transparent in the area next to the top of Contour 3.

Expressions

Expressions are little animations induced by the user or automatically generated by the application that represent human or animal facial expressions. Each expression is made of small actions that concur to create a complex animation. The simplest action in facial expression is moving a simple vertex by applying the affine transform to translate the vertex from one position to another.

Applying the following LP Forming Unit (LPFU), the movement of the raising of the 10th vertex of the LP by a factor defined by the vector (COV1, COV2, COV3). This example shows the movement of the $10^{th}$ vertex of the LP, belonging to the MOUTH, with the values of the vector, represented in XML format:

```
< LP ACTIVE VERTEX >
    <INDX>MOUTH_10</INDX>
    <COV1 >0.0</COV1 >
    <COV2>0.086957</COV2>
    <COV3>0.02 739</COV3>
</LP ACTIVE VERTEX >
```

Complex animations groups the movement of different vertices logically grouped to form meaningful movement. Those groups of movements are called LP Forming Unit (LPFU). LPFU defines a movement of one or more vertex of the LP to form an expression. As an example, applying the following LPFU, the upper lips of the model can be raised. These movements have been developed in the course of complex and iterative trial and errors exercises and are all documented in tables.

Figure 16:
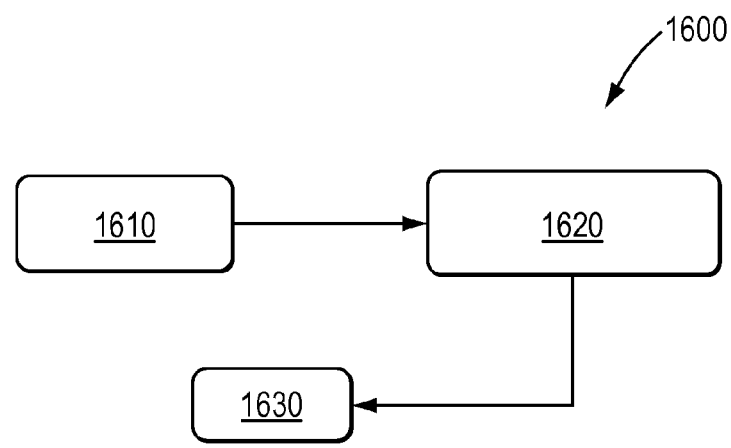
FIG. 16 illustrates one embodiment of steps that can be used in an activity diagram with the present invention.

However, applying one or more LPFUs is not sufficient to create an expression. This is because each LPFU statically changes the position of one or more points from point A to point B without a transition between A and B. In order to create a particular expression, a storyboard is created for that expression. Such a storyboard 1600 is shown in FIG. 16.

To animate the model, each LPFU must be applied following a storyboard that takes into account the LPFUs, their order, the duration of each LPFU, the easing functions, and the reverse mode to take the model back to the main expression. In FIG. 16, the LPFU is loaded from the LP model, step 1610. In order to complete the animation of an expression, animation handlers are used that group one or more LPFUs, that is, all the information necessary to animate the LPFU as well as their sequence, step 1620, and the expression is executed over a time period (of the order of a second) by playing the storyboard, step 1630.

The LPFUs are grouped into "Animation Bundles" that represent the animation of a single LPFU (a single event into a storyboard).

Each "Animation Bundle" is preferably provided to the user on the screen of his/her mobile device so that he/she can make an appropriate selection to animate his/her 3D model or any other 3D model to which he/she has access.

In the following example, the method for the "Lip Stretcher" creates an animation bundle, adds the "Lip Stretcher" LPFU to it and then inserts the Animation Bundles inside the expression storyboard.

```
PUBLIC VOID LIPSTRETCHER( ) {
    ANIMATIONBUNDLE BUNDLE = NEW ANIMATIONBUNDLE( );
    BUNDLE. ANIMATIONS.ADD(PREPAREANIMAT10NFORACTIONUNIT("LIP STRETCHER", 0, -110F, 0, 1000, FALSE, PICKRANDOMEASING( )));
    BUNDLE. ANIMATIONS. ADD(PREPAREANIMATI0NFORACTIONUNIT("LIP STRETCHER", 0, -1 1 OF,
        2000, 1000, TRUE, PICKRANDOMEASINGO));
    SYNCHRONIZED (ANIMATIONBUNDLES) {
        ANIMATIONBUNDLES.ADD(BUNDLE);
    }
}
```

Sentiments can be extracted from textual data using natural language processing, text analytics and semantic technologies identifying positive and negative opinions, emotions, and evaluations, and taking the context into consideration to disambiguate interpretations.

Extracting indicators about opinions and emotional reactions of the writer or speaker mean that it can then be expressed with the display of emotions on the LP of the user. In one embodiment the present invention uses techniques and approaches that enable directly opinion-oriented information-seeking systems allowing the programmer to get into user opinion using dedicated sets of API.

In one embodiment, there is a functionally of sharing LPs, moods and emotions through the structure as illustrated in FIGS. 1(*a*)-1(*e*). A client device, such as a mobile device (or a desktop or other client application) disclosed in FIGS. 22-24), connected to a Network System shares a LP or moods with a third party service provider 120, FIG. 1(*b*), that allocates a resource 22, including but not limited to a CPU and memory, to process the request and to store the LP and associated information into a Data Store 146 (FIG. 1(*e*), 124, the cloud or mobile device CPU and memory to process and associated information in the data store.

A client device 124, FIG. 1(*b*), exchanges messages with the Interface Component 126, FIG. 1(*b*), according to communication protocols with a third party service provider 120, FIG. 1(*b*), that allocates a resource 122, FIG. 1(*b*), including but not limited to a CPU and memory, to process the message, to acknowledge it, respond to it and to store a log of this message into a Data Store 146, FIG. 1(*e*).

Figure 17:
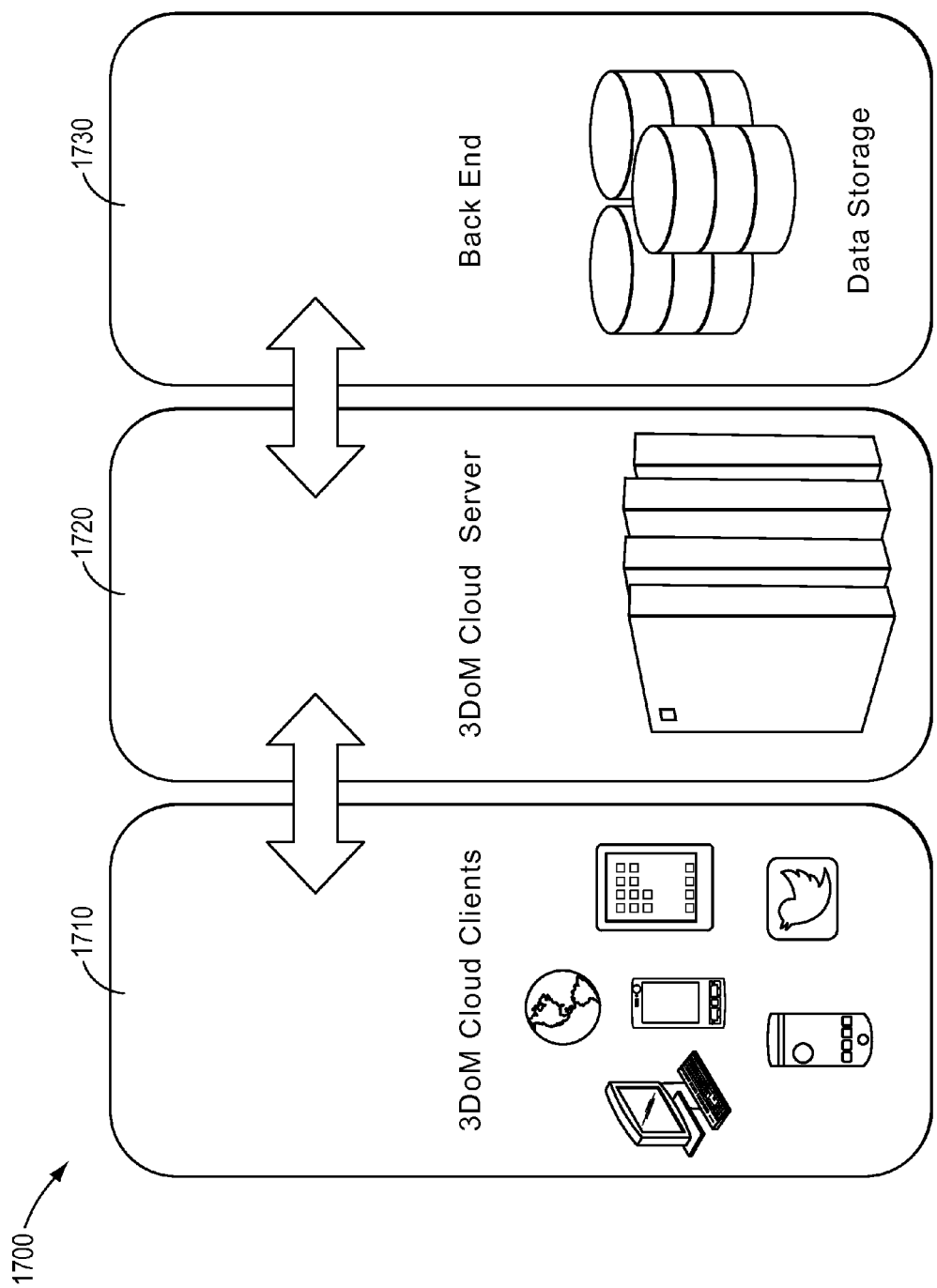
FIG. 17 illustrates 3DoM general architecture in accordance with the present invention.

FIG. 17 illustrates 3DoM general architecture 1700. Architecture 1700 comprises 3DoM® cloud or mobile device clients 1710, 3DoM® cloud or mobile device server 1720, and a back end infrastructure 1730. The 3DoM® cloud or mobile device clients 1710 are represented in a layer containing all 3DoM® clients, including Network System web browsers on desktops, mobile devices, tablets, and the like. The back end infrastructure 1730 supports the entire architecture but, in particular, data storage servers.

Figure 18:
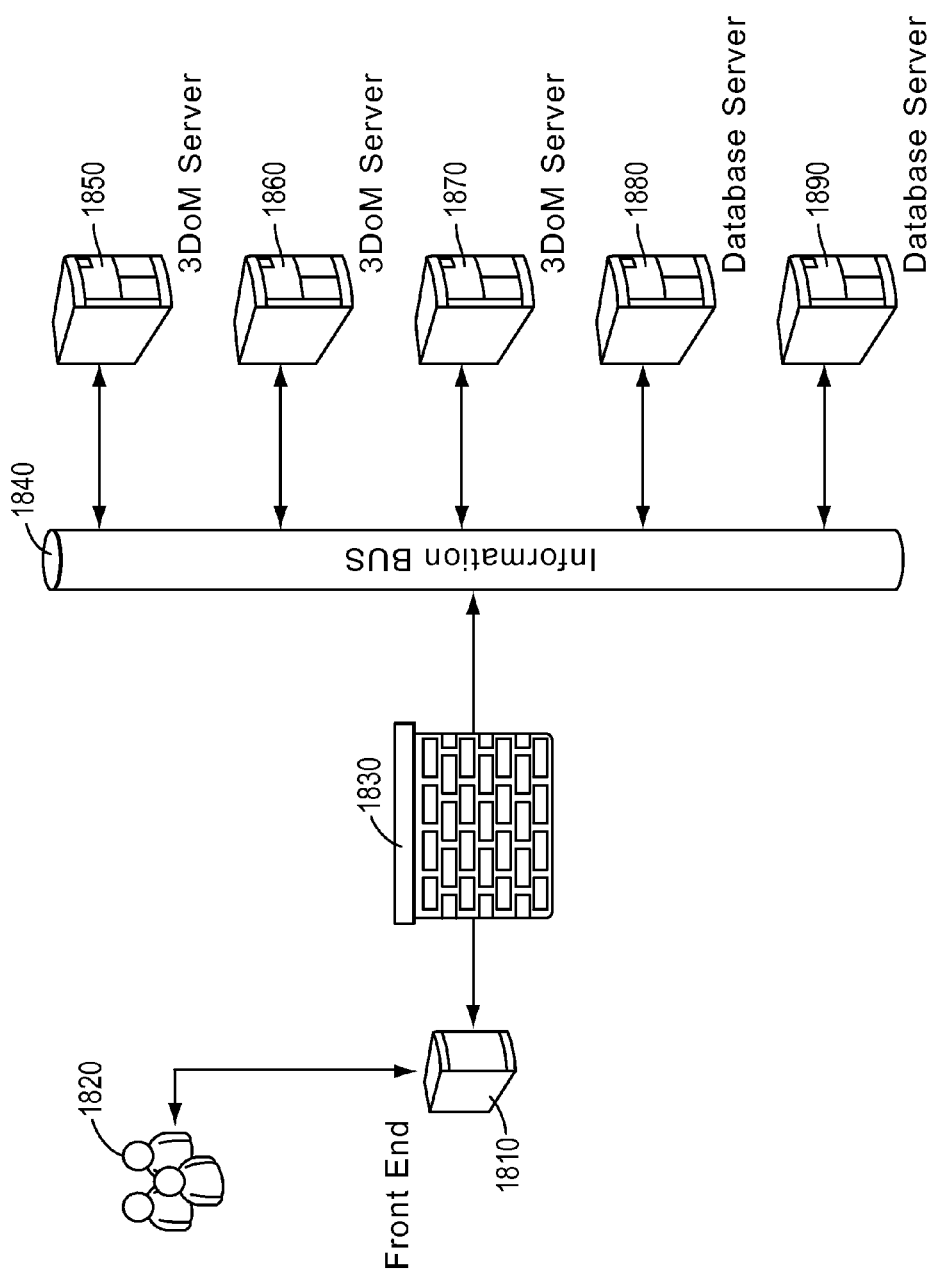
FIG. 18 illustrates one embodiment of 3DoM logical architecture.

FIG. 18 illustrates the 3DoM® logical architecture 1800. Front end 1810 represents the main entrance door to the 3DoM® Platform, and it tunnels messages coming into the system from users 1820 routing them to the 3DoM® Platform. It is responsible of handling secure connections via HTTPS via firewall 1830. An information bus 1840 represents the collection of technologies used to replicate data and make the 3DoM® Platform scalable and it is responsible for load balancing and data replication as well as scalability. Connected to the information bus 1840 are a number of 3DoM® servers 1850, 1860, 1870 and two database servers 1880, 1890. Each 3DoM® server 1850, 1860, 1870 implements the 3DoM® Platform and each database server 880, 1890 stores data.

The three-dimensional model may be changed locally on a mobile device; it may also be stored locally on the mobile device.

In one embodiment, the three-dimensional model is stored on a platform in a cloud environment. From this platform, the three-dimensional model can be shared via the platform with at least one social network. Optionally, the three-dimensional model is integrated with the at least one network. This means that a user, having created his/her three-dimensional model, can share it with his/her contacts on his/her social networks. Additionally, his/her contacts may also have three-dimensional models which are shared on their social networks via the platform.

In addition, in one embodiment, emotion of a user can be shared on at least one social network via the platform using the three-dimensional model. The three-dimensional model of a sender of a communication may be animated according to his/her feelings and/or mood. In this way, a recipient of the communication can be made aware of the feelings and/or mood of the sender as he/she receives the communication.

Virtual objects may be sent to a recipient via the platform connected to the at least one social network. A recipient, on receipt of the virtual object, may update his/her three-dimensional model in accordance with the virtual object to display, in response to the type of virtual object, one or more of: simultaneous facial emotions; successive facial emotions; animations; graphical object displays; and text message displays. Such an update is achieved in accordance with a storyboard as described in more detail below.

In one embodiment, the virtual object can be selected from a plurality of virtual objects made available on the platform.

Application programming interfaces (APIs) are provided on the platform through which of the following functions can be performed:
the three-dimensional model can be animated, for example, by the creation of a succession of animations, in the form of storyboards;
a user is targeted using advertising related to his/her mood. Although two examples of API are given here, other API applications are also possible.

The ability to access three-dimensional models is provided by an API which allows any third party Network System and mobile device application to replace two-dimensional images with three-dimensional models created in accordance with one embodiment of the present invention.

By incorporating the technology underlying the present invention into their applications, including but not limited to Network System, mobile device and the like. Application developers can offer a more engaging and emotional user experience thereby resulting in more faithful and satisfied users.

In one embodiment, three-dimensional models can be customized using accessories worn and/or displayed on and/or around a face. Packages of personalized accessories can be created and made available on the platform. In addition, packages of personalized moods may also be created and made available on the platform.

The three-dimensional models created in accordance with one embodiment the present invention can be used to substitute for two-dimensional images in Network System and mobile device applications. In one embodiment, the three-dimensional models can be utilized in videogames or other applications using models of characters.

Moreover, in some embodiments, the present invention allows for the creation of an image wall including a plurality of facial images forming part of a patchwork, each image comprising a screenshot of a three-dimensional model.

As a non-limiting example, in one embodiment of the present invention, one or more applications and an application programming interface (API) are provided The API can be an app at a mobile device as disclosed hereafter.

As non-limiting examples, mobile devices, desktop platforms and the like can be enhanced to implement a wide range of so-called "hi-tech" applications including: interactive three-dimensional (3D) games and virtual worlds; humanoid robotics and artificial intelligence (AI) interaction; performance-driven avatar animation; smart screens, billboards and kiosks; M-commerce; 3D displays; advanced and adaptive visualizations; and intelligent video conferencing.

With reference to FIG. 2, a system 130 includes the third party service provider 120 that supports any number of resources 122 (e.g., hardware, software, firmware, and the like) that can be employed by the client device 124 and/or disparate client device(s) not shown. The third party service provider 120 further comprises the interface component 128 that receives resource utilization requests, including but not limited to requests to effectuate operations utilizing resources 122 supported by the third party service provider 120 from the client device 124 and the dynamic allocation component 110 that partitions resources 122, including but not limited to, between users, devices, computational tasks, and the like. Moreover, the dynamic allocation component 110 can further include a user state evaluator 132, an enhancement component 134 and an auction component 136.

The user state evaluator 132 can determine a state associated with a user and/or the client device 124 employed by the user, where the state can relate to a set of properties. For instance, the user state evaluator 132 can analyze explicit and/or implicit information obtained from the client device 124 (e.g., via the interface component 128) and/or retrieved from memory associated with the third party service provider 120 (e.g., preferences indicated in subscription data). State related data yielded by the user state evaluator 132 can be utilized by the dynamic allocation component 110 to tailor the apportionment of resources 122.

According to another illustration, the user state evaluator 132 can consider characteristics of the client device 124, which can be used to apportion resources 122 by the dynamic allocation component 110. For instance, the user state evaluator 132 can identify that the client device 124 is a mobile device with limited display area. Thus, the dynamic allocation component 110 can employ this information to reduce resources 122 utilized to render an image upon the client device 124 since the cellular telephone may be unable to display a rich graphical user interface.

Moreover, the enhancement component 134 can facilitate increasing an allocation of resources 122 for a particular user and/or client device 124.

Referring to FIG. 3, a system 138 can be utilized that employs load balancing to optimize utilization of resources 122. The system 138 includes the third party service provider 120 that communicates with the client device 124 (and/or any disparate client device(s) and/or disparate third party service provider(s)). The third party service provider 120 can include the interface component 128 that transmits and/or receives data from the client device 124 and the dynamic allocation component 110 that allots resources 122. The dynamic allocation component 110 can further comprise a load balancing component 140 that optimizes utilization of resources 122.

Moreover, the load balancing component 140 can monitor resources 122 of the third party service provider 120 to detect failures. If a subset of the resources 122 fails, the load balancing component 140 can continue to optimize the remaining resources 122. Thus, if a portion of the total number of processors fails, the load balancing component 140 can enable redistributing cycles associated with the non-failing processors.

Now turning to FIG. 4, a system 142 is illustrated that archives and/or analyzes data utilizing the third party service provider 120. The third party service provider 120 can include the interface component 128 that enables communicating with the client device 124. Further, the third party service provider 120 comprises the dynamic allocation component 110 that can apportion data retention resources, for example. Moreover, the third party service provider 120 can include an archive component 144 and any number of data store(s) 146. Access to and/or utilization of the archive component 144 and/or the data store(s) 146 by the client device 124 (and/or any disparate client device(s)) can be controlled by the dynamic allocation component 110. The data store(s) 146 can be centrally located and/or positioned at differing geographic locations. Further, the archive component 146 can include a management component 148, a versioning component 150, a security component 152, a permission component 154, an aggregation component 156, and/or a restoration component 158.

The data store(s) 146 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store(s) 146 of the subject systems and methods is intended to comprise, without being limited to, these and any other suitable types of memory. In addition, it is to be appreciated that the data store(s) 146 can be a server, a database, a hard drive, and the like.

The management component 148 facilitates administering data retained in the data store(s) 146. The management component 148 can enable providing multi-tiered storage within the data store(s) 146, for example. According to this example, unused data can be aged-out to slower disks and important data used more frequently can be moved to faster disks; however, the claimed subject matter is not so limited. Further, the management component 148 can be utilized (e.g. by the client device 124) to organize, annotate, and otherwise reference content without making it local to the client device 124. Pursuant to an illustration, enormous video files can be tagged via utilizing a cell phone. Moreover, the management component 148 enables the client device 124 to bind metadata, which can be local to the client device 124, to file streams (e.g., retained in the data store(s) 146); the management component 148 can enforce and maintain these bindings.

Additionally or alternatively, the management component 148 can allow for sharing data retained in the data store(s) 146 with disparate users and/or client devices. For example, fine-grained sharing can be supported by the management component 148.

The versioning component 150 can enable retaining and/or tracking versions of data. For instance, the versioning component 150 can identify a latest version of a document (regardless of a saved location within data store(s) 146).

The security component 152 limits availability of resources based on user identity and/or authorization level. For instance, the security component 152 can encrypt data transferred to the client device 124 and/or decrypt data obtained from the client device 124. Moreover, the security component 152 can certify and/or authenticate data retained by the archive component 144.

The permission component 154 can enable a user to assign arbitrary access permissions to various users, groups of users and/or all users.

Further, the aggregation component 156 assembles and/or analyzes collections of data. The aggregation component 156 can seamless incorporate third party data into a particular user's data.

The restoration component 158 rolls back data retained by the archive component 144. For example, the restoration component 158 can continuously record an environment associated with the third party service provider 120. Further, the restoration component 158 can playback the recording.

A 3D representation of human or animal face, and/or other physical antimony is called a "Living Portrait®" or LP, which, as its name indicates, is alive and has the ability to change emotions or have a mood of its own. This LP therefore has the ability to become a new layer when representing people in the virtual world.

It closes the gap between the real person and the personae that is the representation in the virtual world, in other words, the avatar. The change in emotions and moods of the LP can be controlled by the user or by a command which acts on the LP through its API. The change in emotions and moods can be transmitted to his/her friends connected to his/her social network.

For a better understanding, FIG. 2 illustrates a "life cycle" 200 of a LP. Using the 3DoM® cloud or mobile device client (which may be a mobile device app, a desktop application, a Network System app, a social network itself as described above, and the like).

As a non-limiting example, a user 'U' connects to the 3DoM® Platform using an existing account selected one from his social network accounts (Facebook®, Twitter®, Google+®, etc.), step 210. "Facebook®", "Twitter®" and "Google®" are trademarks of Facebook Inc., Twitter Inc., and Google Inc. respectively. Managing federated authentication, namely, where the user logs in only once and does not need to remember several login credentials, through existing social network accounts allows access to the user's social graph, and the LP application becomes part of the social network.

As a non-limiting example, in one embodiment, the user is able to:

1. Create a LP (step 220): using a photo from a photo gallery, a photo taken by a camera in the user's mobile client device 124, FIG. 1(b), or a photo downloaded from the Network System or social network into the user's mobile, the client device 124, FIG. 1(b). The creation of the LP occurs either in the client device itself or in a cloud or mobile device server in which case the client device does a pre-processing of the photo to normalize its file size and then sends it to a third party service provider 120, FIG. 1(b), that allocates a resource 122, including but not limited to a CPU and memory, to process the photo and transform it into a 3D model, the LP. The LP can be stored locally into a data store 146 (FIG. 1(e)), and is sent back to the client device through an interface component 126, FIG. 1(b).

2. Change avatar characteristics (step 230): mood (step 232), expressions (step 234), dress up (step 236), make up (step 238) and the like. Such changes occur inside the client device 124, FIG. 1(b). If the characteristics relate to changes of mood or expressions, the process is done locally. If the characteristics are dress up or make up, they may be already stored locally. If not, the Client Device makes a request by sending a message to a third party service provider 120, FIG. 1(b), that allocates a resource 122, FIG. 1(b), including but not limited to CPU and memory, to process it, fetches the characteristic from a local Data Store 146, FIG. 1(e), and sends it back to the Client Device through an Interface Component 126, FIG. 1(b).

3. Share the LP through the cloud or mobile device (step 240) where the client device 124, FIG. 1(b), sends a message containing the LP to a third party service provider 120, FIG. 1(b), that allocates a resource 122, FIG. 1(b), including but not limited to CPU and memory, to process it, stores the LP in a local Data Store 146 (FIG. 1(e)) and notifies other client devices with whom the LP is to be shared through an Interface Component 126, FIG. 1(b).

In one embodiment, a user may also access Platform services such as LP creation without previously authenticating, in which case the LP will not be associated with a social network account.

Figure 1E:
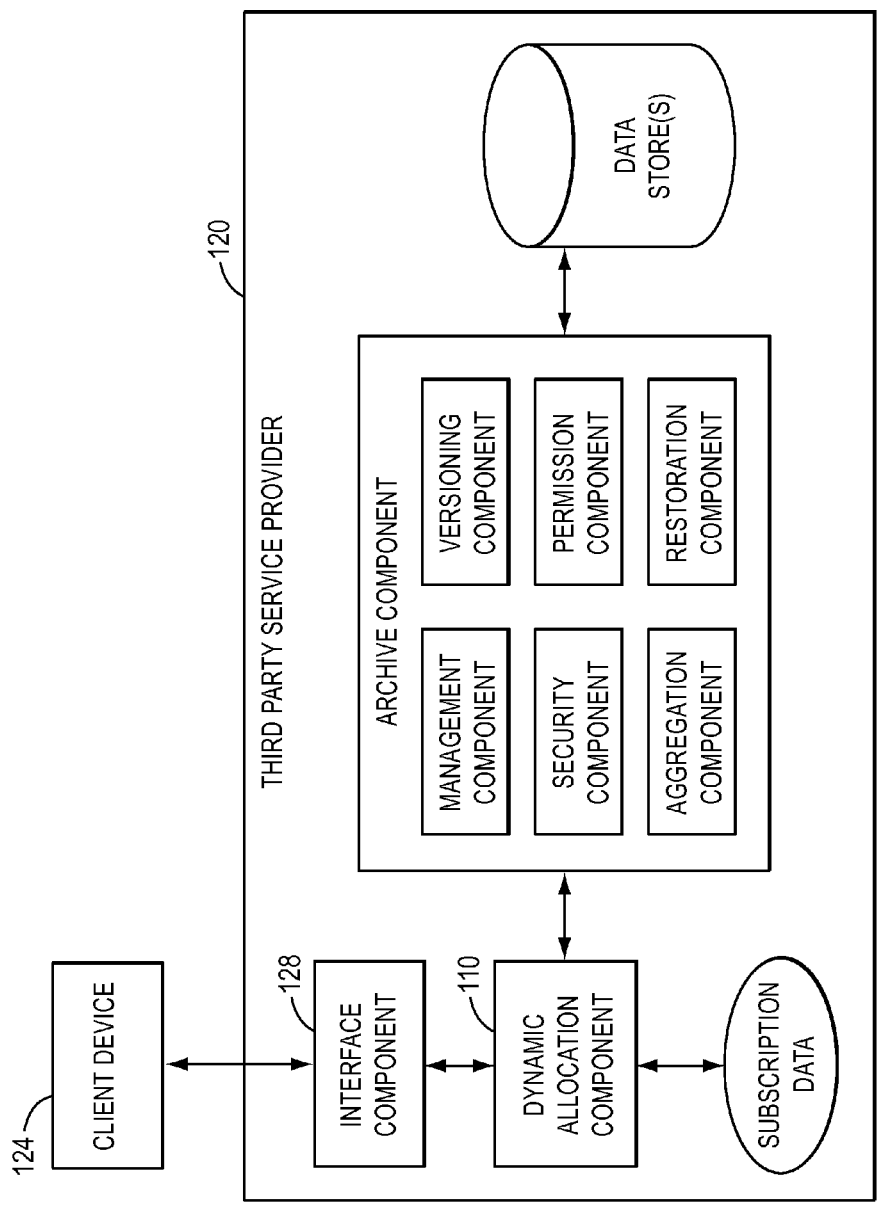

In one embodiment, every time the user 'U' creates or modifies his/her LP, it is immediately shared through the 3DoM® Platform hosted in the cloud (sometimes referred to as cloud or mobile device server for simplicity): the user's client device 124, FIG. 1(b), sends a message containing the updates to his LP to a third party service provider 12, FIG. 1(b), that allocates a resource 122, FIG. 1(b), including but not limited to a CPU and memory, to process it and stores the update to the LP in a local Data Store 146 (FIG. 1(e)).

All the connected cloud or mobile device clients, that is, friends of the user, receive notification about the changes and they can update the LP on their device from the 3DoM® Platform (step 250): the Third Party Service Provider 120, FIG. 1(b), notifies the client devices of the friends of that user through an Interface Component 126, FIG. 1(b). All users connected with the LP are immediately notified of a change of mood and dressing up of the LP (step 250). The information about connections between such users is defined by the social graph provided by the connected social network or by other connection mechanisms provided directly by the 3DoM Platform and this information is stored in a local data store 146 (FIG. 1(e)) of the third party service provider 120, FIG. 1(b), which allocates resource 122, FIG. 1(b), including but not limited to a CPU and memory, to process it and update it periodically.

As part of the connection of a client device 124, FIG. 1(b), to the 3DoM® Platform hosted on third party provide 120, FIG. 1(b), (step 210), a notification is sent by the third party service provider 120, FIG. 1(b), which allocates a resource 122, FIG. 1(b), including but not limited to a CPU and memory, to process it and notify the client devices through an Interface Component 126, FIG. 1(b). Upon receiving the notification, (step 260) the client device reloads the LP (step 270). The reloaded LP is stored locally (step 280) (on the client device). Similarly, when the LP is created for the first time in step 220, it is stored locally as shown in step 280.

Even if this is a simple scenario, the possible applications are many and some of these applications will be described in more detail below.

A 3DoM® cloud or mobile device client is represented by an application on each kind of mobile device that is connected to the 3DoM® cloud or mobile device server. A client is an application with some features that can vary in numbers and characteristics depending on the target for the client itself. For example, a Facebook client may show only the LP on the Facebook user page (instead of the picture of the profile). This kind of client does not have any other features than the visualization of an LP given as parameter.

To access the V services, the client device 124 connects, in the general case, to the 3DoM® Platform hosted on third party provider 120, FIG. 1(b), (step 210), which allocates a resource 122 FIG. 1(b), including but not limited to a CPU and memory, to process it and supply the requested services and information back to the client device through an Interface Component 126, FIG. 1(b).

To navigate through these activities, the client device 124, FIG. 1(b), may store locally only part (in one embodiment, the most recent information limited to a set number of days) of the information about these activities while the complete information is stored on the 3DoM Platform. In the general case, the client device 124, FIG. 1(b), will therefore connect to the 3DoM® Platform hosted on third party provider 120, FIG. 1(b), (step 210), which allocates a resource 122, FIG. 1(b), including but not limited to a CPU and memory, to process it and supply the requested information back to the client device through an Interface Component 126, FIG. 1(b).

In the general case, the client device 124, FIG. 1(b), will connect and request these information to the 3DoM® Platform hosted on third party provider 120, FIG. 1(b), (step 210), which allocates a resource 122, FIG. 1(b), including but not limited to a CPU and memory, to process it and supply the requested information back to the client device through an Interface Component 126, FIG. 1(*b*). The user will then be able to read and modify this information locally on the client device 124, FIG. 1(*b*), and to save the new settings by connecting again to the 3DoM® Platform hosted on third party provider 120, FIG. 1(*b*), (step 210), which allocates a resource 122, including but not limited to a CPU and memory, to process it and store the new information in a local Data Store 146 (FIG. 1(*e*). In the general case, these activities take place on the client device 124, FIG. 1(*b*), without a need to connect to the 3DoM® Platform nor to Network Systems. The client device allocates local resource, including but not limited to a CPU and memory, to process them.

Accessories like hats, wigs, glasses or other kind of gadgets. In specific cases, the accessories may already be stored locally on the user client device. If this is not the case, the Client Device 124, FIG. 1(*b*), makes a request by sending a message to the 3DoM Platform stored on a third party service provider 120, FIG. 1(*b*), that allocates a resource 122, FIG. 1(*b*), including but not limited to CPU and memory, to process it. The 3DoM Platform identifies that this message relates to the 3DoM shop which stores all Accessories and dispatches it as such to the shop. The shop fetches the Accessory from a local Data Store 146, FIG. 1(*e*), and sends it back to the 3DoM Platform which sends it back to the Client Device through an Interface Component 126, FIG. 1(*b*). Such exchange is logged by the 3DoM Platform as previously described.

In sub-module 434, the user can use expressions to create different moods on his/her LP. In general, the instructions to animate the LP with the expressions will already be stored locally on the user client device. When the use plays on his Client Device 124, FIG. 1(*b*), and changes the expressions of his LP, no communication take place with the 3DoM Platform stored on a third party service provider 120, FIG. 1(*b*). In one embodiment, however, if sufficient data bandwidth and/or processing power is available at a reasonable cost to the user, expressions may then be uploaded to the 3DoM® Platform for sharing through the cloud or mobile device. The mood is uploaded by the user's client device 124, FIG. 1(*b*), that connects and sends a message representing the mood update to the 3DoM® Platform hosted on third party provider 120, FIG. 1(*b*), (step 210), which allocates a resource 122, including but not limited to a CPU and memory, to process it, to log it with the Archive Component 144 (FIG. 1(*e*)). The 3DoM Platform notifies the user's client devices through an Interface Component 126, FIG. 1(*b*). If the users to be notified are not available (for instance the smartphone is switched off or not connected to a Network System), they will be notified the next time they connect to the 3DoM Platform. In one embodiment, some moods are simple, for example, displaying happiness, tiredness, boredom, angriness etc. or more complex, for example, "I'm a pirate" and "I feel like a zombie". All the client devices are preloaded with a default set of moods. The user also can create his/her own moods and upload them to the cloud or mobile device. This is described in more detail below.

In one embodiment the Store or other stores are associated with the mobile device. In the general case, the client device 124, FIG. 1(*b*), will store locally some information which is the most recent while other most information is stored on the 3DoM Platform or other devices and systems connected through Network Systems. The Client Device will connect to the 3DoM® Platform hosted on third party provider 120, FIG. 1 (*b*), (step 210), which allocates a resource 122, including but not limited to a CPU and memory, to process it and an exchange of information will occur through an Interface Component 126, FIG. 1(*b*), whereby the most recent information will be transferred to the user client device. Mechanism such as time stamp or equivalent may be used in one embodiment.

Credits can be bought using real money (step 610), in which case, the user, with his client device 124, FIG. 1(*b*), will connect via a Network System to a payment service and make a payment by providing a credit card, PayPal account details or will do an In App Purchase that will be processed by the App Store to which the client device is connected. Credits can also In the general case, the client device 124, FIG. 1(*b*), will connect and request information about which activities give how many rewards to the 3DoM® Platform hosted on third party provider 120, FIG. 1(*b*), (step 210), which allocates a resource 122, including but not limited to a CPU and memory, to process it and supply the requested information back to the client device through an Interface Component 126, FIG. 1(*b*). When the user conducts such activities on his client device, such activities will be validated by a connection to the 3DoM® Platform hosted on third party provider 120, FIG. 1(*b*), (step 210), which allocates a resource 122, including but not limited to a CPU and memory, to process it, to calculate the new reward status of the user and to send new information back through an Interface Component 126, FIG. 1(*b*).

The client device 124, FIG. 1(*b*), will connect and request these information to the 3DoM® Platform hosted on third party provider 120, FIG. 1(*b*), (step 210), which allocates a resource 122, including but not limited to a CPU and memory, to process it and supply the requested information back to the client device through an Interface Component 126, FIG. 1(*b*). To conduct this activity, the user will create such gadgets with own tools and/or tools provided by the 3DoM Platform (on or offline). The user client device 124, FIG. 1(*b*), will connect and submit the proposed gadgets to the 3DoM® Platform hosted on third party provider 120, FIG. 1(*b*), (step 210), which allocates a resource 122, including but not limited to a CPU and memory, to process and submit them to a validation process operated by MoodMe. Upon acceptance, the user will be notified through an Interface Component 126, FIG. 1(*b*), that his gadget(s) are now being offered for sales on the 3DoM shop and his gadget(s) will be stored in a local Data Store 146 (FIG. 1(*e*)) along with associated information such as commercial (price, whether in real or virtual currency, country where the gadget is available, characteristics of the gadget, etc.).

Upon rejection, the user will be notified through an Interface Component 126 FIG. 1(*b*), possibly providing the user with motivation and indication of modifications to implement so that his gadget(s) can be offered for distribution on the 3DoM shop. To do this, the client device 124, FIG. 1(*b*), sends a message containing the 3me to the 3DoM platform hosted by third party service provider 120, FIG. 1(*b*), who allocates a resource 122, FIG. 1(*b*), including but not limited to a CPU and memory, including but not limited to a CPU and memory, to process it. The sending of the 3me is then logged in a log file managed by the archive component 144 (FIG. 1(*e*)) and sends the 3me to the recipient through an interface component 126, FIG. 1(*b*). To request a friend's LP, the user's client device 124, FIG. 1(*b*), will connect and send a message to the 3DoM® Platform hosted on third party provider 120, FIG. 1(*b*), which allocates a resource 122, FIG. 1(*b*), including but not limited to a CPU and memory, to process it and to send a message to the user's friend requesting to share his/her LP through an Interface Component 126, FIG. 1(*b*). The user receiving the request may accept it or not. His client device 124, FIG. 1(*b*), will send a message back to the 3DoM Platform. In case of acceptance, his LP will be sent back to the user client device who initiated the request either directly from client device to client device if both devices are simultaneously available or through the 3DoM Platform which may store the LP in a local Data Store 146 (FIG. 1(*e*)).

In case of refusal, a message will be sent by the user client device refusing to share the LP back to the 3DoM Platform which will notify back the user client device who initiated the request. The information about this request and its outcome will be logged as described, using the Archive Component.

3me® (or MoodEe®) objects may fall within at least to perform this, the user's client device 124, FIG. 1(*b*), connects and sends a message representing the request to update his profile picture on a given social network to the 3DoM® Platform hosted on third party provider 120, FIG. 1(*b*), (step 210), which allocates a resource 122, including but not limited to a CPU and memory, to process it. The 3DoM Platform connects to the Social Network on behalf of the user through that social network API and an Interface Component 126, FIG. 1(*b*), to perform the request. The 3DoM Platform notifies the user about the success. It can also be used for a request through an Interface Component 126, FIG. 1(*b*), and logs it with the Archive Component 144 (FIG. 1(*e*)).

This preceding follows similar steps involving the user client device, the 3DoM Platform and the Interface Component.

In one embodiment cloud components including but not limited to a CPU and memory.126, FIG. 1(*b*), are used to request information about Users who had a specific Mood at a very recent moment or other characteristics as specified by the Content Provider. These requests are processed by allocating resources 122, including but not limited to a CPU and memory 126. The requests are logged in the Archive Component 144 (FIG. 1(*e*)) and the requested information is sent back to the Content Provider. Content Providers may submit content (advertising or other) to MoodMe users who match the Mood state or other characteristics through the API and the Interface Component 126, FIG. 1(*b*). The 3DoM Platform will retarget the content to the users' client device 124, FIG. 1(*b*), through the Interface Component 126, FIG. 1(*b*). It will also log this in the Archive Component 144 (FIG. 1(*e*)) and will compute billing elements to charge the Content Provider for the service.

The 3DoM® platform has the knowledge of its users' social circles. Because of this, 3DoM® allows the combination of the LP of a user with those of his/her friends in his social network and enables the development of games with a more personal, attractive and engaging experience: each user plays with his/her LP as the hero and the LPs of his/her friends as opponents or team members.

As described above, the creation of a LP is core to the 3DoM® Platform, and requires the ability to transform a two-dimensional (2D) human or animal portrait into a 3D deformable model.

Figure 21:
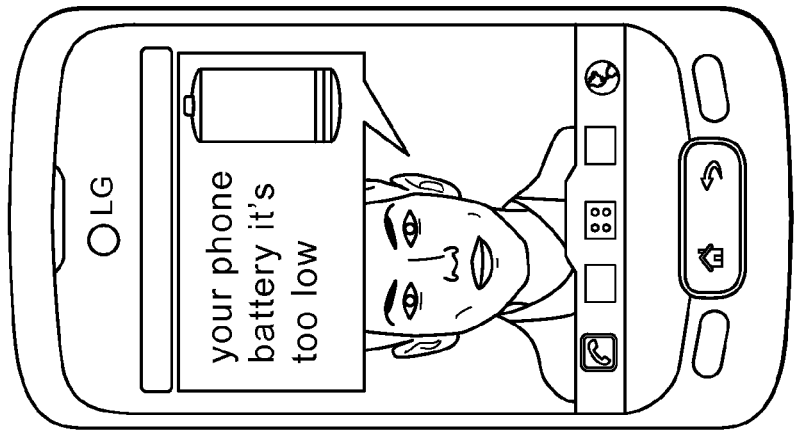
FIGS. 19 to 21 illustrate certain embodiments of applications of an avatar created in accordance with one embodiment of the present invention.
Figure 20:
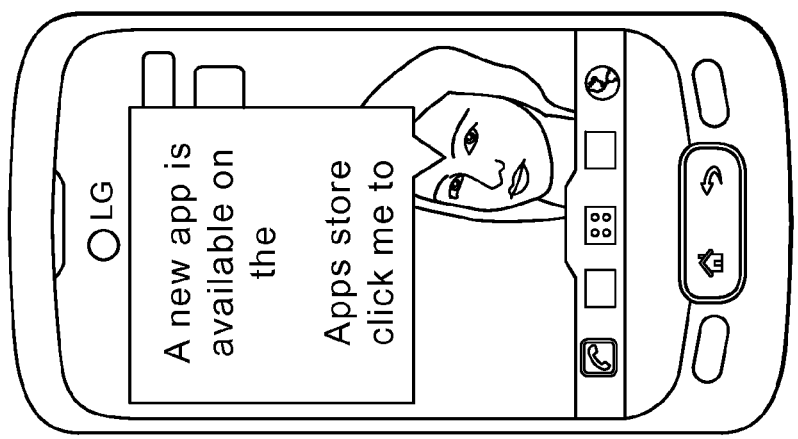
Figure 19:
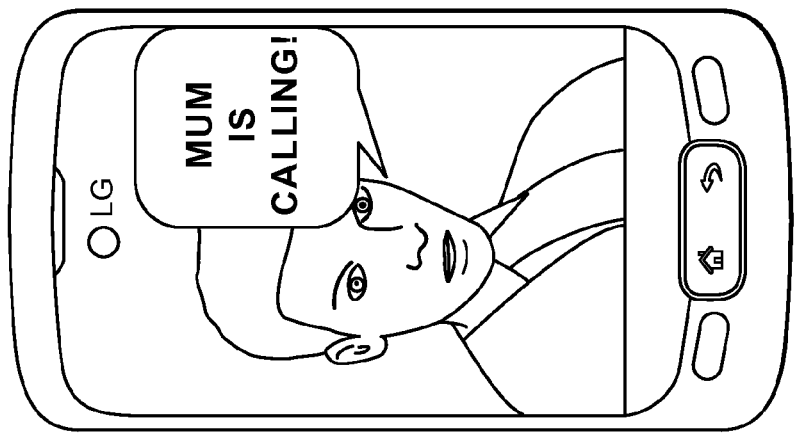

In one embodiment, the present invention can be implemented as a personal assistant to create a user-friendly original alerting and/or assistance tool as shown in FIGS. 19 to 21. As a non-limiting example in FIGS. 19 to 21 the personal assistant can be configured to notify the user: of the name of an incoming caller; of the availability of new apps; news; events; weather; and that the battery is too low, and the like The personal assistant can also be used with incoming messages (SMS) and email. The personal assistant can be created as described above by mapping a chosen face over an existing mesh, including but not limited to a polygonal model, a mesh model and the like, without the need for a dedicated server to process images with all the processing being done on the mobile device.

3D avatars can be integrated with the user's mobile device contact list. Such avatars can automatically be created by tracking a suitable picture associated with a contact name, either taken by the camera on the mobile device or one downloaded from a social network, and turning the picture into a realistic and animated 3D model as described above.

It will be appreciated that the present invention is not limited to social applications and the LP can also be used in other domains, which can be as a non-limiting example, e-commerce, in store retail and the like.

In one embodiment, the present invention can allow people to try merchandise in a much more engaging and practical way offering benefits such as: being able to see themselves with glasses, different make-up, hats etc. It would also be possible to try products or articles not present in a store thereby reducing stock and shipping the product directly to the user's home. In addition, there is no need to wait for a sales person, and it is possible to store favorite times for a final decision, getting the opinion of contacts via social networking connections. For example, "snapshots" of the LP wearing the item can be posted on the user's social network for feedback of his/her friends.

In addition, a virtual store forming part of the 3DoM® Platform can be made available to third parties so that these parties can create virtual objects, such as, 3me® (or MoodEe®), together with associated animation of the LP through an API hosted by the 3DoM® Platform. The virtual store offers virtual objects for sale, displays them, groups them by category to facilitate selection, and features search functions along with other features common to e-commerce stores.

Third parties can be offered the possibility of proposing 3me® (or MoodEe®) to the 3DoM® Platform, which, after validation, will be displayed in the virtual store, and upon selling these 3me®, will provide a share of the generated revenue to the third party originator.

The LP provides a high level of realism in terms of facial features and skin texture. The LP can interact with virtual objects received from friends to change expression etc.

As non-limiting examples, applications in which the LP in accordance with the present invention can be used include, but are not limited to: enriching chat or group chat applications, such as, MSN®, SKYPE®, Whatsapp, WeChat, and the like; and to add more emotion and to replace automatically the emoticons with a facial expression corresponding to that emoticon, for example, the :-) emoticon would be replaced by the user's LP smiling, and likewise for all other emoticons.

In addition, the LP can be used to synchronize lip movement with spoken text to offer hearing impaired users a better interface. Similarly, a virtual reader can be created for reading aloud a Network System page, a news article or any text information using text-to-speech conversion technology provided by third parties. In one embodiment, resources 22 with a processor and memory that executes software, including but not limited to algorithms, extract phonemes, basic unit of a language's phonology, which is combined with other phonemes to form meaningful units, including but not limited to words, morphemes and the like, and to animate the mouth of the model. The list of phonemes can be used to animate the avatar lips. In one embodiment, each phoneme has a specific position of the mouth and lips or other body component The virtual reader could be customized to speak with a given accent and voice, the lip movements being synchronized with the spoken text with the LP showing expressions and animations to make the reading more lifelike.

In one embodiment, electronic greetings cards could also be created using an LP, and, by attaching a message to it, a virtual or a recorded voice could present the message of the sender while showing facial animations.

As non-limiting examples, LPs can be incorporated into organizer applications where the application reminds the user that he/she needs to do a task. If he/she does not do the task, the LP could take a disappointed or angry look, for example. If the task is completed, the LP could show a congratulating face. Likewise, the LP can be used on high end gym equipment to give positive feedback when the user is performing well, for example, better than last he/she did the same exercise, and to provide encouragement if he/she is struggling with the exercise. Naturally, the LP could also give negative feedback if necessary.

In one embodiment, the 3DoM® platform allows the integration with social networks through their API and with Network System sites as described above. One possible application of the 3DoM® platform is to provide the functionality of creating a large image wall composed of a large number of small facial images, each providing a piece of a sort of patchwork. The image wall is in effect composed of small (thumbnail) images which are screenshots of LPs.

In one embodiment, the user can put his/her face on the image wall by purchasing a special type of 3me® (or MoodEe®) which will offer the following possibilities: take a screenshot of his/her LP as it was at its last update; give the user the possibility of inserting a text message; and upload the screenshot to the image wall. The image wall can be implemented either within the social network making use of the APIs of that social network, on the 3DoM® platform or in a Network System site. A user visualizing the image wall would see initially a collection of static images of the faces. When zooming closer, and/or when doing a mouse over (if he/she is using a desktop PC) or a touch (using a tablet), the faces would regain their "life" and turn back to their original Living Portrait format.

As a non-limiting example one way to implement the construction of the image wall is for charitable purposes. Initially, the wall comprises a plurality of grey images on a white background. By sending a specific 3me® (or MoodEe®), the face of the user is posted in one of the grey images which become colored showing that a contribution to the charitable cause has been made at some point. A user can repeatedly send such 3me® (or MoodEe®) to have his/her picture posted several times. When a user looks at the wall from far, he/she can visualize groups of colored pixels in various spots, which correspond to where a user has sent a 3me® (or MoodEe®). The more users send 3me® (or MoodEe®), in effect, in this instance, making a donation, the more colored groups of pixels start replacing grey points of the image wall.

Although the image wall has been described with respect to donating to charity, it could be used for other collections and populated by the sending of specific 3me® (or MoodEe®).

As described above, 3me® (or MoodEe®) are complex objects which produce effect that are applied to LPs. However, some 3me® (or MoodEe®) objects may degrade after a predetermined period of time if not utilized. Users having unused 3me® (or MoodEe®) objects will be notified if these objects are about to suffer degradation. This gives the user the opportunity to use the object thereby reactivating them for a further predetermined period of time. A user has the option of opting in or out for such notifications.

Further uses of LPs may include the setting of a mode such as "do not disturb" mood or similar. When a call is placed to a user who has selected the "do not disturb" mood, the LP of that user with a facial expression corresponding to this mood will appear. In addition, a message may also be set by the user to indicate more details, for example, "in a meeting" or "sorry I can't take your call". For this to be implemented, the caller needs to check with the 3DoM® platform to obtain the user mood information.

In one embodiment, the 3DoM® platform allows users to specify their mood associated with a communication, and may store the mood of users together with the history of mood changes. This information can be analyzed to provide crowd sentiment analysis.

In one embodiment, LPs may also be enriched with characteristics which are "Tamagotchi®-like" (Tamagotchi® is a handheld digital pet, Tamagotchi® is a trademark of Bandai Co. Ltd., a subsidiary of Namco Bandai of Taito, Tokyo, Japan.). Users will need to conduct activities, for example, feeding, playing, accessorizing, etc., to keep their LP and their accessories in good shape and to ensure that he/she grows up healthy and the accessories stay in good condition to be used. Such activities can be obtained from the 3DoM® platform. The embodied character in the Tamagotchi® may be a character based on the LP of a friend, a celebrity, a comic book character, etc.

As non-limiting examples, although emotions and moods have been described above as being set by the user, they may be automatically detected and uploaded onto the 3DoM® platform. For example, a camera or other device built into a television may capture the emotions and/or mood of one of more persons watching a television show, the captured data being uploaded to the 3DoM® platform via a Network Systems link. From the 3DoM® platform, this captured information may be used to animate accordingly the LP of the user. This captured information may also be used for sentiment analysis, mood-based commercials and audience satisfaction.

In one embodiment, biorhythms of the user may be used. This requires the use of wearable devices with sensors which can detect changes in heart rate, body temperature etc. to monitor and transmit information which can be associated with different emotions.

In one embodiment if a video image of a user is obtained, for example, using a webcam connected to the Network Systems, the emotions of the user may be detected using facial recognition from the video data. This data can be used to develop an emotional chat by remotely activating an LP showing the emotion detected corresponding to the user and displaying it on his/her LP to his/her remote audience. However, if the user does not want to be filmed or recorded and would prefer to represent himself/herself as a character, this character would then be animated accordingly.

In one embodiment in competitions, debates or other events, a LP can be used to represent the user. Where the results (which can be partial, during the event or final, after the event) can be determined by a vote through information technology tools, the results can be displayed using 3D animated LP with the capability to express human or animal emotions. An automated information system records the votes which can come from a variety of sources, such as social networks and formatted messages. The votes are counted and awarded to the different participants to the event according to the rules defined for the event. Each participant to the competition is represented graphically by his/her LP. As votes are collected, the LP is animated with a facial expression which reflects the vote count, for example, when victory gets closer, the LP will express a happy emotion; when a defeat looms, the LP will express a sad or unhappy emotion; if the vote count is tight, the LP can express a nervous emotion (with drops of sweat, for instance); and in general, in the case where are many candidates, the emotion which best corresponds to the situation will be displayed by each LP.

In one embodiment the information tools supporting this representation of the participants to an event as LPs will display the information visually through the various media channel available, such as: TV channels (SD, HD, Ultra HD, Interactive, Simulcast and other format for broadcast networks); paid or free channels; Network Systems (Network System site); mobile device applications; desktop applications; and social networks etc.

A server, which can be in the cloud or mobile device as described above or an equivalent structure in a mobile device as described hereafter, controlling the event may interact with social networks, RSS feeds, databases, as well as, video information, information received from computers, mobile devices and the Network System.

As a non-limiting example, an extension of this event scenario is to provide a mobile device application which allows users to vote and broadcast their emotions on a television show. The television channel (or particular show or program) requests that viewers of the program to download a suitable application or app from an application store so that they can create their own LP, set their mood, vote for one of the participants, and, optionally add a short text message. Each viewer's vote is sent either directly to the 3DoM® platform or to 3DoM® enabled processor and memory that executes software, including but not limited to algorithms, made available to the television channel or show. The vote may be free or may be a paid purchase. In this latter case, the price can be fixed or variable, and can be set by a real-time auction.

In one embodiment the television program will broadcast a selection of the votes in a manner such as a stock market, for example, like a ticker tape scrolling horizontally at the bottom of the television screen overlaying the program image. The ticker tape may include the LP of the voter showing a living facial expression expressing a mood set by the voter, a short text message, and the name of the voter. The selection may be random, for example, the voter being chosen like in a lottery, based on the price paid by the viewer, or based on any other business rule set by the 3DoM® platform. Viewers may be charged only in the event that their LP is broadcast or may be charged regardless of whether the relevant LP has been broadcasted. In the latter case, the charge may be for use of the 3DoM® platform for viewers not having a 3DoM® platform ID.

In one embodiment the 3DoM® platform will enable the following additional services: an in application notification informing a viewer that his/her vote has been accepted and that they will be broadcast live in a few minutes; users will in turn be able to share this event with their friends via their social networks with a simple operation in a few clicks, passing the link of the television show or program if it is being broadcast on the Network System or another link or information allowing people to tune in and watch the show; and selling the footage of a short video sequence containing the broadcast of the LP ticker tape at the bottom of the screen.

The present invention is not limited to human or animals and it may be possible to create LPs of other creatures including imaginary ones. Such LPs can be used in "online competitions" or in interactive games. In other embodiments, a mobile device is used in place of the cloud. The mobile device can include an app for the methods disclosed herein.

Figure 22:
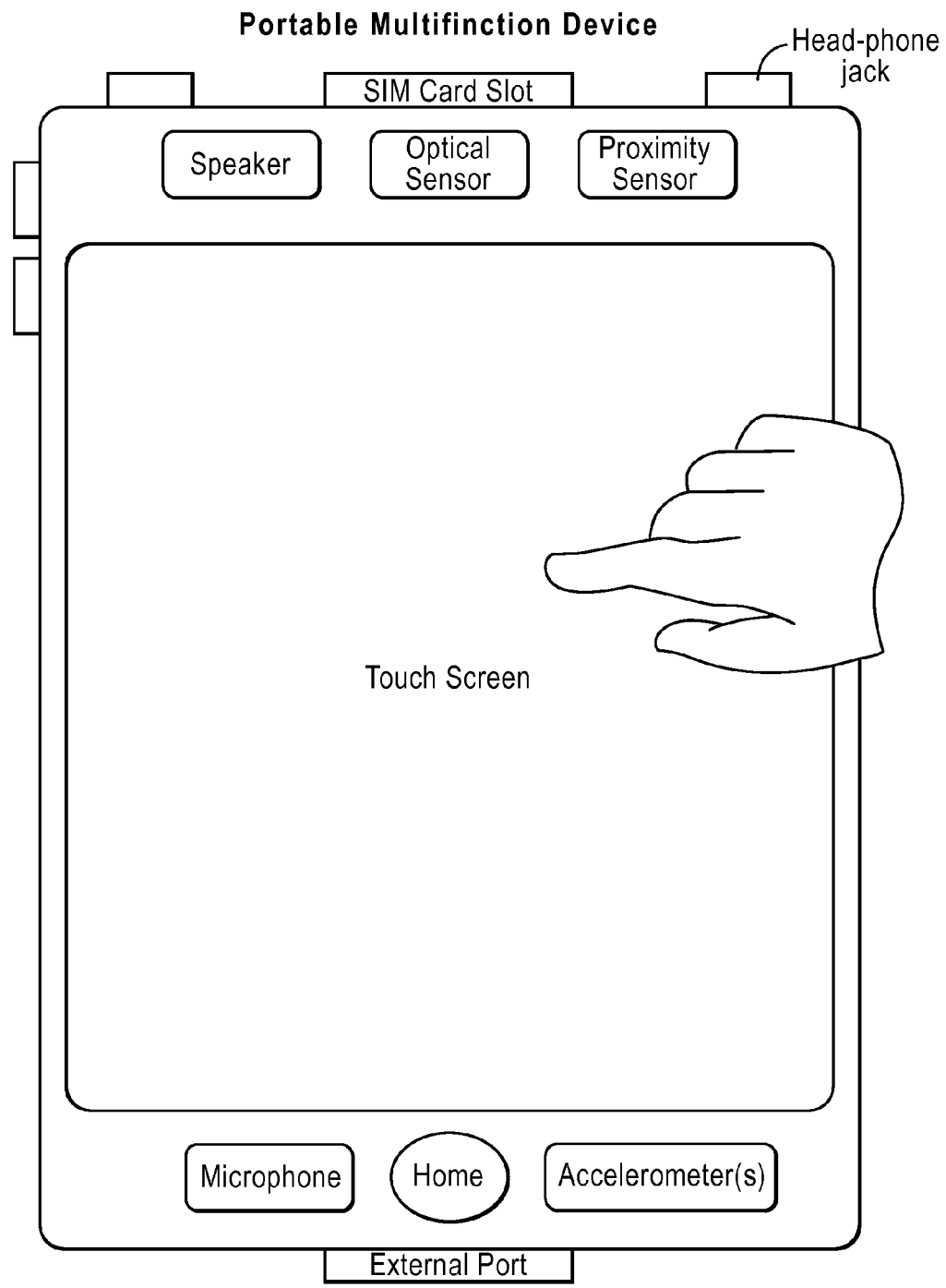
FIGS. 22-24 illustrate one embodiment of a mobile device with an app that can be used with the present invention.
Figure 23:
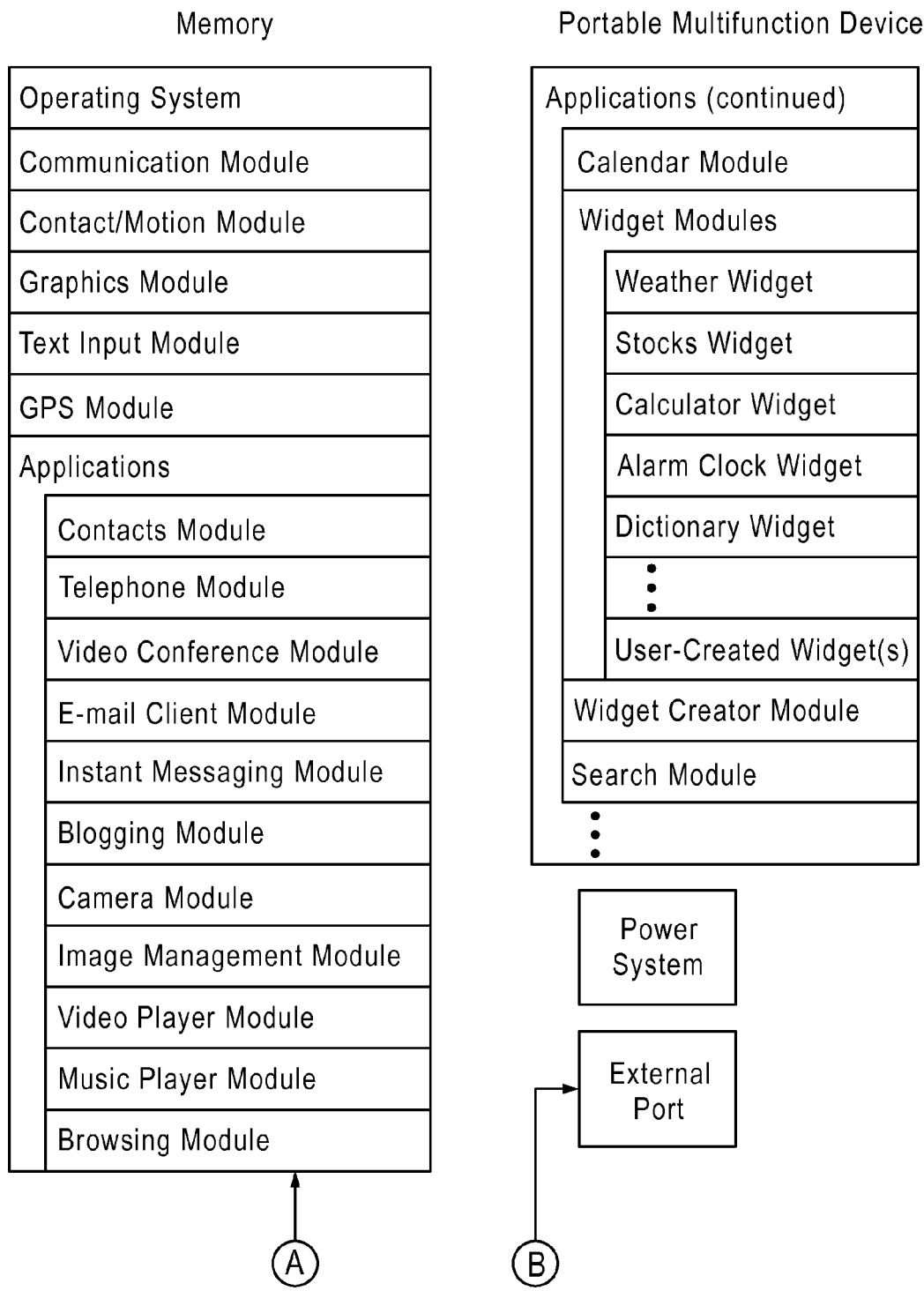
Figure 24:
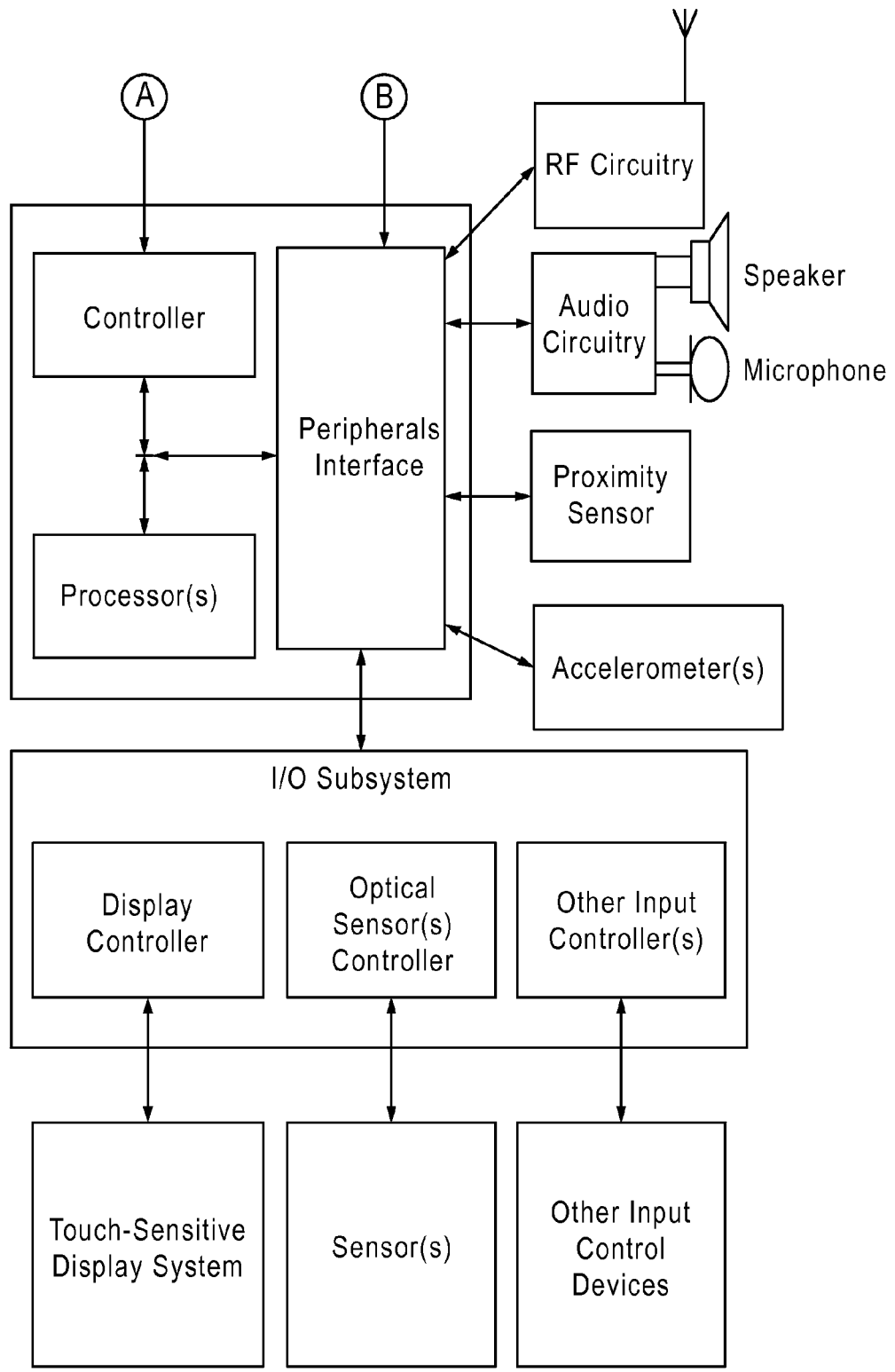

Referring to FIGS. 22-24, the mobile or computing device can include an app for executing the methods of the present invention. A touch-sensitive display can be used, sometimes called a "touch screen" for convenience, and may also be known as or called a touch-sensitive display system. The mobile or computing device may include a memory (which may include one or more computer readable storage mediums), a memory controller, one or more processing units (CPU's), a peripherals interface, Network Systems circuitry, including but not limited to RF circuitry, audio circuitry, a speaker, a microphone, an input/output (I/O) subsystem, other input or control devices, and an external port. The mobile or computing device may include one or more optical sensors. These components may communicate over one or more communication buses or signal lines.

It should be appreciated that the mobile or computing device is only one example of a portable multifunction mobile or computing device, and that the mobile or computing device may have more or fewer components than shown, may combine two or more components, or a may have a different configuration or arrangement of the components. The various components shown in, FIG. 21 may be implemented in hardware, software or a combination of hardware and software, including one or more signal processing and/or application specific integrated circuits.

Memory may include high-speed random access memory and may also include non-volatile memory, such as one or more magnetic disk storage devices, flash memory devices, or other non-volatile solid-state memory devices. Access to memory by other components of the mobile or computing device, such as the CPU and the peripherals interface, may be controlled by the memory controller.

The peripherals interface couples the input and output peripherals of the device to the CPU and memory. The one or more processors run or execute various software programs and/or sets of instructions stored in memory to perform various functions for the mobile or computing device and to process data.

In some embodiments, the peripherals interface, the CPU, and the memory controller may be implemented on a single chip, such as a chip. In some other embodiments, they may be implemented on separate chips.

The Network System circuitry receives and sends signals, including but not limited to RF, also called electromagnetic signals. The Network System circuitry converts electrical signals to/from electromagnetic signals and communicates with communications networks and other communications devices via the electromagnetic signals. The Network Systems circuitry may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The Network Systems circuitry may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication.

The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), BLUETOOTH®, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), and/or Instant Messaging and Presence Service (IMPS)), and/or Short Message Service (SMS)), or any other suitable communication protocol, including communication protocols not yet developed as of the filing date of this document.

The audio circuitry, the speaker, and the microphone provide an audio interface between a user and the mobile or computing device. The audio circuitry receives audio data from the peripherals interface, converts the audio data to an electrical signal, and transmits the electrical signal to the speaker. The speaker converts the electrical signal to humanaudible sound waves. The audio circuitry also receives electrical signals converted by the microphone from sound waves. The audio circuitry converts the electrical signal to audio data and transmits the audio data to the peripherals interface for processing. Audio data may be retrieved from and/or transmitted to memory and/or the Network Systems circuitry by the peripherals interface. In some embodiments, the audio circuitry also includes a headset jack (FIG. 20). The headset jack provides an interface between the audio circuitry and removable audio input/output peripherals, such as output-only headphones or a headset with both output (e.g., a headphone for one or both ears) and input (e.g., a microphone).

The I/O subsystem couples input/output peripherals on the mobile or computing device, such as the touch screen and other input/control devices, to the peripherals interface. The I/O subsystem may include a display controller and one or more input controllers for other input or control devices. The one or more input controllers 1 receive/send electrical signals from/to other input or control devices. The other input/control devices may include physical buttons (e.g., push buttons, rocker buttons, etc.), dials, slider switches, and joysticks, click wheels, and so forth. In some alternate embodiments, input controller(s) may be coupled to any (or none) of the following: a keyboard, infrared port, USB port, and a pointer device such as a mouse. The one or more buttons may include an up/down button for volume control of the speaker and/or the microphone. The one or more buttons may include a push button. A quick press of the push button may disengage a lock of the touch screen or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference in its entirety. A longer press of the push button may turn power to the mobile or computing device on or off. The user may be able to customize a functionality of one or more of the buttons. The touch screen is used to implement virtual or soft buttons and one or more soft keyboards.

The touch-sensitive touch screen provides an input interface and an output interface between the device and a user. The display controller receives and/or sends electrical signals from/to the touch screen. The touch screen displays visual output to the user. The visual output may include graphics, text, icons, video, and any combination thereof (collectively termed "graphics"). In some embodiments, some or all of the visual output may correspond to userinterface objects, further details of which are described below.

A touch screen has a touch-sensitive surface, sensor or set of sensors that accepts input from the user based on haptic and/or tactile contact. The touch screen and the display controller (along with any associated modules and/or sets of instructions in memory) detect contact (and any movement or breaking of the contact) on the touch screen and converts the detected contact into interaction with user-interface objects (e.g., one or more soft keys, icons, web pages or images) that are displayed on the touch screen. In an exemplary embodiment, a point of contact between a touch screen and the user corresponds to a finger of the user.

The touch screen may use LCD (liquid crystal display) technology, or LPD (light emitting polymer display) technology, although other display technologies may be used in other embodiments. The touch screen and the display controller may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen.

A touch-sensitive display in some embodiments of the touch screen may be analogous to the multi-touch sensitive tablets described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in their entirety. However, a touch screen displays visual output from the portable mobile or computing device, whereas touch sensitive tablets do not provide visual output.

A touch-sensitive display in some embodiments of the touch screen may be as described in the following applications: (1) U.S. patent application Ser. No. 11/381,313, "Multipoint Touch Surface Controller," filed May 12, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

The touch screen may have a resolution in excess of 1000 dpi. In an exemplary embodiment, the touch screen has a resolution of approximately 1060 dpi. The user may make contact with the touch screen using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, the mobile or computing device may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen or an extension of the touch-sensitive surface formed by the touch screen.

In some embodiments, the mobile or computing device may include a physical or virtual click wheel as an input control device. A user may navigate among and interact with one or more graphical objects (henceforth referred to as icons) displayed in the touch screen by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by an input controller as well as one or more of the modules and/or sets of instructions in memory. For a virtual click wheel, the click wheel and click wheel controller may be part of the touch screen and the display controller, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

The mobile or computing device also includes a power system for powering the various components. The power system may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The mobile or computing device may also include one or more sensors, including not limited to optical sensors. FIG. 30 illustrates how an optical sensor coupled to an optical sensor controller in I/O subsystem. The optical sensor may include charge-coupled device (CCD) or complementary metal-oxide semiconductor (CMOS) phototransistors. The optical sensor receives light from the environment, projected through one or more lens, and converts the light to data representing an image. In conjunction with an imaging module 58 (also called a camera module); the optical sensor may capture still images or video. In some embodiments, an optical sensor is located on the back of the mobile or computing device, opposite the touch screen display on the front of the device, so that the touch screen display may be used as a viewfinder for either still and/or video image acquisition. In some embodiments, an optical sensor is located on the front of the device so that the user's image may be obtained for videoconferencing while the user views the other video conference participants on the touch screen display. In some embodiments, the position of the optical sensor can be changed by the user (e.g., by rotating the lens and the sensor in the device housing) so that a single optical sensor may be used along with the touch screen display for both video conferencing and still and/or video image acquisition.

The mobile or computing device may also include one or more proximity sensors. In one embodiment, the proximity sensor is coupled to the peripherals interface. Alternately, the proximity sensor may be coupled to an input controller in the I/O subsystem. The proximity sensor may perform as described in U.S. patent application Ser. No. 11/241,839, "Proximity Detector In Handheld Device," filed Sep. 30, 2005; Ser. No. 11/240,788, "Proximity Detector In Handheld Device," filed Sep. 30, 2005; Ser. No. 13/096,386, "Using Ambient Light Sensor To Augment Proximity Sensor Output"; Ser. No. 13/096,386, "Automated Response To And Sensing Of User Activity In Portable Devices," filed Oct. 24, 2006; and Ser. No. 11/638,251, "Methods And Systems For Automatic Configuration Of Peripherals," which are hereby incorporated by reference in their entirety. In some embodiments, the proximity sensor turns off and disables the touch screen when the multifunction device is placed near the user's ear (e.g., when the user is making a phone call). In some embodiments, the proximity sensor keeps the screen off when the device is in the user's pocket, purse, or other dark area to prevent unnecessary battery drainage when the device is a locked state.

In some embodiments, the software components stored in memory may include an operating system, a communication module (or set of instructions), a contact/motion module (or set of instructions), a graphics module (or set of instructions), a text input module (or set of instructions), a Global Positioning System (GPS) module (or set of instructions), and applications (or set of instructions).

The operating system (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module facilitates communication with other devices over one or more external ports and also includes various software components for handling data received by the Network Systems circuitry and/or the external port. The external port (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Computer, Inc.) devices.

The contact/motion module may detect contact with the touch screen (in conjunction with the display controller) and other touch sensitive devices (e.g., a touchpad or physical click wheel). The contact/motion module includes various software components for performing various operations related to detection of contact, such as determining if contact has occurred, determining if there is movement of the contact and tracking the movement across the touch screen, and determining if the contact has been broken (i.e., if the contact has ceased). Determining movement of the point of contact may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, the contact/motion module and the display controller also detect contact on a touchpad. In some embodiments, the contact/motion module and the controller detects contact on a click wheel.

Examples of other applications that may be stored in memory include other word processing applications, JAVA-enabled applications, encryption, digital rights management, voice recognition, and voice replication.

In conjunction with touch screen, display controller, contact module, graphics module, and text input module, a contacts module may be used to manage an address book or contact list, including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone, video conference, e-mail, or IM; and so forth.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the ad. Particularly, while the concept "component" is used in the embodiments of the systems and methods described above, it will be evident that such concept can be interchangeably used with equivalent concepts such as, class, method, type, interface, module, object model, and other suitable concepts. Embodiments were chosen and described in order to best describe the principles of the invention and its practical application, thereby enabling others skilled in the relevant art to understand the claimed subject matter, the various embodiments and with various modifications that are suited to the particular use contemplated.

What is claimed is:

1. A computer implemented method for transforming a two-dimensional image of at least one portion of a human or animal body into a deformable mask, comprising:
    a) acquiring an image including the at least one portion of the human or animal body;
    b) identifying the at least one portion of the human or animal body within the image;
    c) searching for features indicative of the at least one portion of the human or animal body within the at least one portion;
    d) identifying a set of landmarks corresponding to the features;
    e) aligning the deformable mask including the set of landmarks, the deformable mask comprising a number of meshes that correspond to the at least one portion of the human or animal body, wherein a depth corresponding to a mesh of the deformable mask is determined empirically based on the set of landmarks corresponding to the features;
    f) applying a plurality of concentric rings to the image, wherein the plurality of concentric rings rotate about a pivot point and include a background concentric ring positioned outside of the at least one portion of the human or animal body and a body concentric ring positioned on the at least one portion of the human or animal body, wherein the background concentric ring includes a first plurality of vertices, and wherein the body concentric ring includes a second plurality of vertices; and
    g) animating the deformable mask by applying different degrees of rotation to the first plurality of vertices and the second plurality of vertices, wherein a zero degree of rotation is applied to the first plurality of vertices.

2. The method according to claim 1, wherein the at least one portion of the human or animal body includes at least a face and step c) includes searching for facial features, the set of landmarks corresponding to facial features.

3. The method according to claim 2, further comprising reconstructing non-visible parts of the face.

4. The method according to claim 2, further comprising:
moving points in the deformable mask according to at least one defined storyboard to create complex face animations, each defined storyboard simulating at least one of: a human or animal emotion.

5. The method according to claim 1, further comprising: applying an easing function to smooth movements in the animated deformable mask.

6. The method according to claim 1, further comprising: adjusting the amount of animation in accordance with contours applied to the deformable mask.

7. The method according to claim 1, further comprising: changing the deformable mask locally on a mobile device.

8. The method according to claim 1, further comprising: storing the deformable mask on a platform in a cloud environment.

* * * * *